United States Patent
Auradkar et al.

(10) Patent No.: US 10,348,700 B2
(45) Date of Patent: *Jul. 9, 2019

(54) VERIFIABLE TRUST FOR DATA THROUGH WRAPPER COMPOSITION

(71) Applicant: Microsoft Technology Licensing, LLC, Redmond, WA (US)

(72) Inventors: Rahul V. Auradkar, Sammamish, WA (US); Roy Peter D'Souza, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/393,648

(22) Filed: Dec. 29, 2016

(65) Prior Publication Data

US 2017/0111331 A1    Apr. 20, 2017

Related U.S. Application Data

(63) Continuation of application No. 12/832,400, filed on Jul. 8, 2010, now Pat. No. 9,537,650.

(Continued)

(51) Int. Cl.
*H04L 9/00*     (2006.01)
*G06F 21/62*   (2013.01)
(Continued)

(52) U.S. Cl.
CPC .......... *H04L 63/0435* (2013.01); *G06F 16/81* (2019.01); *G06F 16/8373* (2019.01);
(Continued)

(58) Field of Classification Search
CPC .................. H04L 63/0435; G06F 21/6227
See application file for complete search history.

(56) References Cited

U.S. PATENT DOCUMENTS 6,161,181 A    12/2000 Haynes, III et al.
6,792,466 B1   9/2004 Saulpaugh et al.
(Continued)

FOREIGN PATENT DOCUMENTS

CN    1596521 A    3/2005
CN    102687133 A  9/2012
(Continued)

OTHER PUBLICATIONS

"A Cloud Computing Plan for Shaping Next Generation BizCITY from NTT Communications", NTT Technology Journal, vol. 21, Issue No. 2, Telecommunications Carriers Associations, Feb. 1, 2009, Japan, 5 pages. (See p. one, explanation of relevance).

(Continued)

*Primary Examiner* — Farid Homayounmehr
*Assistant Examiner* — Suman Debnath
(74) *Attorney, Agent, or Firm* — Alleman Hall Creasman & Tuttle LLP

(57) ABSTRACT

A method may include, based on a set of capabilities, requesting access to data, metadata or both protected by a composite wrapper comprising a first wrapper and a second wrapper. The wrappers are each defined by different mathematical transformations performed by a component separate from the computing device. Based on an access privilege for the data, the metadata or both determined from the set of capabilities, visibility may be granted through at least one of the first or second wrapper based on independent evaluations of the first and second wrappers relative to the access privilege.

20 Claims, 67 Drawing Sheets

Related U.S. Application Data

(60) Provisional application No. 61/286,654, filed on Dec. 15, 2009.

(51) Int. Cl.

| | | |
|---|---|---|
| *H04L 9/06* | (2006.01) | |
| *H04L 9/08* | (2006.01) | |
| *H04L 9/14* | (2006.01) | |
| *H04L 9/30* | (2006.01) | |
| *H04L 9/32* | (2006.01) | |
| *G06F 16/81* | (2019.01) | |
| *G06F 17/11* | (2006.01) | |
| *H04L 29/06* | (2006.01) | |
| *H04L 29/08* | (2006.01) | |
| *G06F 16/835* | (2019.01) | |

(52) U.S. Cl.
CPC .......... *G06F 17/11* (2013.01); *G06F 21/6218* (2013.01); *G06F 21/6227* (2013.01); *H04L 9/00* (2013.01); *H04L 9/006* (2013.01); *H04L 9/0643* (2013.01); *H04L 9/0822* (2013.01); *H04L 9/0833* (2013.01); *H04L 9/0877* (2013.01); *H04L 9/14* (2013.01); *H04L 9/30* (2013.01); *H04L 9/3247* (2013.01); *H04L 63/0428* (2013.01); *H04L 63/102* (2013.01); *H04L 67/10* (2013.01); *H04L 67/1097* (2013.01); *G06F 2221/2101* (2013.01); *G06F 2221/2141* (2013.01); *G06F 2221/2149* (2013.01); *H04L 2209/16* (2013.01)

(56) References Cited

U.S. PATENT DOCUMENTS

| | | | |
|---|---|---|---|
| 6,868,160 | B1 | 3/2005 | Raji |
| 6,931,532 | B1 | 8/2005 | Davis et al. |
| 6,941,459 | B1 | 9/2005 | Hind et al. |
| 7,020,645 | B2 | 3/2006 | Bisbee et al. |
| 7,103,773 | B2 | 9/2006 | Erickson et al. |
| 7,178,033 | B1 | 2/2007 | Garcia |
| 7,246,246 | B2 | 7/2007 | Kupka et al. |
| 7,296,163 | B2 | 11/2007 | Cybenko |
| 7,380,120 | B1* | 5/2008 | Garcia ............... G06F 21/6209 713/160 |
| 7,693,877 | B1 | 4/2010 | Zasman |
| 7,921,284 | B1* | 4/2011 | Kinghorn ............ G06F 21/6209 713/160 |
| 7,921,288 | B1 | 4/2011 | Hildebrand |
| 8,229,112 | B2 | 7/2012 | Fuhr et al. |
| 2002/0069361 | A1 | 6/2002 | Watanabe et al. |
| 2002/0099947 | A1 | 7/2002 | Evans |
| 2004/0010591 | A1 | 1/2004 | Sinn et al. |
| 2004/0078577 | A1 | 4/2004 | Feng et al. |
| 2004/0143792 | A1 | 7/2004 | Demopoulos et al. |
| 2004/0172618 | A1 | 9/2004 | Marvin |
| 2004/0181667 | A1 | 9/2004 | Venters et al. |
| 2004/0181679 | A1 | 9/2004 | Dettinger et al. |
| 2005/0039031 | A1 | 2/2005 | Mont et al. |
| 2005/0039034 | A1 | 2/2005 | Doyle et al. |
| 2005/0060568 | A1 | 3/2005 | Beresnevichiene et al. |
| 2005/0091499 | A1* | 4/2005 | Forlenza ............... H04L 9/00 713/176 |
| 2005/0273616 | A1 | 12/2005 | Nishio |
| 2006/0129545 | A1 | 6/2006 | Golle et al. |
| 2006/0177061 | A1 | 8/2006 | Orsini et al. |
| 2007/0008927 | A1 | 1/2007 | Herz et al. |
| 2007/0055629 | A1 | 3/2007 | Walker et al. |
| 2007/0101145 | A1 | 5/2007 | Sachdeva et al. |
| 2007/0136200 | A1 | 6/2007 | Frank et al. |
| 2007/0160198 | A1 | 7/2007 | Orsini et al. |
| 2007/0174284 | A1 | 7/2007 | Hashimoto et al. |
| 2007/0250821 | A1 | 10/2007 | Mola marti et al. |
| 2007/0282870 | A1 | 12/2007 | Jonker et al. |
| 2007/0283150 | A1 | 12/2007 | Cozianu |
| 2008/0071814 | A1 | 3/2008 | Mittal et al. |
| 2008/0080718 | A1 | 4/2008 | Meijer et al. |
| 2008/0083036 | A1 | 4/2008 | Ozzie et al. |
| 2008/0091763 | A1 | 4/2008 | Devonshire et al. |
| 2008/0098236 | A1 | 4/2008 | Pandey et al. |
| 2008/0148071 | A1 | 6/2008 | Dettinger et al. |
| 2009/0010436 | A1 | 1/2009 | Fuhr et al. |
| 2009/0063872 | A1 | 3/2009 | Tanaka et al. |
| 2009/0100268 | A1 | 4/2009 | Garcia et al. |
| 2009/0119757 | A1* | 5/2009 | Acuna ............... G06F 21/6245 726/5 |
| 2009/0204964 | A1 | 8/2009 | Foley et al. |
| 2009/0276784 | A1 | 11/2009 | Grieve et al. |
| 2009/0300351 | A1 | 12/2009 | Lei et al. |
| 2010/0011282 | A1 | 1/2010 | Dollard et al. |
| 2010/0058072 | A1 | 3/2010 | Teow et al. |
| 2010/0138399 | A1 | 6/2010 | Jho et al. |
| 2011/0099203 | A1 | 4/2011 | Fastring |
| 2011/0119481 | A1 | 5/2011 | Auradkar et al. |
| 2011/0145580 | A1 | 6/2011 | Auradkar et al. |
| 2011/0213957 | A1* | 9/2011 | Tsai ..................... H04L 9/006 713/153 |
| 2013/0254539 | A1 | 9/2013 | Auradkar et al. |

FOREIGN PATENT DOCUMENTS

| | | |
|---|---|---|
| EP | 1936908 A1 | 6/2008 |
| JP | H0340689 A | 2/1991 |
| JP | 2001524771 A | 12/2001 |
| JP | 2004234344 A | 8/2004 |
| JP | 2008244975 A | 10/2008 |
| JP | 2009147927 A | 7/2009 |
| JP | 2009181188 A | 8/2009 |
| JP | 2009187394 A | 8/2009 |
| JP | 2009529714 A | 8/2009 |
| JP | 2009265854 A | 11/2009 |
| JP | 2010505206 A | 2/2010 |
| TW | 200414733 A | 8/2004 |
| TW | 200617677 A | 6/2006 |
| TW | I280488 B | 5/2007 |
| TW | 200821866 A | 5/2008 |
| WO | 0146808 A1 | 6/2001 |
| WO | 2001098936 A2 | 12/2001 |
| WO | 2007104705 A1 | 9/2007 |
| WO | 2008092166 A2 | 7/2008 |
| WO | 2008105937 A | 9/2008 |

OTHER PUBLICATIONS

Talbot, D., "Searching an Encrypted Cloud—Researchers are working on ways to make encrypted data easier to find.", MIT Technology Review, http://digitalpiglet.org/research/sion2009mitTR2.pdf, Nov. 12, 2009, 4 pages.

Kamara, S. et al., "Cryptographic Cloud Storage", Microsoft Research Cryptography Group, http://research.microsoft.com/en-us/people/klauter/cryptostoragerlcps.pdf, Available as early as Nov. 13, 2009, 12 pages.

Kamara, S. et al., "Cryptographic Cloud Storage: A Proposal", Microsoft Research Cryptography Group, CCSW 2009, http://digitalpiglet.org/nsac/ccsw09/slides/lauter.pdf, Available as early as Nov. 13, 2009, 4 pages.

European Patent Office, Extended European Search Report Issued in Application No. 10841444.2, Oct. 21, 2014, Germany, 9 pages.

Wang, H. et al. "An Effective Wrapper Architecture to Heterogeneous Data Source", In Proceedings of the 17th International Conference on Advanced Information Networking and Applications (AINA '03), Mar. 29, 2003, Xi'an, China, 4 pages.

Mont, M. et al., "Towards Accountable Management of Identity and Privacy: Sticky Policies and Enforceable Tracing Services", HPL-2003-49, http://citeseerx.ist.psu.edu/viewdoc/download?doi=10.1.1.12.7546&rep=rep1&type=pdf, Internal Accession Date: Mar. 19, 2003, 17 pages.

Boneh, D. et al., "PORTIA: Privacy, Obligations, and Rights in Technologies of Information Assessment", Bulletin of the IEEE

(56) References Cited

OTHER PUBLICATIONS

Computer Society Technical Committee on Data Engineering—Data Privacy and Security, vol. 27 No. 1, http://crypto.stanford.edu/portia/papers/portia-overview.pdf, Mar. 2004, 9 pages.
Hartig, H. et al., "The Nizza Secure-System Architecture", In Proceedings of the First International Conference on collaborative Computing (CollaborateCom 2005), Dec. 19, 2005, San Jose, CA, USA, 10 pages.
Schunter, M., "D05.4 Design of the Cross-Domain Security Services", http://www.opentc.net/deliverables2008_2009/OpenTC_D05.4_DesignOfSecServices_FINAL.pdf, May 26, 2008, 80 pages.
ISA Korean Intellectual Property Office, International Search Report issued in International Application No. PCT/US2010/057258, dated Jul. 12, 2011, Korea, 3 pages.
United States Patent and Trademark Office, Non-final Office Action issued in U.S. Appl. No. 12/832,400, dated Oct. 9, 2012, 21 pages.
United States Patent and Trademark Office, Non-final Office Action issued in U.S. Appl. No. 12/832,400, dated May 17, 2013, 26 pages.
United States Patent and Trademark Office, Final Office Action issued in U.S. Appl. No. 12/832,400, dated Dec. 6, 2013, 27 pages.
United States Patent and Trademark Office, Non-final Office Action issued in U.S. Appl. No. 12/832,400, dated Oct. 7, 2015, 13 pages.
United States Patent and Trademark Office, Notice of Allowance issued in U.S. Appl. No. 12/832,400, dated Aug. 26, 2016, 11 pages.
Taiwan Intellectual Property Office, Notice of Allowance Issued in Taiwan Patent Application No. 99136555, dated Oct. 21, 2015, 4 Pages. (Submitted with English Translation of Notice of Allowance).
The State Intellectual Property Office of The People's Republic of China, Notice of Allowance Issued in Chinese Patent Application No. 201080056810.9, dated Nov. 26, 2015, 4 Pages. (Submitted with English Translation of Notice of Allowance).
The State Intellectual Property Office of The People's Republic of China, First Office Action and Search Report Issued in Chinese Patent Application No. 201080056810.9, dated May 7, 2014, 20 Pages. (Submitted with English Summary of First Office Action and Partial English Translation of First Office Action and Search Report).
The State Intellectual Property Office of The People's Republic of China, Second Office Action Issued in Chinese Patent Application No. 201080056810.9, dated Jan. 30, 2015, 16 Pages. (Submitted with Partial English Translation of Second Office Action).
The State Intellectual Property Office of The People's Republic of China, Third Office Action Issued in Chinese Patent Application No. 201080056810.9, dated Aug. 20, 2015, 6 Pages. (Submitted with English Translation of Third Office Action).
Japan Patent Office, Notice of Allowance Issued in Japanese Patent Application No. 2012-544539, dated Sep. 25, 2014, 4 Pages. (Submitted with Partial English Translation of Notice of Allowance).
European Patent Office, Office Action Issued in European Patent Application No. 10841444.2, dated Oct. 31, 2016, 5 Pages.
Taiwan Intellectual Property Office, Office Action and Search Report Issued in Taiwan Patent Application No. 099136555, dated Dec. 22, 2014, 4 Pages. (Submitted with English Translation of Search Report).
"Office Action Issued in European Patent Application No. 10841444.2", dated Dec. 18, 2017, 5 Pages.
Unay, et al., "A Survey on Querying Encrypted XML Documents for Databases as a Service", In Proceedings of the ACM SIGMOD Record, vol. 37, Issue 1, Mar. 2008, pp. 12-20.
Armbrust, et al., "Above the Clouds: A Berkeley View of Cloud Computing", In Technical Report UCB/EECS-2009-28, EECS Department, vol. 17, Feb. 10, 2009, 23 Pages.
Schwarz, et al., "An Encrypted, Content Searchable Scalable Distributed Data Structure", In Proceedings of the 22nd International Conference on Data Engineering Workshops, 2006, 10 Pages.
Katayama, et al., "An ID-based Conjunctive Keyword Searchable Encryption", In Collection of Papers Presented at Computer Security Symposium and Published by Information Processing Society, Oct. 19, 2009, 13 Pages.

Waters, et al., "Building an Encrypted and Searchable Audit Log", In Proceedings of the 11th Annual Network and Distributed System Security Symposium, vol. 4, Feb. 2004, 14 Pages.
Varia, Jinesh, "Cloud Architectures", Retrieved from: <<https://www.systems.ethz.ch/education/courses/fs09/HotDMS/pdf/amazoncloud.pdf>>, Retrieved Date: Oct. 12, 2009, 14 Pages.
Jaeger, et al., "Cloud Computing and Information Policy: Computing in a Policy Cloud?", In Journal of Information Technology and Politics, vol. 5, Issue 3, 2008, 35 Pages.
Miklau, et al., "Controlling Access to Published Data Using Cryptography", In Proceedings of the 29th International Conference on Very large Data Bases, vol. 29, 2003, 12 Pages.
Chow, et al., "Controlling Data in the Cloud: Outsourcing Computation without Outsourcing Control", In Proceedings of the ACM Workshop on Cloud Computing Security, Nov. 13, 2009, pp. 85-90.
Abadi, Daniel J., "Data Management in the Cloud: Limitations and Opportunities", In Proceedings of the IEEE Data Engineering Bulletin, vol. 32, Issue 1, 2009, 10 Pages.
Wang, et al., "Efficient Secure Query Evaluation Over Encrypted XML Databases", In Proceedings of the 32nd International Conference on Very Large Database, Sep. 2006, pp. 127-138.
Brinkman, et al., "Efficient Tree Search in Encrypted Data", In Proceedings of the Information Systems Security, vol. 13, Issue 3, May/Jun. 2004, pp. 14-21.
"Final Office Action Issued in U.S. Appl. No. 14/588,399", dated Feb. 11, 2016, 21 Pages.
"Final Office Action Issued in U.S. Appl. No. 12/832,433", dated May 23, 2013, 30 Pages.
"Final Office Action Issued in U.S. Appl. No. 12/832,433", dated Dec. 3, 2015, 25 Pages.
"Final Office Action Issued in U.S. Appl. No. 13/895,856", dated Jun. 25, 2014, 16 Pages.
"Final Office Action Issued in U.S. Appl. No. 12/832,433", dated Dec. 6, 2017, 20 Pages.
"First Office Action and Search Report Issued in Chinese Patent Application No. 201080051694.1", dated Apr. 25, 2013, 12 Pages.
"First Office Action and Search Report Issued in Chinese Patent Application No. 201080056778.4", dated Apr. 16, 2013, 10 Pages.
"International Search Report and Written Opinion Issued in PCT Application No. PCT/US2010/054697", dated Jun. 27, 2011, 9 Pages.
"International Search Report and Written Opinion Issued in PCT Application No. PCT/US2010/057259", dated Aug. 29, 2011, 10 Pages.
"Non Final Office Action Issued in U.S. Appl. No. 14/588,399", dated Jul. 16, 2015, 19 Pages.
"Non-Final Office Action Issued in U.S. Appl. No. 12/817,487", dated Aug. 31, 2012, 21 Pages.
"Non-Final Office Action Issued in U.S. Appl. No. 12/832,433", dated Feb. 24, 2017, 23 Pages.
"Non-Final Office Action Issued in U.S. Appl. No. 12/832,433", dated May 20, 2015, 23 Pages.
"Non-Final Office Action Issued in U.S. Appl. No. 12/832,433", dated Oct. 5, 2012, 22 Pages.
"Non-Final Office Action Issued in U.S. Appl. No. 13/895,856", dated Jun. 5, 2014, 18 Pages.
"Non-Final Office Action Issued in U.S. Appl. No. 13/895,856", dated Mar. 12, 2015, 8 Pages.
"Office Action and Search Report Issued in Taiwan Patent Application No. 99139228", dated Jan. 26, 2015, 4 Pages.
"Non-Final Office Action Issued in U.S. Appl. No. 14/588,399", dated Apr. 28, 2017, 24 Pages.
"Office Action Issued in Japanese Patent Application No. 2012-539921", dated Dec. 5, 2014, 5 Pages.
"Office Action Issued in Japanese Patent Application No. 2012-539921", dated Jun. 9, 2014, 16 Pages.
"Office Action Issued in Japanese Patent Application No. 2012-544540", dated Oct. 28, 2014, 28 Pages.
"Office Action Issued in Japanese Patent Application No. 2012-544540", dated Aug. 31, 2015, 11 Pages.
Jammalamadaka, et al., "Querying Encrypted XML Documents", In Proceedings of the 10th IEEE International Database Engineering and Applications Symposium, 2006, 8 Pages.

(56) References Cited

OTHER PUBLICATIONS

Stern, et al., "Reliable Evidence of Data Integrity from an Untrusted Storage Service", In Proceedings of the Fourth International Conference on Networking and Services, Mar. 16, 2008, pp. 24-29.
Talbot, David, "Search an Encrypted Cloud", In Proceedings of the MIT Technology Review, Nov. 12, 2009, 4 Pages.
"Search Report Issued in European Patent Application No. 10841445. 9", dated Feb. 22, 2017, 13 Pages.
"Search Report Issued in European Patent Application No. 10841445. 9", dated Nov. 11, 2016, 7 Pages.
Weerasinghe, et al., "XML Security based Access Control for Healthcare Information in Mobile Environment", In Proceedings of the IEEE Pervasive Health Conference and Workshops, Nov. 29, 2006, 5 Pages.
Abdalla, et al., "Searchable Encryption Revisited: Consistency Properties, Relation to Anonymous IBE, and Extensions", In Journal of Cryptology, vol. 21, Issue 3, Nov. 3, 2008, pp. 350-391.
"Second Office Action Issued in Chinese Patent Application No. 201080051694.1", dated Aug. 12, 2013, 6 Pages.
Golle, et al., "Secure Conjunctive Keyword Search over Encrypted Data", In Proceedings of the Lecture Notes in Computer Science, vol. 3089, 2004, 15 Pages.
Pearson, Siani, "Taking Account of Privacy when Designing Cloud Computing Services", In Proceedings of the ICSE Workshop on Software Engineering Challenges of Cloud Computing, Mar. 6, 2009, 10 Pages.
Vaughan-Nichols, Steven J., "XML Raises Concerns as It Gains Prominence", In Proceedings of the Computer, vol. 36, Issue 5, May 2003, pp. 14-16.
"Non Final Office Action Issued in U.S. Patent Appl. No. 12/832,433", dated Nov. 30, 2018, 15 Pages.

\* cited by examiner

VERIFIABLE TRUST FOR DATA THROUGH WRAPPER COMPOSITION

CROSS-REFERENCE TO RELATED APPLICATIONS

This application is a continuation from U.S. application Ser. No. 12/832,400 filed Jul. 8, 2010, which claims priority to U.S. Provisional Application Ser. No. 61/286,654, filed on Dec. 15, 2009, the entirety of each of which are incorporated herein by reference.

TECHNICAL FIELD

The subject disclosure relates to providing trustworthy computing and data services for device(s), such as network or cloud services, and more specifically, to data or network services applying composite wrapper(s) for transforming data, metadata or both.

BACKGROUND

By way of background concerning some conventional systems, computing devices have traditionally executed applications and data services locally to the device. In such case, as data is accessed, processed, stored, cached, etc., the data may travel on the device over local buses, interfaces and other data pathways, however, the user of the device has not had to worry about interference or exposure of user data unless the device itself is lost, stolen or otherwise compromised.

The evolution of network storage farms capable of storing terabytes of data (with potential for petabytes, exabytes, etc. of data in the future) has created an opportunity to mimic applications that have historically operated against local data, but instead operating against data stored in the cloud, with separation of the primary device and the external storage. Cloud storage of application or system (or any) data allow many devices to store their data without the need for separate dedicated storage for each device.

Yet, with the evolution of on-line and cloud services, applications and services are increasingly being moved to third party network providers who perform some or all of a given service on behalf of device(s). In such case, the user of the device(s) may become concerned with who can access, or potentially worse, interfere with, the user's data while it is uploaded to a service, while it is stored or processed by the service or while it is retrieved from the service. In short, when the data of a user's device leaves the domain of physical possession and enters a network environment physically away from the user, a concern over sloppy or malicious handling of or interference with the data by third parties arises. Accordingly, it is desirable to increase the trust, security and privacy for cloud services and the handling of data in connection with cloud services. Similar concerns can arise over the storage of data even within an enterprise, for instance, where the data leaves one region of control (e.g., first division) where the data is generated and enters another (e.g., second division) for storage.

However, as alluded to above, the problem remains that no cloud service or network storage provider has been able to effectively alleviate the problems of and demands for security, privacy and integrity of the data while stored in the cloud. In short, users require elevated trust that their data remains secure and private when physical control over the storage vehicle is surrendered, and this hurdle has significantly prevented enterprises and consumers from adopting the backup of important data via third party network services and solutions.

The above-described deficiencies of today's devices and data services provided to devices are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

A simplified summary is provided herein to help enable a basic or general understanding of various aspects of one or more of the exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

Network or cloud data services, including mathematical transformation techniques, such as searchable encryption, deassembling/reassembling or distribution techniques, for data, are provided in a way that distributes trust across multiple entities to avoid a single point of data compromise, and decouples data protection requirements from the container(s) in which the data may be stored, processed, accessed or retrieved. In one embodiment, a mathematical transformation predicate generator (e.g., a key generator), a mathematical transformation provider (e.g., a cryptographic technology provider) and a cloud services provider are each provided as separate entities, enabling a trustworthy platform for publishers of data to publish data confidentially (obscured, e.g., encrypted) to a cloud services provider, and enabling selective access to the obscured, e.g., encrypted, data to authorized subscribers based on subscriber capabilities.

Using a trustworthy platform, a method for hosting data, comprising can include receiving data or metadata associated with the data, where the data, the metadata or both are protected by a composite wrapper formed from at least one mathematical transformation of the data defining a first wrapper for the data, the metadata or both based on a first set of criteria and a second mathematical transformation defining a second wrapper for the data, the metadata or both based on a second set of criteria. The method further includes requesting access to the data, metadata or both as protected by the composite wrapper based on a set of capabilities included in the request. Capabilities can be any kind of access information, e.g., a reconstruction map, a cryptographic key, decoding tool, etc. Based on the set of capabilities, access privileges are determined for the data, metadata or both based on evaluating visibility through the first wrapper and independently evaluating visibility through the second wrapper.

In a non-limiting embodiment, a system can include mathematical transformation component(s) distributed at least partially by a mathematical transformation technology provider, implemented independently from an access information generator that generates capability information for publishing data, metadata or both, or subscribing to published data, published metadata, or both, the mathematical transformation component(s) including at least one processor configured to grant access based on the access information. A network service provider, implemented independently from the access information generator and the mathematical transformation technology provider, includes at least one processor configured to implement a network service with respect to computer data, computer metadata or both transformed by the mathematical transformation component(s), the network service provider is configured to communicate with the mathematical transformation component(s) to perform generation, regeneration, or deletion of cryptographic wrapper(s) applied to the computer data, computer metadata or both.

Using the techniques of a trustworthy platform, data (and associated metadata) is decoupled from the containers that hold the data (e.g., file systems, databases, etc.) enabling the data to act as its own custodian through imposition of a shroud of mathematical complexity that is pierced with presented capabilities, such as keys granted by a cryptographic key generator of a trust platform as on non-limiting example. Sharing of, or access to, the data or a subset of that data is facilitated in a manner that preserves and extends trust without the need for particular containers for enforcement. The mathematical complexities, such as searchable encryption techniques, applied to the data protect the data without regard to the container or hardware in which the particular bits are recorded, i.e., the data is protected containerlessly or without regard to the container and is thus not subject to attack on the basis of a compromise of container security. If the particular "safe" is cracked, the contents are still protected.

In one non-limiting embodiment, extensible markup language (XML) data is the data acting as its own custodian. With XML data, tags can be augmented or added with description information that selectively enables or prevents access to the underlying data, enabling the XML data, or XML data fragments, as encapsulated by tag information in the trust envelope applied to the XML data or fragments, to act as its own custodian. XML data or tags can, for instance, represent searchable metadata that encodes any one or more of authentication information, authorization information, schemas information, history information, trace information, consistency information, etc. It is noted that any of the embodiments based on XML can also apply to a range of alternate formats, such as but not limited to, JaysScript Object Notation (JSON), S-Expressions, electronic data interchange (EDI), etc., and thus XML is merely used for illustrative purposes in such embodiments.

A "trusted envelope" for any kind of payload, such as but not limited to database fields, XML fragments or full records, thus provides curtained access through a variety of decorations or seals placed on the envelope that allow for a gamut of trust ranging with guarantees such as, but not limited to, confidentiality, privacy, anonymity, tamper detection, integrity, etc. For instance, XML tags can be applied or augmented to create trust envelopes for structured XML data, a common format used for data exchange in networked environments, enabling containerless XML data in a trustworthy cloud services environment.

Some other examples of cryptographic techniques or 'decorations' that can be applied to facilitate establishing a high level of trust over security and privacy of data include, but are not limited to, size-preserving encryption, searchable-encryption, or Proof(s) of Application, blind fingerprints, Proof(s) of Retrievability, etc.

Other embodiments and various non-limiting examples, scenarios and implementations are described in more detail below.

BRIEF DESCRIPTION OF THE DRAWINGS

Various non-limiting embodiments are further described with reference to the accompanying drawings in which.

DETAILED DESCRIPTION

Overview

Figure 1:
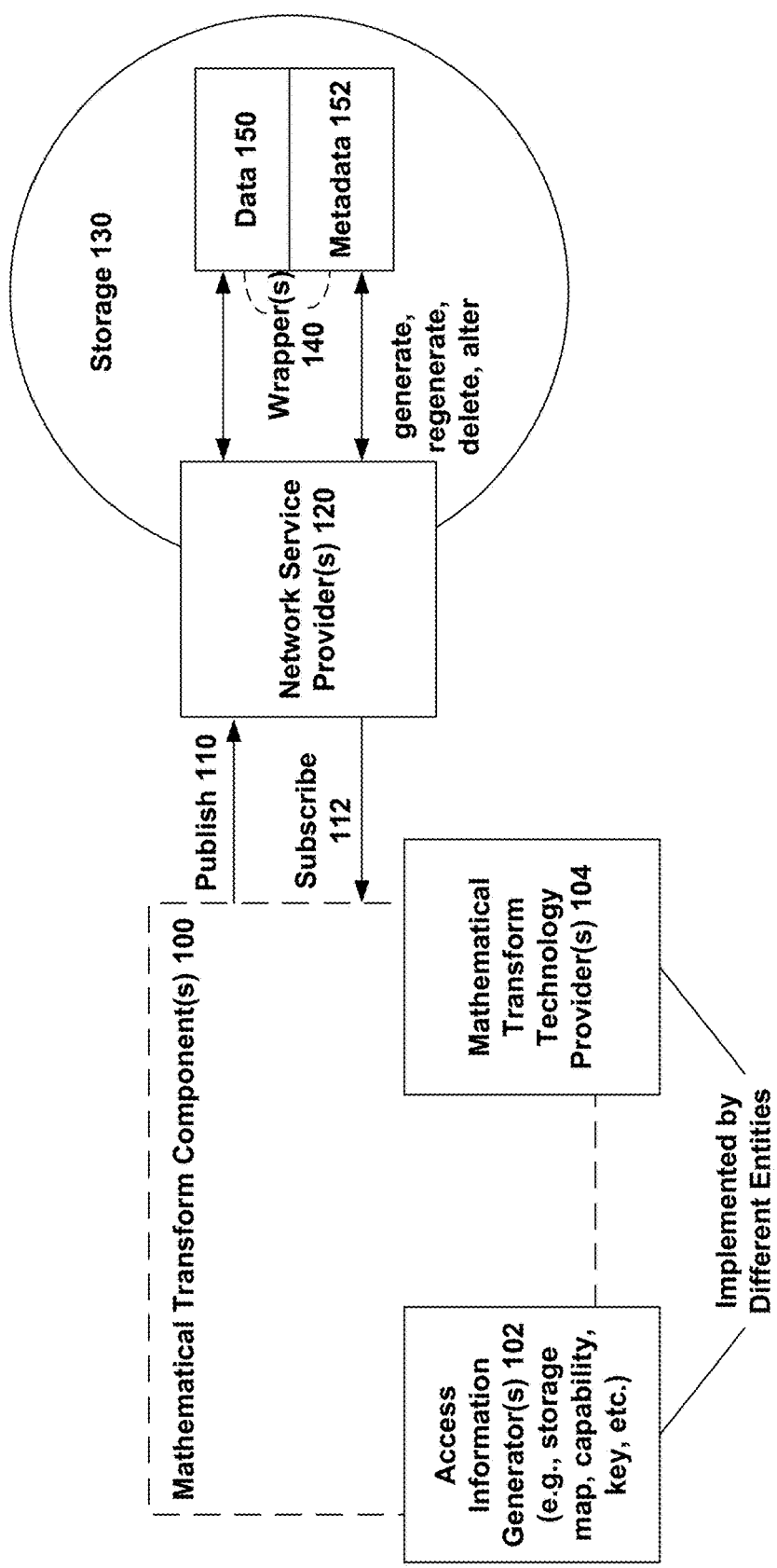
FIG. 1 is a block diagram illustrating a system for publishing or subscribing to data, metadata or both in storage employing composite wrappers in an embodiment.

As discussed in the background, data sent to a network service can create discomfort with respect to privacy, potential for tampering, etc., e.g., when data is transmitted from a user's device to a network application, service or data store, a user desires sufficient assurance that no malevolent third party can cause harm. By definition, the user has lost control over the data. It is thus desirable to increase trust so that publishers and/or owners of data are willing to surrender physical control over their data, trusting that their data will remain private, and inviolate, while in the network, except when accessed by the publishers and/or owners or to anyone to whom privileges have been granted as verified based on requester identity.

In this regard, the problem remains that no cloud service or network storage provider has been able to effectively alleviate the problems of and demands for security, privacy and integrity of the data while stored in the cloud. In short, users are interested in elevated trust that their data remains secure and private when physical control over the storage vehicle is surrendered, and this hurdle has significantly prevented enterprises and consumers from adopting the backup of important data via third party network services and solutions.

As used herein, the term network storage provide includes, but is not limited to, content delivery (or distribution) networks (CDNs), hybrid scenarios, e.g., spanning enterprise storage, cloud storage and/or CDNs, and/or broader federation scenarios, e.g., spanning multiple enterprises, multiple clouds, or multiple CDNs, or any combinations of the foregoing.

Traditionally, to keep data safe, data has been locked away or kept underground, e.g., on a physical medium. In this regard, the data owner knows that the custodian of the safe has to be a completely trustworthy party, or have no access to the contents of the safe. In this regard, while the premise of cloud services has been that customers do not necessarily need to know exactly where their data is physically located, it is not true that the question can be entirely ignored. This is because it has been a challenge to take full responsibility for who (what devices) can access the data, who sees the data, who maintains the data and how it is stored. Accordingly, in reality, customers have cared a lot about who the third parties are who are controlling the various computing and storage devices in the cloud chain due to inherent mistrust and a variety of other concerns.

Eliminating human or external entity controlled active custodianships, which have inherent biases that may not be congruent with data owners or publishers, various embodiments herein provide a system where data is transformed mathematically, e.g., selectively encrypted or searchably encrypted, such that the data acts as a custodian for itself regardless of the third party machine(s), mechanism(s), device(s) or container(s) holding the data. In this respect, various implementations of a federated trust overlay enable containerless data along with guarantees of security, confidentiality, tamper-proof, etc., which are made transparent to the user.

Accordingly, in various embodiments, a trustworthy cloud platform is used to host data including receiving data or metadata associated with the data, where the data, the metadata or both are protected by a composite wrapper formed from mathematical transformation of the data, the metadata or both including at least a first mathematical transformation defining a first wrapper for the data, the metadata or both based on a first set of criteria and a second mathematical transformation defining a second wrapper for the data, the metadata or both based on a second set of criteria. An entity can make a request for access to the data, metadata or both as protected by the composite wrapper based on a set of capabilities included in the request. Based on the set of capabilities, access privilege(s) can be determined for the data, metadata or both based on evaluating visibility through the first wrapper and independently evaluating visibility through the second wrapper.

The receiving can include receiving the data or metadata protected by the composite wrapper formed from the mathematical transformation(s) including the first mathematical transformation defining the first wrapper that wraps less than all of the data, the metadata or both based on the first set of criteria.

The receiving can include receiving the data or metadata protected by the composite wrapper formed from the mathematical transformation(s) including the first mathematical transformation defining the first wrapper that wraps the data, the metadata or both based on the first set of criteria, and the second mathematical transformation defining the second wrapper that wraps the data metadata or both as wrapped by the first wrapper.

The receiving can include receiving the data, the metadata or both protected by the composite wrapper formed at least in part from mathematical algorithm(s) enabling the first or second wrapper to at least partially decompose after satisfaction of an implicitly or explicitly defined condition. The receiving can include receiving the data, the metadata or both protected by the composite wrapper formed at least in part from mathematical algorithm(s) enabling at least one of the first and second wrapper to allow full access to the data, the metadata or both after satisfaction of the implicitly or explicitly defined condition.

The receiving can include receiving the data, the metadata or both protected by the composite wrapper formed at least in part from mathematical algorithm(s) enabling selective opacity over the data, the metadata or both.

The receiving can include receiving the data, the metadata or both protected by the composite wrapper formed at least in part from mathematical algorithm(s) including first and second mathematical transformations forming first and second wrappers based on first and second sets of criteria, respectively, the first or second set of criteria including at least one of a representation of cryptographic key information, information asserting evidence of a role, type of the data, the metadata, or both, type of associations of the data, the metadata or both, or information asserting evidence of possession of at least one claim.

The receiving can include receiving data or metadata protected by a composite wrapper formed from a searchable encryption algorithm. The receiving can include receiving the data, metadata or both by device(s) in a first region of control from device(s) in a second region of control.

The receiving can include receiving the data, metadata or both formed from analyzing the data, metadata or both and encrypting an output of the analyzing based on the cryptographic key information. The receiving the request for access to the data, metadata or both can include receiving trapdoor data enabling visible access to the data, metadata or both as defined by cryptographic trapdoor(s) of the trapdoor data.

The receiving can include receiving the data, the metadata or both protected by the composite wrapper formed from the mathematical transformation(s) of the data, the metadata or both including the first mathematical transformation forming the first wrapper for the data and the second mathematical transformation forming the second wrapper for the metadata.

In other embodiments, the receiving can include receiving the data or metadata protected by the composite wrapper formed from the mathematical transformation(s) including the first mathematical transformation defining the first wrapper that wraps less than all of the data, the metadata or both based on the first set of criteria and the second mathematical transformation defining the second wrapper that wraps all the data, metadata or both.

The second wrapper can wrap all the data, metadata or both as partially wrapped by the first wrapper. The receiving can include receiving the data, the metadata or both protected by the composite wrapper composed by complementary wrappers including at least the first and second wrapper for satisfying complementary trust or security criteria.

In one embodiment, if a status of the data, the metadata or both changes to a new status, additional wrapper(s) are automatically added appropriate to a new set of criteria associated with the new status. Alternatively, additional wrapper(s) can be automatically removed appropriate to a new set of criteria associated with the new status. Or, if a status of the data, the metadata or both changes to a new status, the determining access privilege(s) can include determining access privileges based on unlimited capabilities granted by an entity generating the capabilities.

In other embodiments, if a confidentiality class of the data, the metadata or both changes to a more sensitive class, additional wrapper(s) appropriate to the more sensitive class to the data, the metadata or both can be automatically added. If a status of the data, the metadata or both changes to a new status, the first wrapper or the second wrapper can also be changed appropriate to a new set of criteria associated with the new status. If the status of the data, the metadata or both changes to the new status, the changing can also include modifying the first wrapper or the second wrapper appropriate to the new set of criteria associated with the new status.

In another embodiment, if the status of the data, the metadata or both changes to a new status, at least some of the data, metadata, or both can be redacted by a mathematical transformation based on at least one of the first wrapper or the second wrapper appropriate to the new set of criteria associated with the new status. Also, if the status of the data, the metadata or both changes to the new status, the first wrapper or the second wrapper can be deleted. Or, if the data, the metadata or both changes, the metadata can be augmented with change metadata describing at least one change to the data, the metadata or both. As another alternative, if the data, the metadata or both changes, the change metadata describing at least one change to the data, the metadata or both in the first wrapper can be encoded in a wrapper. As a different alternative, if the data, the metadata or both changes, the metadata can be augmented with change metadata describing at least one change to the data, the metadata or both.

The determining of access privilege(s) can include determining an order of evaluating visibility based on a defined hierarchy of at least the first wrapper with respect to at least the second wrapper. For instance, the determining of access privilege(s) can include determining an order of evaluating visibility is based on a hierarchy defined by a tree data structure.

As various alternatives, the determining of access privilege(s) can include determining a concentric order of evaluating visibility. The determining of access privilege(s) can include determining a lateral order of evaluating visibility. The determining of access privilege(s) can include determining the order based on concentric and lateral orders of evaluating visibility.

The determining of access privilege(s) can include first evaluating visibility through the first wrapper, and if the set of capabilities enable access privilege(s) over the data, metadata or both, evaluating visibility through the second wrapper. The determining of access privilege(s) can include first evaluating visibility through the second wrapper, and if the set of capabilities enable access privilege(s) over the data, metadata or both, evaluating visibility through the first wrapper.

The determining of access privilege(s) can include first evaluating visibility through the second wrapper applicable to provenance metadata of the metadata and augmenting the provenance metadata based on an entity requesting the access privileges. The determining can include determining the access privilege(s) based on evaluating visibility through a first wrapper applied to an outer set of data including the metadata and independently evaluating visibility through the second wrapper applied to an inner set of data including the data. The determining can include determining the access privilege(s) based on evaluating the visibility through the first wrapper applied to encrypted indexes corresponding to the data.

The process can also include blindly searching the encrypted indexes via selective access of the encrypted indexes through the first wrapper.

The defining the first wrapper or defining the second wrapper can include defining a speed of access requirement for the data, the metadata or both. The defining the first wrapper or defining the second wrapper can include defining a tamper proof requirement for the data, the metadata or both. The defining the first wrapper or defining the second wrapper can include defining a reliability of recovery requirement specified for the data, the metadata or both.

A system can include a mathematical transformation(s) component distributed at least partially by a mathematical transformation technology provider, implemented independently from an access information generator that generates capability information for at least one of publishing data, metadata or both, or subscribing to published data, published metadata, or both, the mathematical transformation(s) component including at least one processor configured to perform at least one encoding algorithm or decoding algorithm based on the capability information generated by the access information generator. The system can further include a network service provider, implemented independently from the access information generator and the mathematical transformation(s) component, including at least one processor configured to implement a network service with respect to computer data, computer metadata or both encrypted by the mathematical transformation(s) component, the network service provider is configured to communicate with the mathematical transformation(s) component to perform generation, regeneration, alteration, augmentation or deletion of at least two mathematical transformation wrappers applied to the computer data, computer metadata or both.

The network service provider can be configured to generate, regenerate, alter, augment or delete a wrapper based on a temporal event that modifies a trust requirement for a set of trust requirements for the wrapper. The network service provider can be configured to regenerate, alter, augment or delete the wrapper based on a determination that a mathematical transformation technique employed for generating the wrapper no longer meets a trust requirement of the set of trust requirements.

The network service provider can be configured to generate, regenerate, alter, augment or delete a wrapper based on at least one spatial event that modifies a trust requirement for a set of trust requirements for the wrapper. The network service provider can be configured to regenerate, alter, augment or delete the wrapper based on a determination that a mathematical transformation technique employed for generating the wrapper no longer applies to a party that generated the wrapper.

In other embodiments, the trustworthy platform is used as a transformative framework for mathematically obscuring data by publishers such that subscribers can selectively access pieces for which the subscribers are authorized. In this regard, the platform achieves data that acts as its own custodian by simultaneously protecting data but also allowing access to authorized subscribers, while preserving integrity and security.

Data as its own custodian can be implemented with a federated trust overlay with pluggable services, as described in various embodiments and detailed sections below. Achieving more than mathematical obfuscation, e.g., encryption, various embodiments provide assurances to users and escrow agents data that data, wherever and however it is stored, preserves confidentiality and integrity requirements as properly defined by publishers or owners of data. In this regard, focus is shifted or augmented from securing boundaries, pipes and containers for data to securing data and associated metadata through the provision of a cryptographically secure trust envelope that allows access to the data/metadata, or a specific subset, when presented with proper capabilities (e.g., keys).

In one embodiment, a method for hosting data is provided comprising receiving, by computing device(s) in a first region of control from computing device(s) in a second region of control, obscured data formed from mathematical transformation of data for a defined data set of the computing device(s) in the second region of control. The method further comprises receiving, by the computing device(s) in the first region of control, obscured metadata formed from an analysis of the data and at least one other mathematical transformation of an output of the analysis. Next, it is determined which of one or more container of a set of containers having at least two disparate container types in which to store the obscured data and/or the obscured metadata.

In a non-limiting implementation of a system, one or more mathematical transformation components are distributed at least partially by a mathematical transformation algorithm provider, which is implemented independently from a generator that generates mathematical transformation predicate information (e.g., key information) for at least one of publishing data and metadata or subscribing to data and metadata. The one or more mathematical transformation components perform at least one searchable data obfuscation algorithm (e.g., searchable encryption) or searchable data revelation (e.g., searchable decryption) algorithm based on the mathematical transformation predicate information generated by the generator. A network service provider, implemented independently from the generator and the one or more mathematical transformation components, implements a network service with respect to the data or the metadata obscured by the one or more mathematical transformation components, and the network service provider includes a data container management component that manages where the data or the metadata obscured by the at least one mathematical transformation component is stored based on at least one of a data latency requirement, data reliability requirement, distance from data consumption requirement, or data scale requirement of the network service.

Data as a custodian provides access entitlements to data when needed, or when anticipated to be needed, at a fine, or specified, grain level rather than requiring entitlement to all of a given set of data. Operations staff at a cloud storage provider are also unable to view, modify, tamper or delete data without detection, unless such viewing, modifying, tampering or deletion is expressly authorized according to capabilities granted to the operations staff, such as maintenance of server logs, or some other limited operations over the metadata to plan storage capacity or the like. In addition, container-less data enables proactive replication that facilitates tamper prevention, which is otherwise a requirement conventional systems have failed to adequately address.

In one embodiment, a federated trust overlay is achieved with one or more of the following components: Cloud Data Service (CDS) or Cloud Storage Provider, Crypto Technology Provider (CTP) and Center for Key Generation (CKG). The CDS can be provided by any storage provider, i.e., containerless data requires no particular container. The CTP can also be provided by any party provided it operates in a separate region of control from the CDS, whether based on an open specification for implementing a CTP or a proprietary implementation of the CTP. Separating the key generation function and subjecting the mathematical principles, such as encryption principles, to public inspection inspires confidence that the methodology of the CTP remains free from bias, and can be implemented by an enterprise or single user, or sourced to a third party with CTP expertise. Moreover, proprietary versions, open versions for companies, open or closed versions for governments or sovereigns, reference open source versions, or other categories, can all be created for pre-packaged use or implementation by a given entity.

The CKG entity generates key information according to the technology specified by the CTP and is also provided as a separate component of the federated trust overlay (though the CKG can also be combined with other components depending on level of trust wanted for a given implementation of a FTO). In various embodiments, though the CKG can be a centralized entity, the word "Center" as used herein is a logical reference, not an indication of a centralized entity and thus, the CKG can be distributed and federated as well. A CKG can serve a single entity or multiple partners, e.g., a multi-partner collaboration between pharmaceutical companies for sharing and accessing the information according to key exchanges from an agreed upon CKG. With a FTO, therefore, trust and confidentiality are maintained by separating powers, preventing insight into stored information, logs or access patterns without express authority, and tamper detection and integrity, e.g., verification are also enabled. For instance, a service provider cannot modify or delete data without detection. Auditability with non-repudiation enables customers the comfort to let go of data and ensure no one has interfered with it either accidentally or on purpose. Logs have the same guarantees as data and metadata as well.

Results 'validation' is another feature that can be included in a FTO implementation, and which is described in more detail below. Validation ensures the cloud cannot withhold information that is being asked of it, e.g., cannot deliver two documents when asked for three documents. The notion of separation can be taken even further by considering separated implementations of the CKG and any service that performs validation of the data, as well as by separating the data from application service providers that receive, alter, retrieve, alter, augment or delete the data or metadata based on capabilities granted to the application service providers. This also has the added benefit of maintaining application capabilities according to then-current characteristics of access, updated security model, updated roles, time of day, etc.

Combining all or even some of the above described features, such as described in various embodiments below in more detail, enhances the possibility of disarming trust concerns over cloud storage of data. At the enterprise level, enterprises can own policy and control enforcement in a granular manner, even if data and application are hosted in the cloud. The system can mesh with enterprise security infrastructures, such as identity metasystems (e.g., Claims, identity lifecycle management, active directory, etc.). An enterprise can be exposed to as much or as little of implementation of the FTO as desirable.

The provision of data services as described herein involves various combinations and permutations of storage and cryptography techniques that enable cost-effective as well as secure and private solutions. For instance, various optional embodiments described in more detail below implement a data protection technique that includes size-preserving encryption, searchable-encryption, and/or a cryptographic technique termed Proof(s) of Application (referring to the general technique). Such embodiments enable new business scenarios for outsourced cloud data protection, disaster recovery, or analytics. As discussed in the background, no conventional systems have implemented cloud or network data services in a way that has not failed the privacy or security need of customers.

In this regard, to eliminate the trust barriers that surround conventional provision of network services, a trustworthy cloud computing and data services ecosystem or framework is provided that achieves the above-identified objectives as well as other advantages highlighted in the various embodiments described below. The term "cloud" services generally refers to the notion that a service is performed not locally from a user's device, but rather delivered from one or more remote devices accessible via one or more networks. Since the user's device does not need to understand the details of what happens at the one or more remote devices, the service appears to be delivered from a "cloud" from the perspective of the user's device.

In one embodiment, a system comprises a key generator that generates key information for publishing or subscribing to data. A cryptographic technology provider, implemented independently from the key generator, implements searchable encryption/decryption algorithm(s) based on the key information generated by the key generator. In addition, a network service provider, implemented independently from the key generator and the cryptographic technology provider, provides a network service with respect to data encrypted by the cryptographic technology provider.

In one embodiment, a data store is provided that exposes selectively accessible, e.g., searchable, encrypted data wherein at least one publisher publishes data representing resource(s) to the data store. Providing a division of the potential for abuse of trust, a first independent entity performs generating of cryptographic key information. A second independent entity in turn performs encrypting of the published data prior to storing based on the cryptographic key information generated by the first independent entity. A set of network or cloud services then selective access to the encrypted data for a given request to the network service based on late bound selected privileges granted by the publisher(s) or owner(s) of the resource(s).

In other embodiments, a data store stores selectively accessible encrypted data wherein subscriber(s) subscribes to a specified subset of the encrypted data. A first independent entity generates cryptographic key information based on identity information associated with the subscriber(s), and a second independent entity performs decrypting of the specified subset based on the cryptographic key information generated by the first independent entity. Network service(s) respond to requests by the subscriber(s) and provide selective access to the encrypted data based on late bound selected privileges granted by the publishers or owners of the specified subset.

In this respect, the terms publisher and subscriber generally refer to anyone that publishes or subscribes to data of a trustworthy cloud service, respectively. However, in practice, depending on the industry, field, or application of the trustworthy cloud services ecosystem and digital escrow pattern, publishers and subscribers will take on more specific roles. For instance, in the context of data of an entire system, typically only a small group of subscribers will have privileges to access the data. For an example in the context of data, an auditor of an encrypted data store may have certain capabilities based on the role of auditor of the data, to make sure certain requirements are met, such as frequency of backup, without being granted access to the content itself.

In one non-limiting embodiment, a method for hosting data comprises receiving, by first computing device(s) in a first region of control from second computing device(s) in a second region of control, encrypted data formed from encryption of data for a defined data set of the second computing device(s) according to searchable encryption algorithm(s) based on cryptographic key information, receiving, by the first computing device(s), encrypted metadata formed from an analysis of the data and encryption of an output of the analysis based on the cryptographic key information; and automatically determining container(s) from containers of at least two disparate container types in which to store the encrypted data or the encrypted metadata. Trapdoor data is received that enables visible access to the encrypted data or metadata as defined by at least one cryptographic trapdoor of the trapdoor data.

The container(s) in which the encrypted data or metadata is stored can be automatically switched or changed if a pre-defined condition of the plurality of containers is met. For instance, if certain data or metadata becomes high priority to a customer, then it may be moved from slower, longer term storage to nimble container with low access latency. Or, data or metadata might be moved, copied or deleted for other efficiency reasons, e.g., based on storage size associated with the encrypted data or metadata, based on a speed of access requirement specified for the encrypted data or metadata, based on a reliability of recovery requirement specified for the encrypted data or metadata, based on proximity to one or more devices that have access to the encrypted data or metadata, etc.

In another non-limiting embodiment, a system comprises a cryptographic component distributed at least partially by a cryptographic technology provider, implemented independently from a key generator that generates key information for publishing data and metadata or subscribing to data and metadata, the cryptographic component searchably encrypting data and metadata or searchably decrypting data and metadata based on the key information generated by the key generator.

The system can also include a network service provider, implemented independently from the key generator and the cryptographic component, providing a network service with respect to data or metadata encrypted by the cryptographic component, the network service provider including a data container management component that manages where the data or metadata encrypted by the cryptographic component is stored based on a data latency requirement, data reliability requirement, distance from data consumption requirement, or data scale requirement of the network service. The key information can include capability information that defines access privileges with respect to the data or metadata encrypted by the cryptographic component. The capability information can be late bound so that up to date access privileges are granted to a given subscriber.

In another non-limiting embodiment, a computing system comprises data store(s) storing selectively accessible encrypted data or metadata wherein a publisher publishes data or metadata representing resource(s) to the data store(s), a first independent entity generates cryptographic key information, and a second independent entity encrypts the published data or metadata prior to storing in the data store(s) based on the cryptographic key information generated by the first independent entity. The system provides a network service that enabling selective access to the encrypted data or metadata for a given request to the network service based on late bound selected privileges granted by the publisher or owner of the resource(s). In this regard, the system is agnostic to container type and thus the data store(s) include containers of disparate container type and the data store(s) automatically distribute storage of the selectively accessible encrypted data or metadata across various container(s) based on an analysis of the current storage resources represented by the containers.

In one embodiment, the "data" is XML data including XML payload data (e.g., text string "Michael Jackson") and XML tag information (e.g., </Name>) applying to the payload. The XML tag information can be augmented with additional metadata relevant to the searchable encryption and selective decryption of the XML data. In this regard, applying XML tags in this manner creates "trust envelopes" for structured XML data to leverage the federation of the cryptographic key generating entity (CKG) and cryptographic technology providing entity (CTP) to provide a range of trust guarantees like confidentiality, privacy, anonymity, tamper detection and integrity. As mentioned, any of the embodiments herein regarding XML data or metadata can also apply to other formats such as, but not limited to, JSON, S-Expressions, EDI, etc., and thus XML is merely used for illustrative purposes in the presently described embodiments.

XML data can also encode manifest information for locating other related fragments if it is a dispersed sliver of a larger document. Because of the way dispersal across different containers occurs, i.e., one or more middle layers handle the storage details of the particular container, implementations are technology independent (any CKG/CTP can be used). Moreover, other than a trust wrapper, implementations are open ended in that any number of wrappers, in addition to searchable encryption and validation or verification, can be applied and as new wrapper technologies become applicable. Tags can also be added on top of the pre-existing data and metadata (or by augmenting the metadata) that help modulate consistency, trails, etc.

If the data/information is in XML format, then any of these techniques or wrappers can be applied to structured XML data so the data can be selectively queried to obtain access to XML fragments. Present day, XML has a standard format that is <tag "value"> or <tag "value"|XML end-tag>. Advantageously, with structured XML documents, there are way(s) to represent the structure hierarchically so that there is an outer wrapper that will point to a CKG/CTP 'frame' that is unique to a digital escrow pattern. So, when there is need or want for access an embedded fragment, existing trust with that <CKG> and <CTP> wrapper can be leveraged or a new set of trust can be established with a new CKG/CTP frame.

This can provided through standard public key infrastructures PKI, though specific schemes selected are to be considered non-limiting on the techniques described herein. In this regard, whatever particular set of encryption technologies are selected, embodiments described herein enable users to search, extract and decrypt segments, subsets or parts of encrypted data or metadata. In addition, public proof(s) of data possession mechanism (a trusted third party running on a device's behalf) can be executed to verify that a specific XML segment being accessed has not been tampered with since it was originally authored.

In essence, a "trustworthy envelope" for XML fragments or full records (e.g., "payload") is provided through variety of "decorations" that allow for the trust to run a gamut of trust guarantees like, but not limited to, confidentiality, privacy, anonymity and integrity.

As an example of the type of information that can be represented in XML tag information as part of the trustworthy envelope, fragments of XML documents can be designated for various levels of sensitivity. For example, a document may exist that has Public, Secret and Top Secret paragraphs. A person performing a search and requesting access with a Secret clearance would only get access to Public and Secret paragraphs. A paragraph's classification can also be used to determine encryption mechanism, key and access policy. For example, a policy can be implemented that Top Secret content cannot be accessed from a wireless or remote device.

Similarly, such a classification can be used to create a policy on how data could be stored, where it could be stored, how long it could be stored, etc. For example, a policy could be created that requires that (sensitive) medical data must be backed up once a day using AES 256 encryption to a secure server in a trustworthy datacenter.

In an embodiment, a method for hosting extensible markup language (XML) data includes a first computing device in a first region of control receiving encrypted XML data including encrypted XML payload data and encrypted XML tags from a second computing device in a second region of control. The encrypted XML data is formed from encryption of a defined XML data set of the second computing device according to searchable encryption algorithm(s) based on cryptographic key information. A request for data includes capabilit(ies) based on the cryptographic key information defining privilege(s) for accessing at least some of the encrypted XML payload data or the encrypted XML tags and enabling selective access to the encrypted XML data as defined by the capabilit(ies).

While some embodiments are described in the context of encryption of XML data, any mathematical transformation or obscuring of the XML data can be used. For instance, in one embodiment, the XML data is distributed according to a substantially unguessable data distribution algorithm that distributes the XML data across different storage locations. A map is maintained that, if access is granted to the map, allows reconstruction of the pertinent parts of the data to which the requesting entity has privileges. In this regard, the embodiments described herein in the context of encryption can thus be generalized to any algorithm or mathematical transformation that obscures or otherwise encodes the data in a way that hides the data without access privileges.

The capabilit(ies) can include trapdoor data including cryptographic trapdoor(s) for selectively accessing the encrypted XML payload data or encrypted XML tags. The encrypted data include auxiliary encrypted metadata formed from an analysis of the encrypted XML payload data or encrypted XML tags. For instance, the confidentiality level labels of public, secret or top secret can be applied to each payload element of the XML document on a fragment by fragment basis, and included in the auxiliary encrypted metadata to achieve highly granular policy around access to parts of the XML document.

In another embodiment, a method for subscribing to searchably encrypted XML data includes receiving cryptographic key information from a key generation component that generates the cryptographic key information based on identity information associated with the subscriber device, requesting a subset of searchably encrypted XML data and corresponding XML tag data by the subscriber device including transmitting the cryptographic key information to a storage provider for the searchably encrypted XML data and corresponding tag data; and decrypting the subset of encrypted XML data and corresponding XML tag data as allowed by capabilities defined in the cryptographic key information.

For each XML fragment of the encrypted XML data, XML tag data representing a level of confidentiality of the corresponding encrypted XML data can be decrypted and it can be determined whether the capabilities allow access to data having the level of confidentiality. This includes a public level of confidentiality with open access privileges, or a secret level of confidentiality that is less open as defined consistent with policy.

The methods can include validating that a correct subset of encrypted XML data and corresponding XML tag data is received by the subscriber device consistent with the requesting. An example of validating includes performing proof(s) of data possession to prove that the correct subset is received by the subscriber device. The methods can also include verifying content of the subset of encrypted XML data and corresponding XML tag data was not deleted or modified prior to receiving the subset of encrypted XML data and corresponding XML tag data. An example of verifying includes performing proof(s) of retrievability to prove lack of interference with the content. Among other optional features, anonymizing credentials associated with the subscriber device can be applied when requesting access to encrypted XML data or key information.

In another embodiment, a method for publishing extensible markup language (XML) data can includes encrypting XML data according to searchable encryption algorithm(s) to form encrypted XML data including encrypted XML tag information based on cryptographic key information received from a separate key generator that generates the cryptographic key information and transmitting the encrypted XML data to a network service provider for storage of the encrypted data wherein the encrypted data is selectively accessible according to late binding of selected privileges granted to a requesting device based on identity information of the requesting device. The encrypting can include receiving cryptographic key information from the key generator executing in a separate region of control that generates the cryptographic key information based on an identity of publishing device performing the encrypting of the XML data.

In another embodiment, a method for subscribing to extensible markup language (XML) data includes, in response to a request for a subset of searchably encrypted XML data including encrypted XML tags by a subscriber device, receiving cryptographic key information from a key generation component that generates the cryptographic key information based on identity information associated with the subscriber device and decrypting the subset of encrypted XML data as a function of privileges granted the subscriber device defined in the cryptographic key information.

The various techniques can include requesting proof with respect to data items of the subset of encrypted XML data by the subscriber device that the correct data items are received, which can include receiving information proving to the subscriber device that the data items in the subset of encrypted XML data requested by the subscriber device are correct. The various techniques can include requesting proof that the subset of encrypted XML data has not been interfered with prior to the request by the subscriber device, which can include receiving information proving to the subscriber device that the subset of encrypted XML data has not been interfered with prior to the request by the subscriber device.

In yet another embodiment, a system includes data store(s) storing selectively accessible encrypted XML payload data and corresponding encrypted XML tag data corresponding to the encrypted XML payload data, wherein a subscriber requests a subscription to a subset of the encrypted XML payload data or the encrypted XML tag data, a first independent entity generates cryptographic key information based on identity information associated with the subscriber, and a second independent entity performs decrypting of the subset based on the cryptographic key information generated by the first independent entity. The system further includes a network service, for handling a request by the subscriber, which provides selective access to the subset of the encrypted XML payload data or the encrypted XML tag data. The system can be configured to validate that the subset of the encrypted XML payload data or the encrypted XML tag data is a correct subset consistent with the subscription and/or to verify that the subset of the encrypted XML payload data or the encrypted XML tag data has not been altered or deleted without authorization prior to the selective access to the subset of the encrypted XML payload data or the encrypted XML tag data.

In another embodiment, a system includes a cryptographic component distributed at least partially by a cryptographic technology provider, implemented independently from a key generator that generates key information for of publishing XML data and corresponding tag data or subscribing to XML data and corresponding tag data, the cryptographic component including processor configured to perform searchable encryption/decryption algorithm(s) based on the key information generated by the key generator and a network service provider, implemented independently from the key generator and the cryptographic component, including processor configured to implement a network service with respect to XML data or the corresponding tag data encrypted by the cryptographic component. The key information includes "late bound" capability information whereby up to date access privileges are granted to a given subscriber to XML data or the corresponding tag data.

Further details of these and other various exemplary, non-limiting embodiments and scenarios are provided below.

Verifiable Trust Through Wrapper Composition

As alluded to in the background, the maintenance of sensitive enterprise data at a remote site owned by a service organization can put that data at risk ranging from privacy violations to data loss. As described for various embodiments herein, network or cloud data services, including mathematical transformation techniques for data, are provided in a way that distributes trust across multiple entities to avoid a single point of data compromise, in a way that decouples data protection requirements from the container(s) in which the data may be stored, processed, accessed or retrieved. In one embodiment, an access information generator, a mathematical transform technology provider and a cloud services provider are each provided as separate entities, enabling a trustworthy platform for publishers of data to publish data confidentially (e.g., encrypted) to a cloud services provider, and enabling selective access to the transformed data to authorized subscribers based on subscriber capabilities. Multiple transform wrappers or layers can wholly or partially transform data, metadata or both to mathematical transform (e.g., encrypt, distribute across storage, obscure) or otherwise introduce lack of visibility to some or all of the data, metadata or both.

Various embodiments of the subject disclosure provide verifiable trust through families of techniques that are referred to as wrapper composition, that have applications including storage of data on servers, services or clouds that are not fully trusted, or exchanging data through regions of control that may not be fully trusted. Some other examples of cryptographic techniques or 'decorations' that can be applied to a wrapper or envelope over data to facilitate establishing a high level of trust over security and privacy of the data include, but are not limited to, size-preserving encryption, searchable-encryption, Proof(s) of Application, blind fingerprints, Proof(s) of Retrievability, etc. In some of the embodiments herein, candidate data is referred to as 'content.'

Verifiable Trust is the ability to provide guarantees such as anonymity, privacy or integrity, through techniques that could include, but are not confined to, cryptographic techniques for encryption, signing, cryptographic hashing, and interactive proofs. There are other classes of guarantees, with associated classes of applicable cryptographic and other techniques. For ease of exposition, we will refer to all these techniques as 'cryptographic' in the following text.

Many conventional cryptographic, and other schemes for protecting content, or data, and for providing verifiable trust, have relied on an "all or nothing" approach that requires the recipient or reader to have the appropriate key or other mechanism for gaining access.

Emerging methods and systems are able to provide 'selective opacity' where a party that has access to this content can be provided with delegated capabilities for performing restricted actions on that content. These actions could include having selective access based on criteria that include keys, or proofs of roles or possession of claims.

These actions could also include the ability to perform a range of actions on that content that might include searching, routing and workflow, while continuing to have a restricted view of that content. An example of such a technique is referred to in the research literature as 'Searchable Encryption'.

There are a combination of reasons that include scenario diversity, limitations in cryptography or systems, or complicated by disparate policies and verifiable trust requirements of participants, that are outlined in the following exposition. Existing techniques and implementations are not able to meet these diverse needs in a manner that provides systems and operational flexibility and dynamic composition. We describe loosely coupled wrappers that can be ephemeral, and provide support dynamic addition and removal of wrappers based on the needs of any scenario.

FIG. 1 is a block diagram illustrating a system for publishing or subscribing to data, metadata or both in storage employing composite wrappers in an embodiment. According to a distributed trust platform, mathematical transform component(s) 100 include access information generator(s) 102. Access information could be a storage map for reconstructing pieces of hidden or otherwise distributed data, cryptographic key information, or other capabilities. Also included are mathematical transform technology provider(s) 104. Component(s) 100 are used to publish 110 or subscribe 112 to data by publishers or subscribers. Network service provider(s) 120 facilitate interaction with data 150 and/or metadata 152 stored in storage 130. In this regard, wrapper(s) 140 can be applied to the data 150, metadata 152 or both, and these wrappers 140 can be generated, regenerated, deleted, augmented, altered, or otherwise changed to correspond to a change in the system or instructions.

Figure 2:
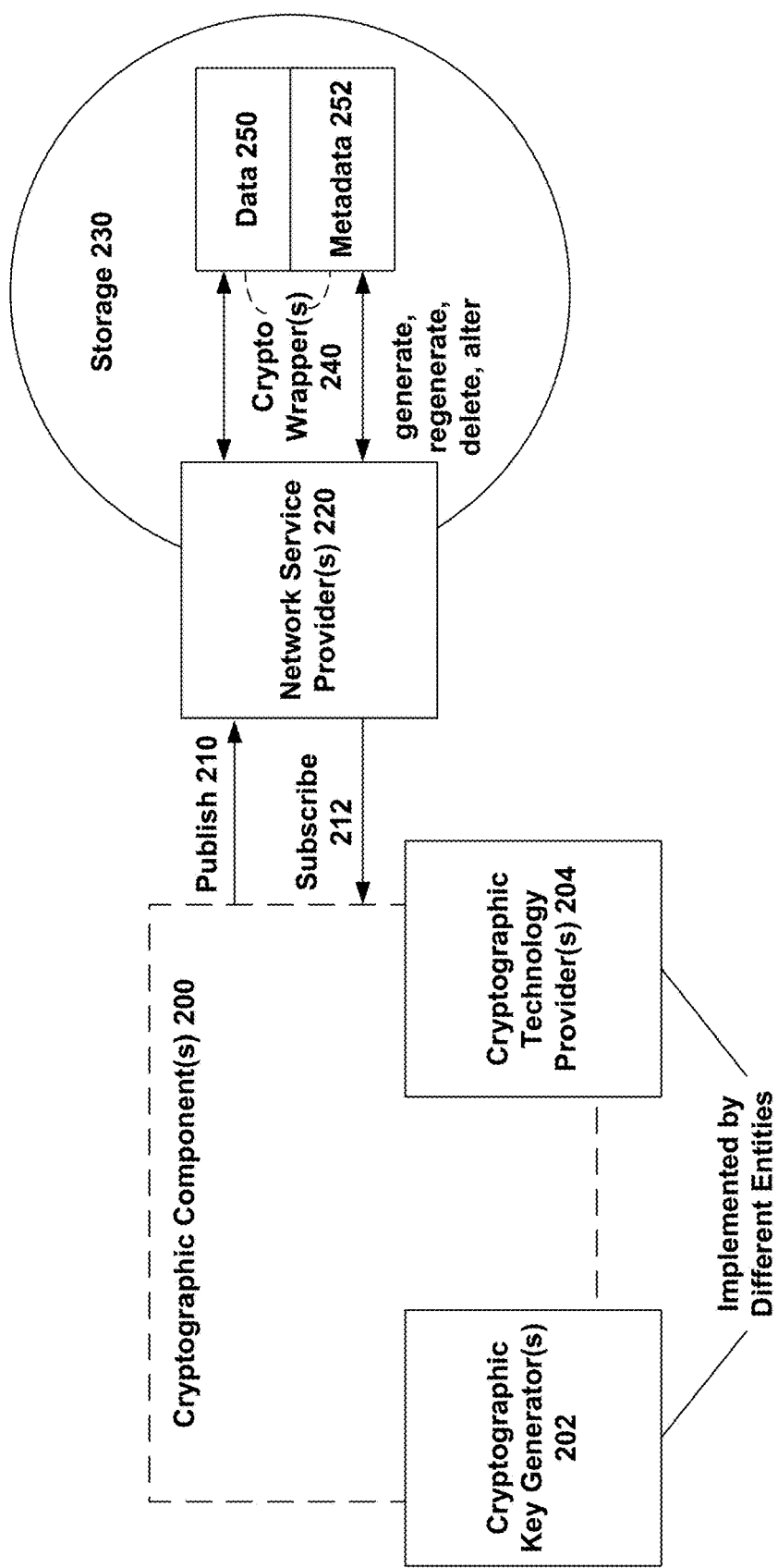
FIG. 2 is a block diagram illustrating a system for publishing or subscribing to data, metadata or both in storage employing composite encryption wrappers in an embodiment.

FIG. 2 is a block diagram illustrating a system for publishing or subscribing to data, metadata or both in storage employing composite encryption wrappers in an embodiment. According to a distributed trust platform, mathematical transform component(s) 200 include cryptographic key generator(s) 202. Also included are cryptographic technology provider(s) 204. Component(s) 200 are used to publish 220 or subscribe 222 to data by publishers or subscribers. Network service provider(s) 220 facilitate interaction with data 250 and/or metadata 252 stored in storage 230. In this regard, crypto wrapper(s) 240 can be applied to the data 250, metadata 252 or both, and these wrappers 240 can be generated, regenerated, deleted, augmented, altered, or otherwise changed to correspond to a change in the system or instructions.

Figure 3:
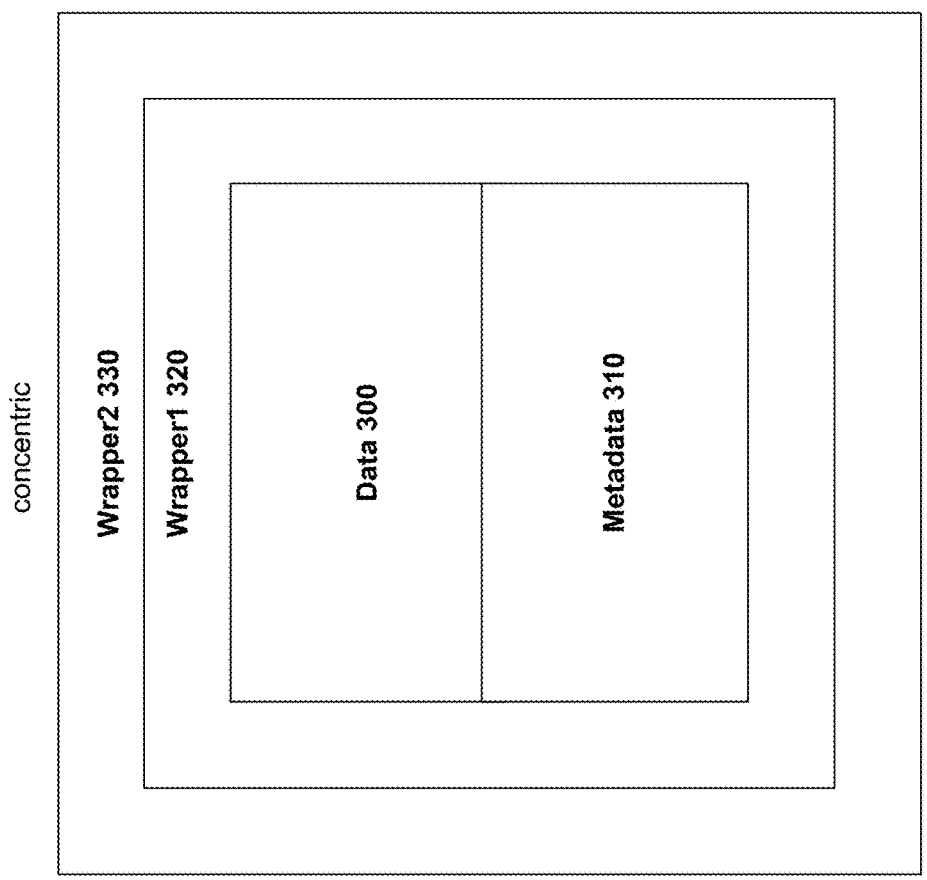
FIG. 3 is an illustrative example of a concentric composite wrapper.

FIG. 3 is an illustrative example of a concentric composite wrapper in which an outer wrapper2 330 overlays an inner wrapper1 320, both of which mathematical transform (e.g., reduce the visibility of) data 300, metadata 310 or both. Wrappers 320 and 330 protect all of the data 300, metadata 310 or both, and wrapper1 320, as an inner wrapper, is not visible until proper capabilities are presented for visibility through wrapper2 330, the outer wrapper.

Figure 4:
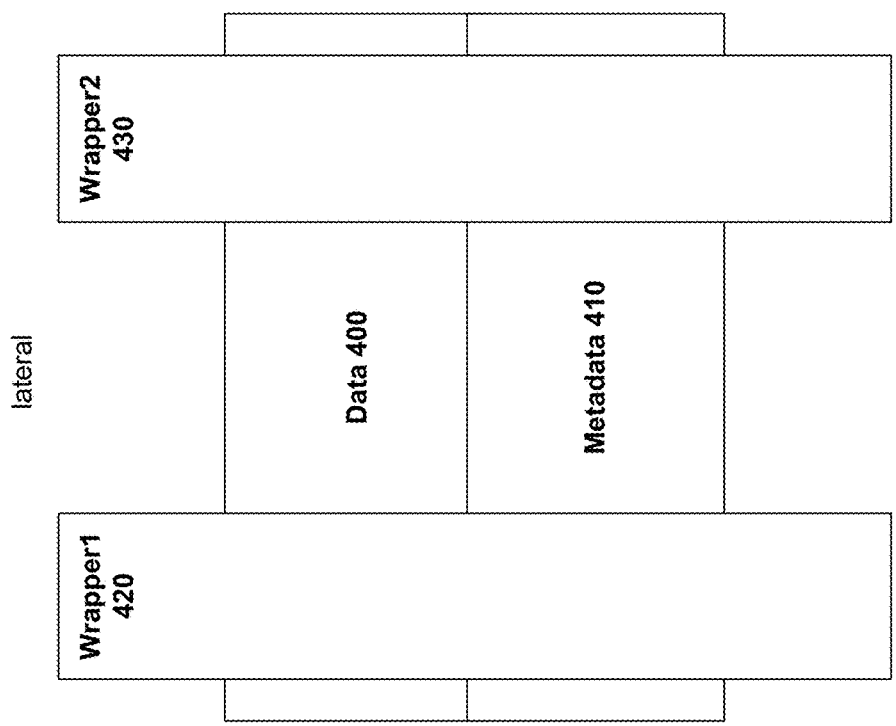
FIG. 4 is an illustrative example of a composite wrapper having lateral wrappers.

FIG. 4 is an illustrative example of a composite wrapper having lateral wrappers. With lateral wrappers 420 and 430, not all of the data 400, metadata 410 or both is made invisible by the associated transform. Rather, desired portions or items in the data 400, metadata 410 or both are obscured whereas other can remain visible.

Figure 5:
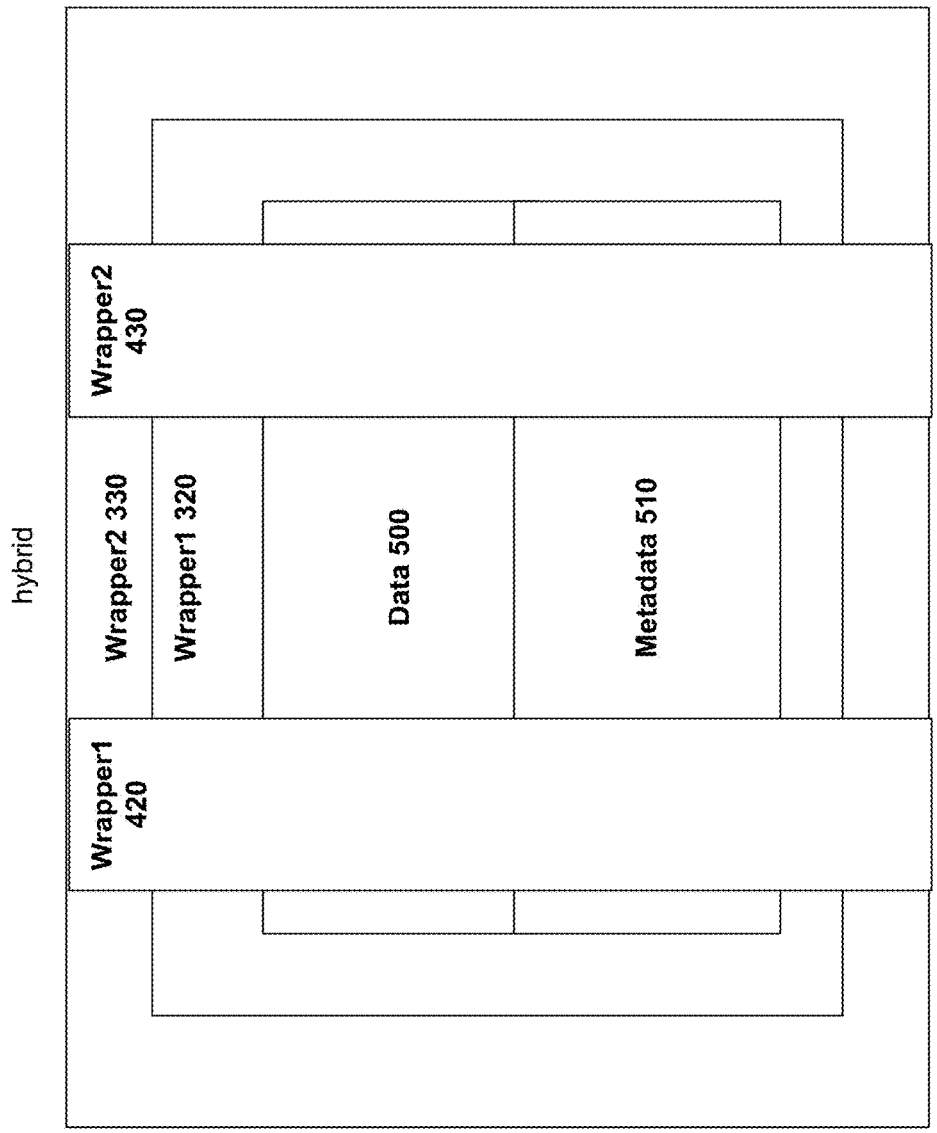
FIG. 5 is an illustrative example of a hybrid composite wrapper having both concentric and lateral wrappers in an embodiment.

FIG. 5 is an illustrative example of a hybrid composite wrapper having both concentric and lateral wrappers in an embodiment. In this regard, FIG. 5 is an example of the wrappers of FIGS. 3 and 4 combined in an embodiment where some wrappers 320 and 330 wrap all of the data 500, metadata 510 or both and some wrappers 420 and 430 wrap portions (need not be contiguous, can fit any subset definition) of the data 500, metadata 510 or both. In this respect, the hierarchy of which wrappers are unwrapped first or independent of one another can be represented according to any data structure that maintains hierarchy.

Figure 6:
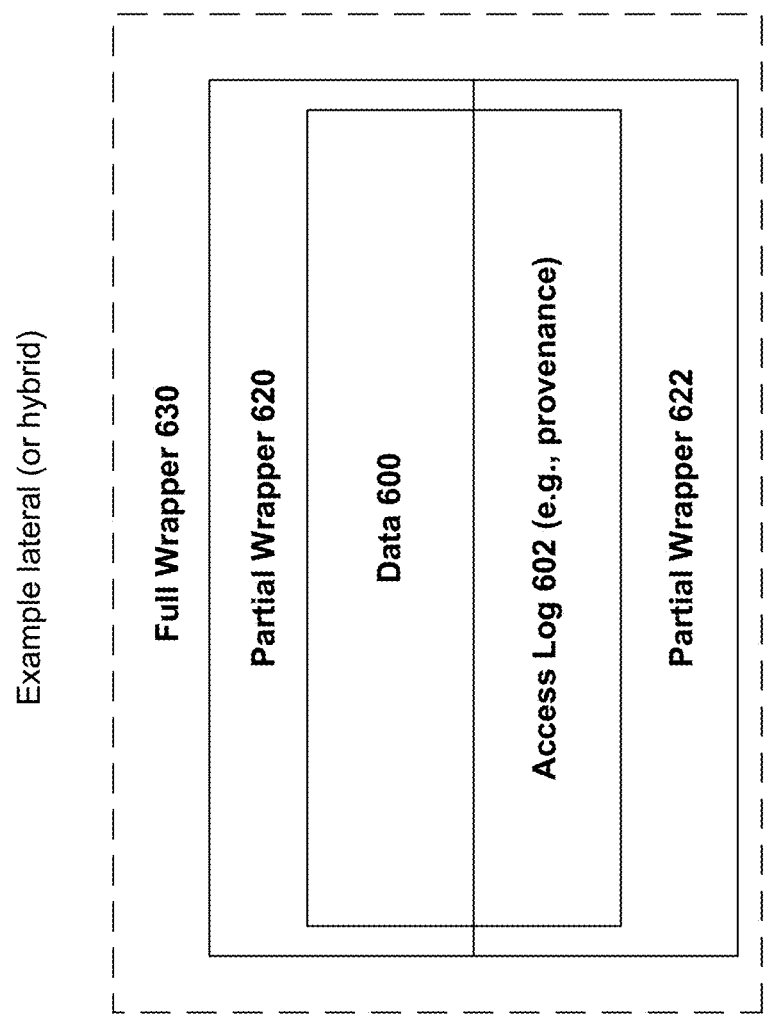
FIG. 6 is a block diagram of use of lateral wrappers in connection with access log metadata associated with data in an embodiment.

FIG. 6 is a block diagram of use of lateral wrappers in connection with access log metadata associated with data in an embodiment. As an example use of lateral wrappers where data 600 may include an access log 602 (e.g., provenance data), lateral wrapper 620 protects some data 600 and lateral wrapper 622 protects the access log 602. Thus, not all the data is protected by a given wrapper and different standards or none at all can be applied to different parts of data items. FIG. 6 additional illustrates that an additional full wrapper 630 could be applied over the partial wrappers 620, 622 as an additional layer of protection.

Figure 7:
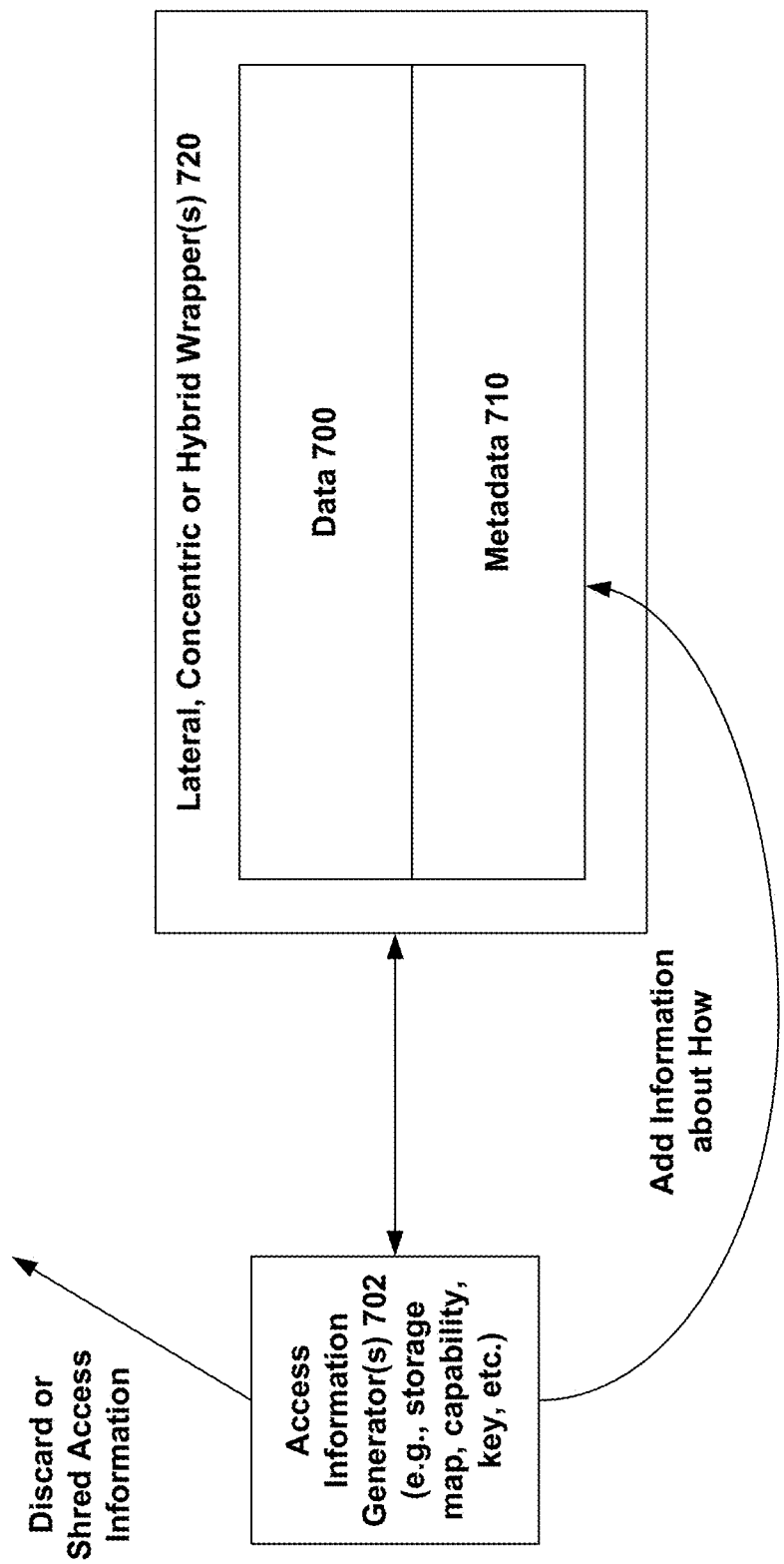
FIG. 7 is a block diagram of effectively deleting data by discarding or shredding access information in an embodiment where how the data was deleted is encoded in metadata.

FIG. 7 is a block diagram of effectively deleting data by discarding or shredding access information in an embodiment where how the data was deleted is encoded in metadata. In this regard, one way to delete data in such a system, rather than unwrapping the wrappers 720 over data 700 or metadata 710, or both is to simply discard or shred the access information generated by access information generator(s) 702, since then the data 700 or metadata 710 cannot be accessed without such information. However, information can still be preserved about the data 700, metadata 710 or both if the system chooses to record some information about the deletion, when, or how it occurred.

Figure 8:
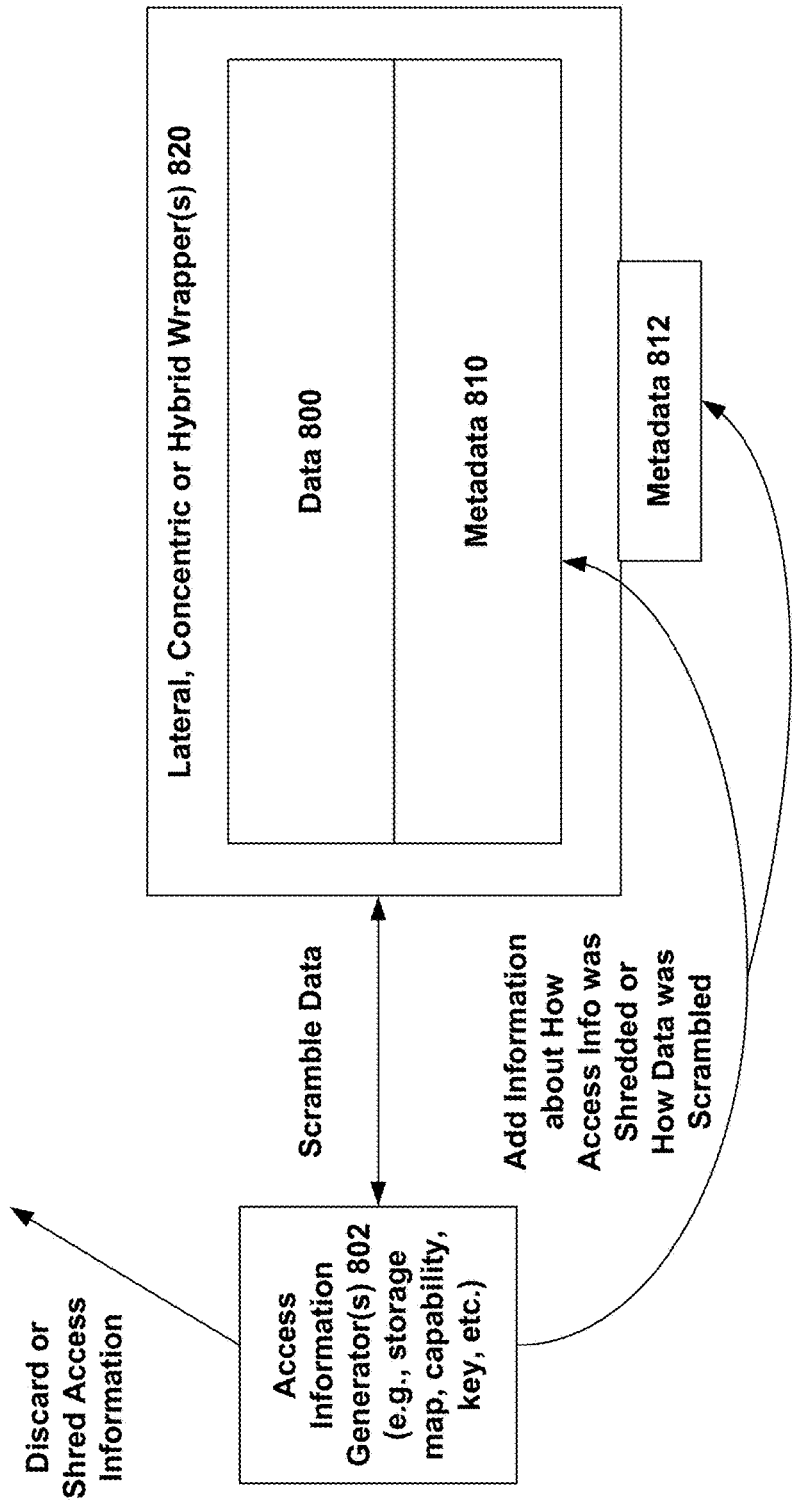
FIG. 8 is a block diagram additionally illustrating an example where data is scrambled and information about the scrambling is recorded in metadata inside or outside a wrapper of a composite wrapper.

FIG. 8 is a block diagram additionally illustrating an example where data is scrambled and information about the scrambling is recorded in metadata inside or outside a wrapper of a composite wrapper. In this example, the data 800, metadata 810, or both as protected by wrapper(s) 820 can be scrambled, and information about the algorithms used can be added to the metadata 810 or external metadata 812 or even encoded in one of the wrapper(s) 820 for institutional knowledge of what happened to the data. Accordingly, discarding the access information generated by access information generator(s) 802 or scrambling can both be used to effectively delete data in the system.

Figure 9:
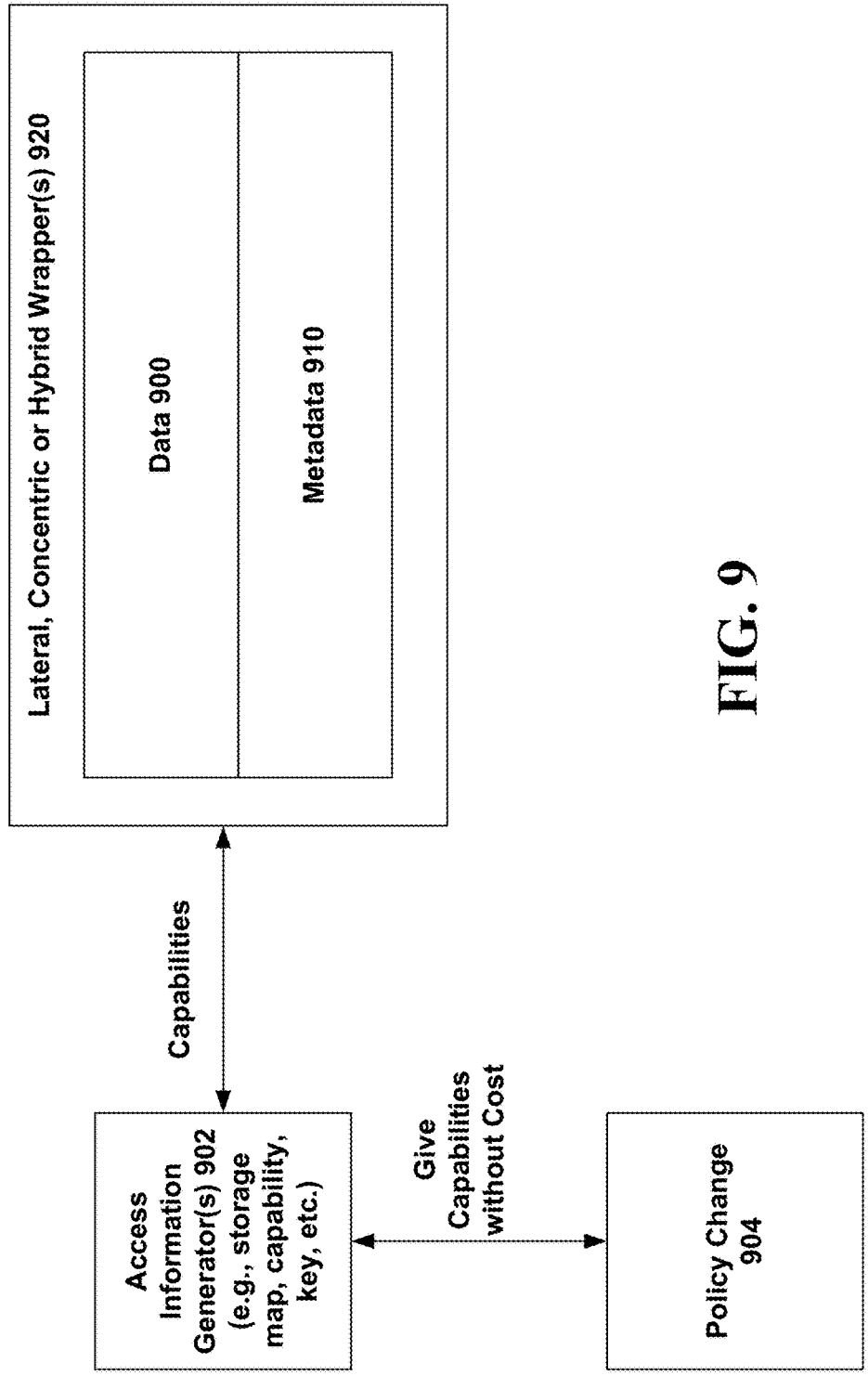
FIG. 9 is a block diagram of a change in policy that results in handing out capabilities to view data, metadata or both obscured by wrappers as an alternative to removing the wrappers.

FIG. 9 is a block diagram of a change in policy that results in handing out capabilities to view data, metadata or both obscured by wrappers as an alternative to removing the wrappers. In this example, a way to "unprotect" protected data 900, metadata 910, or both is given, despite the wrapper protections. For instance, based on policy change 904, access information generator(s) 902 simply produce capabilities for viewing all or some of the data 900, metadata 910 or both through wrappers 920 at no cost to the requesting entity. This leverages the existing architecture so that expensive unwrapping operations need not be performed.

Figure 10:
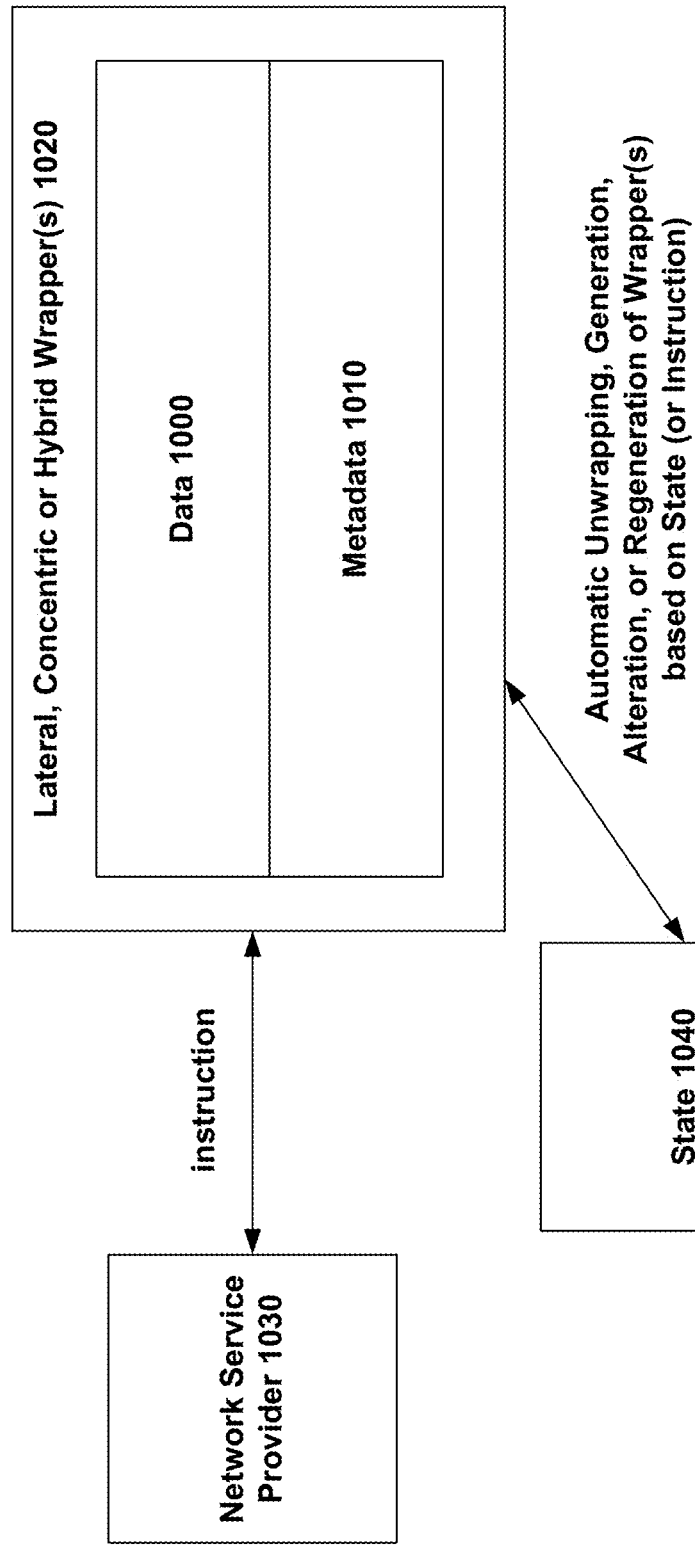
FIG. 10 is a block diagram of automatically unwrapping, generating, altering, regenerating or augmenting wrappers based on instruction or a change of state.

FIG. 10 is a block diagram of automatically unwrapping, generating, altering, regenerating or augmenting wrappers based on instruction or a change of state. This example is illustrative that a change in state 1040 or an explicit instruction from a network service provider 1030 could automatically trigger change to wrappers 1020 protecting data 1000, metadata 1010, or both. For instance, when data reaches a certain age, the wrappers can be automatically unwrapped (e.g., data in the clear again once its relevance expires). As another example, wrappers 1020 could be generated, e.g., when data becomes relevant (e.g., confidential). Wrappers 1020 can also be regenerated with different encoding where there is reason to believe a compromise has occurred. As another example, wrappers can be altered, e.g., a different transformation can be used on the wrapper or different parameters of a mathematical transformation used.

Figure 11:
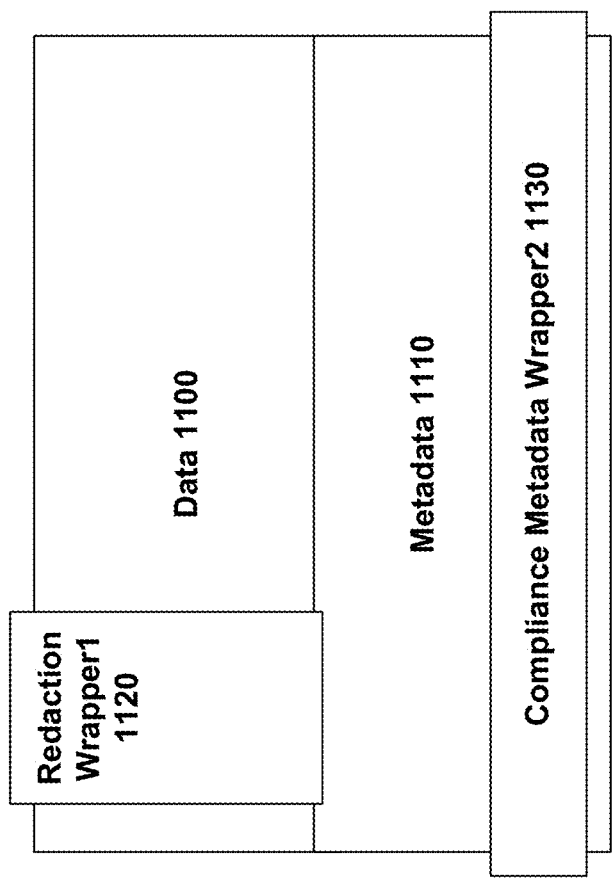
FIG. 11 is an illustrative example of using one or more lateral wrapper transforms to perform a task of redaction of data.

FIG. 11 is an illustrative example of using one or more lateral wrapper transforms to perform a task of redaction of data. For instance, a redaction lateral wrapper 1120 could be used to redact the name of a company or dates out of data 1100, or certain keywords can be redacted out of metadata 1110. As another example, though the data is redacted with redaction wrapper 1120, it is possible to record certain information about what was redacted or when in metadata 1110 as obscured by a compliance metadata wrapper 1130 for those who need to know something about what was redacted in the data 1100.

Figure 12:
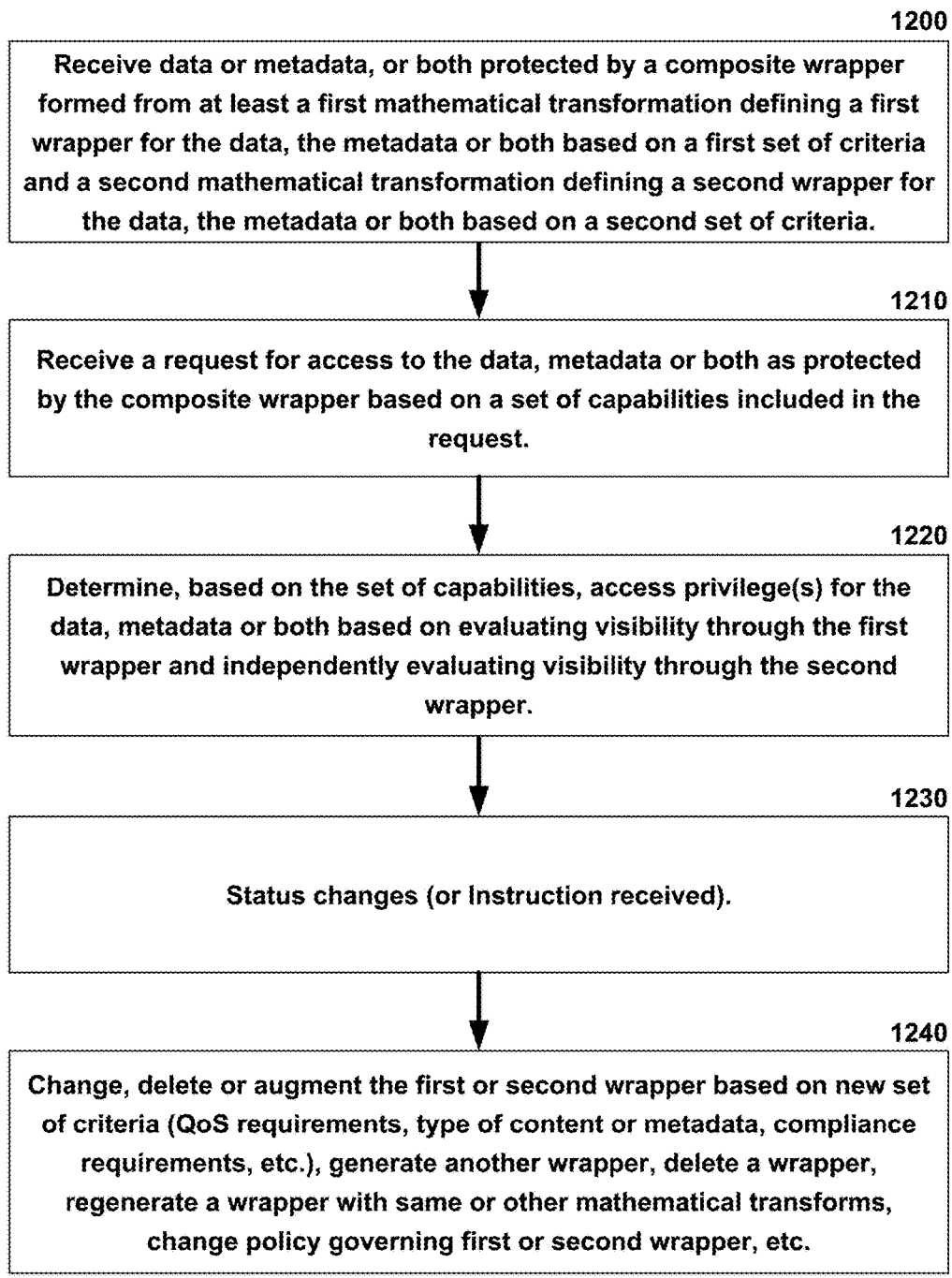
FIG. 12 is a flow diagram of an exemplary non-limiting process for hosting data, metadata or both as wrapped by a composite wrapper in an embodiment.

FIG. 12 is a flow diagram of an exemplary non-limiting process for hosting data, metadata or both as wrapped by a composite wrapper in an embodiment.

At 1200, data or metadata, or both are received protected by a composite wrapper formed from a first mathematical transformation defining a first wrapper for the data, the metadata or both based on a first set of criteria and a second mathematical transformation defining a second wrapper for the data, the metadata or both based on a second set of criteria.

At 1210, a request for access to the data, metadata or both as protected by the composite wrapper is received based on a set of capabilities included in the request. At 1220, based on the set of capabilities, access privilege(s) for the data, metadata or both are determined based on evaluating visibility through the first wrapper and independently evaluating visibility through the second wrapper. At 1230, potentially a status of the system changes, or an instruction explicitly requesting change is received. At 1240, based on the status change or instruction, the first or second wrapper are changed, deleted or augmented based on new set of criteria (QoS requirements, type of content or metadata, compliance requirements, etc.), another wrapper is generated, a wrapper is deleted or undone, a wrapper with the same or other mathematical transforms is regenerated, or policy governing first or second wrappers is changed, etc.

Many of the techniques described herein rely on a hierarchy of protection that might involve an "inner" payload that contains the actual content to be protected, and an "outer" payload that contains encrypted indexes that describe the inner data that is amenable to blind search techniques such as those referred to in the research literature as "Public Key Encryption with Keyword Search."

In practice, this reference to "inner" and "outer" could imply literal containment, where access to the "inner" payload would require unlocking the "outer" payload, or wrapper, through a technique such as decryption. However, this could also be a virtual concept where there is no actual containment, but without decoding the outer wrapper it is difficult to locate or reconstitute the inner payload.

This difficulty alluded to in the previous sentence is either due to computational complexity introduced by cryptographic techniques or other mathematical transforms, or it could be due to systems techniques that provide isolation of the inner and outer content through ownership and regions of control, or it could be a combination that leverages cryptographic dispersion techniques coupled with systems techniques that optimize dispersal and reconstitution.

There are several reasons for creating a hierarchy of wrappers in order to provide verifiable trust, some of which have been described above. These include providing selective opacity based on natural hierarchies that are observed in the real world, such as organizational hierarchies. Other reasons include the ability to combine disparate cryptographic techniques with complementary properties cryptographic or systems properties, in a manner that provides a composite that is more amenable to real world implementation.

There are many other reasons for adding or removing wrappers that address temporal or spatial events that modify the requirements for verifiable trust, but in a manner that does not require inner wrappers or payloads to remain intact.

Temporal events might include estimates or assumptions that cryptographic techniques employed for generating these wrappers may have weakened in their ability to provide guarantees due to advances in hardware, software or science. Systems might be built to embrace this failure by generating new wrappers by schedule, on demand, or other triggers, to promote longer-term provision of verifiable trust.

Spatial events might include the transfer of possession or ownership across parties that are handling the content that might have reasons for selecting disparate cryptographic techniques, perhaps for reasons that include governance, legal, regulatory compliance, and are particularly noteworthy when crossing boundaries of sovereign entities and jurisdictions. Systems might be built to embed the capabilities in the gateways, or directly into the wrappers, or in some hybrid manner, such that wrappers are materialized or vaporized based on policies that reflect the rules of the new possessors or owners.

There are techniques in the literature that attempt to provide verifiable trust that can model natural hierarchies, that include hierarchical identity-based encryption, attribute-based encryption, and predicate (or functional) encryption. There are also techniques that provide intrinsic abilities to materialize wrappers in a virtual manner through cryptographic techniques properties such as full homomorphism. In the presence of these techniques there could continue to be a need to compose through wrappers as describe above for other reasons that might range from verifiable trust, to systems.

Cryptographic reasons to compose wrappers include the need to match techniques that might compose through an inner wrapper that provides stronger guarantees or finer-grain control over access, and an outer wrapper that leaks less information to adversaries, but provides coarser-grain control and weaker guarantees. Therefore the composite provides a more optimal mix of guarantees and control.

Systems reasons might include the need to match techniques with varying properties that might include performance and scale. In such scenarios, outer wrappers could be constructed out of techniques that provide higher levels of performance and scale, albeit with some limitation in functionality, and inner wrappers with augmented or complementary functionality, presumably with lower performance and scale.

In practice, it is often the case that emerging cryptographic techniques provide increasing levels of capabilities, but at a cost of performance and scale. There is also a lack of trust in these emerging techniques that typically dissipates over time as they are analyzed, refined and standardized. Also over time, we learn to implement these techniques in steadily more efficient software or hardware methods, or a combination thereof.

Wrappers facilitate optimistic leverage of these new techniques in a manner that provides 'safety nets' where either an inner or outer wrapper is able to compensate for either known, or unknown weaknesses or deficiencies or intrinsic lack of features in techniques that implement any single wrapper. For example, an outside wrapper could provide keyword privacy and high performance, but with coarser-grain access control, or an absence thereof. This could be complemented with an inner wrapper that does not provide for keyword privacy, but delivers finer-grain access control, possibly at a higher performance and scale penalty.

It is often the case that an outer wrapper will be optimized for 'false positives' in that it is more likely to make a selection, for search, routing or workflow. This could reflect a higher, or containing hierarchy of permissions in a real-world organization. However a corresponding inner wrapper would specialize this result for an inner layer in the hierarchy. For example, an outer wrapper could net all results that would be appropriate for the Mathematics Department in a University, while an inner wrapper could filter in just the results that would be of interest to a Number Theorist.

Other reasons exist for wrappers. These include the need to provide scenario-specific verifiable trust guarantees. For example, there may exist families of scenarios where it is not important to protect against knowledge of the existence of specific keywords, possibly because the domain of these keywords is large enough to make a dictionary or keyword guessing attack computationally impractical, or because leakage of these keywords is a risk that is deemed low by that scenario.

In contrast, there could be other families of scenarios where these keywords are highly sensitive, and a data owner (or a business, social, support, or consumer network of owners) desires that the current possessor of that data (such as a server, service, cloud, or other party) perform an action without learning anything more about these keywords that they are operating upon to perform actions that include searching, and then retrieving or routing, or performing other operations.

Furthermore in many real-world families of scenarios, the content is a composite that contains components that sit in a continuum that ranges from 'highly sensitive' to 'disposable'. Typically any real-world organization reflects these disparate requirements, which are reflected in composite content that is stored, exchanged, or collaboratively operated upon.

Furthermore, in many of these collaborative scenarios, that include many extranet scenarios where businesses collaborate across organizational, regulatory compliance, sovereign entity, or other boundaries, the classification of the content being accessed by a party, would be deemed by an owner to map to a point in the continuum based on the current business or contractual relationship, or history and trust, between the owning and the accessing parties. Furthermore, this relationship and the mapping could be ephemeral, perhaps down to the grain of a specific transaction of business or social interaction.

In any foreseeable state of the cryptographic and systems art, it would appear to be impractical to design a single solution that would meet a range of requirements across scenarios that meet all the verifiable trust requirements, and also the systems requirements that would include performance and scale, and other requirements that might include those alluded to previously. This could place a high development, maintenance and operational burden on server, service, cloud and other deliveries, due to the complexity and consequent cost of delivering these solutions at scale, usually leading to higher costs of goods, which are typically transferred to end users.

Techniques that include those outlined in this disclosure are candidates for composition of solutions that are deemed optimal from a cryptographic and/or systems perspective. Such a composition might include automated composition of a hybrid service from the appropriate candidate building-block services, but this would not preclude semi-automated compositions that might include operational or engineering intervention. In these cases, the solution might leverage the ability to materialize a composite that is constructed out of wrappers that provide complementary systems, cryptographic and other features, that deliver an optimal solution to the scenario, or scenario family, but in a manner that desirably does not impose an implementation or operational tax for features or capabilities that are not required by that scenario, or scenario family.

Additional reasons for implementing wrappers include the need to mediate between the requirements, needs and policies of disparate individuals or organizations that have a legitimate need to control access to content. This is a common business scenario, where a specified set of parties have to come together to agree to unlock access to some content. An example might include a Clinical Trials family of scenarios, where content could be regulated by perhaps the FDA and HIPAA, and ownership might be shared between parties such as a Pharma Sponsor (such as Merck)

and a data owner (such as Microsoft HealthVault.) The Pharma Sponsor might exert authority due to a need to protect intellectual property generated as a consequence of the study, whereas HealthVault might exert authority due to a need to protect the anonymity and privacy of their customers that are participating in that Clinical Trial.

There are cryptographic, systems and human-assisted techniques for mediation, reconciliation and arbitration for conflict, because such conflicts often occur due to inconsistent, conflicting, or vaguely defined policies. These cryptographic techniques include ones that leverage secret sharing, and implementations include those that deploy multi-authority key, or capability generators. However these techniques do not always meet the right mix of verifiable trust, flexibility and expressiveness, or systems performance and scale. Even if there were a single technique and consequent implementation that met all the potentially disparate and conflicting requirements of the parties, it could be the case that a single implementation or deployment would not be trusted due to perhaps a lack of trust in the technology, the implementer, or the hosting party, by other participants.

In such situations, wrappers are a candidate solution, which could be complemented with other automated techniques, or supplemented through manual intervention, perhaps through electronic or manual workflow. Such a composite solution could leverage wrappers that would either provide a layer of control to a specific party, or set of parties, in a business network. That wrapper might be optionally be a technology, implementation or deployment that is trusted by the party, or set of parties in question. This wrapper might either engage in an interactive protocol with a remote cloud to perhaps implement late binding, or to support expiry or revocation, or to provide an audit log with verifiable trust. Or this wrapper might implement an offline protocol that would permit, block and/or log access in a suitable manner based on the access credentials and some accessible policy.

Other reasons for implementing verifiable trust through wrappers might include the need to manage assets or artifacts such as keys, passwords, pass phrases, certificates, or other proofs of knowledge or ownership. Typically cryptographic systems can place an additional systems burden due to a need to generate, manage, backup, archive, retain, dispose, securely shred, provide forensics for, and support servers, services and clouds for access to these artifacts in a manner that provides a required level of Service Level Agreements of availability, scalability, latencies, and data loss and recovery time caps in the presence of failures.

This is further exacerbated by the need to provide a level of trust for these servers, services or clouds. This is typically done through a hierarchy of trust, such as PKI. These systems need to be further secured so that a server, service or cloud, if compromised in any manner, is not permitted to launch attacks through perhaps impersonation and man-in-the-middle attacks.

In such situations, wrappers provide candidate solutions that can be suitably combined with remote servers, services or clouds that provide complementary capabilities, in a manner that could mitigate the systems overhead, the complexities, latencies, and WAN fragilities of interactive protocols for reasons that include access, authentication and retrieval of artifacts. In an embodiment of such a wrapper, an outer wrapper could hold the requisite artifacts for access to an inner wrapper. One of the consequences could include the elimination of the need to store and archive these artifacts since they are effectively a part of the payload, due to containment, or through effective systems engineering.

There is an opportunity to provide hybrid solutions where such a wrapper might initiate an interactive protocol with a remote server, service or cloud, to implement expiry or revocation, or to provide an audit log with verifiable trust for purposes such as auditing or forensics. The manner in which this hybrid solution is implemented could optimize the load placed on servers, services or clouds, or it could be optimized to operate in the presence of network issues.

In these and other cases, wrappers can have selected technologies, implementations and remote servers, services or clouds for optional interactive protocols, in a manner that facilitate verifiable trust in a business network. The wrappers could be designed to implement either a linear hierarchy, or a more complex structure such as a tree or a graph. These structures could either be actual containment, or they could be virtual as described previously. Such complex structures could facilitate flexible and expressive decision trees that might implement a combination of threshold participation, overrides and escrows, and perhaps exceptions and manual overrides.

There exist cryptographic techniques that could provide for equivalent capabilities through systems such as multi-authority key or capability generators. These technologies and systems can be viewed as candidates for distinct wrappers in a composite system that meets the disparate needs of participants in a business network due to all the commercial, social, political, sovereign, and other complex needs that have to be accommodated in any complex real-world network.

Such complex real-world network, ecosystems and marketplaces often grow organically from an initial set of participants, which successively grows through network effects of increasing numbers of participants. Other networks are instituted top-down, perhaps through standards or fiat. Often existing networks, perhaps grown organically, will fragment into silos due to perhaps conflict, or due to exogenous effects. Hence, it is often desirable to be able to support a "forest" of networks that have the ability to coalesce or separate, perhaps by design due to the ephemeral nature of trust being an intrinsic requirement in that network.

This disclosure and the various embodiments outline some of the many reasons for leveraging wrappers. Applications in the real world address a range of verifiable trust and systems needs, and support a universe of scenarios through suitable composition and extension based on modular concepts and building blocks, including the ones outlined above.

For ease of exposition, and for pedagogic reasons, the previous text sometimes uses certain abbreviations, or makes certain implicit or explicit assumptions that include those describe below.

Techniques that provide any form of verifiable guarantees, perhaps systems solutions that implement boundaries, regions of control, and air gaps, or cryptographic and similar techniques that rely on computationally hard problems, are collectively referred to as 'crypto', 'cryptography', 'cryptographic solutions', or other similar or equivalent phrases. However, for the avoidance of doubt, cryptographic techniques such as searchable encryption are by no means required. Any mathematical transformation, encoding, obfuscation, etc. can be used, as well as other techniques for protecting data, such as hiding the data, or fragmenting the data in a way that can't be pieced together without a reconstruction map. Operations such as signing or encryption, or techniques such as hashing, tend to be less ambiguous in common usage than other terms such as anonymity, confidentiality, integrity, privacy and non-repudiation.

Other parties in such interchanges could include participants such as an extranet or a business network for commercial scenarios. Or these could be consumer, social, support networks for individuals, friends and families. Or these could be networks of individuals or organizations that straddle distinct sovereign entities or jurisdictions. These sovereign entities or their delegates could be participants in either facilitating or participating or both, and could form their own networks such as NATO.

The method and apparatus for implementing composition through wrappers for optimizing verifiable trust in a configurable manner is simply referred to as 'wrappers'. Implementations might leverage software, hardware or other means to implement an offline protocol, which creates either a spatial or a virtual container. Other implementations might include an interactive protocol with a remote service, or some combination of offline operations and interactive protocols.

Parties that are involved in facilitating transaction, or an interactive protocol, that might include servers, services, clouds, workflow end points that might be human or automated, or other parties, are referred to as 'clouds'. Implementations of clouds might include public, private, outsourced, dedicated or multi-tenant versions.

Containerless Data for Trustworthy Computing and Data Services

Using the techniques of a trustworthy platform, data (and associated metadata) is decoupled from the containers that hold the data (e.g., file systems, databases, etc.) enabling the data to act as its own custodian through imposition of a shroud of mathematical complexity that is pierced with presented capabilities, such as keys granted by a cryptographic key generator of a trust platform as described in various embodiments. Sharing of, or access to, the data or a subset of that data is facilitated in a manner that preserves and extends trust without the need for particular containers for enforcement. The mathematical complexities, such as searchable encryption techniques, applied to the data protect the data without regard to the container or hardware in which the particular bits are recorded, i.e., the data is protected containerlessly or without regard to the container and is thus not subject to attack on the basis of a compromise of container security. If the particular "safe" is cracked, the contents are still protected.

Figure 13:
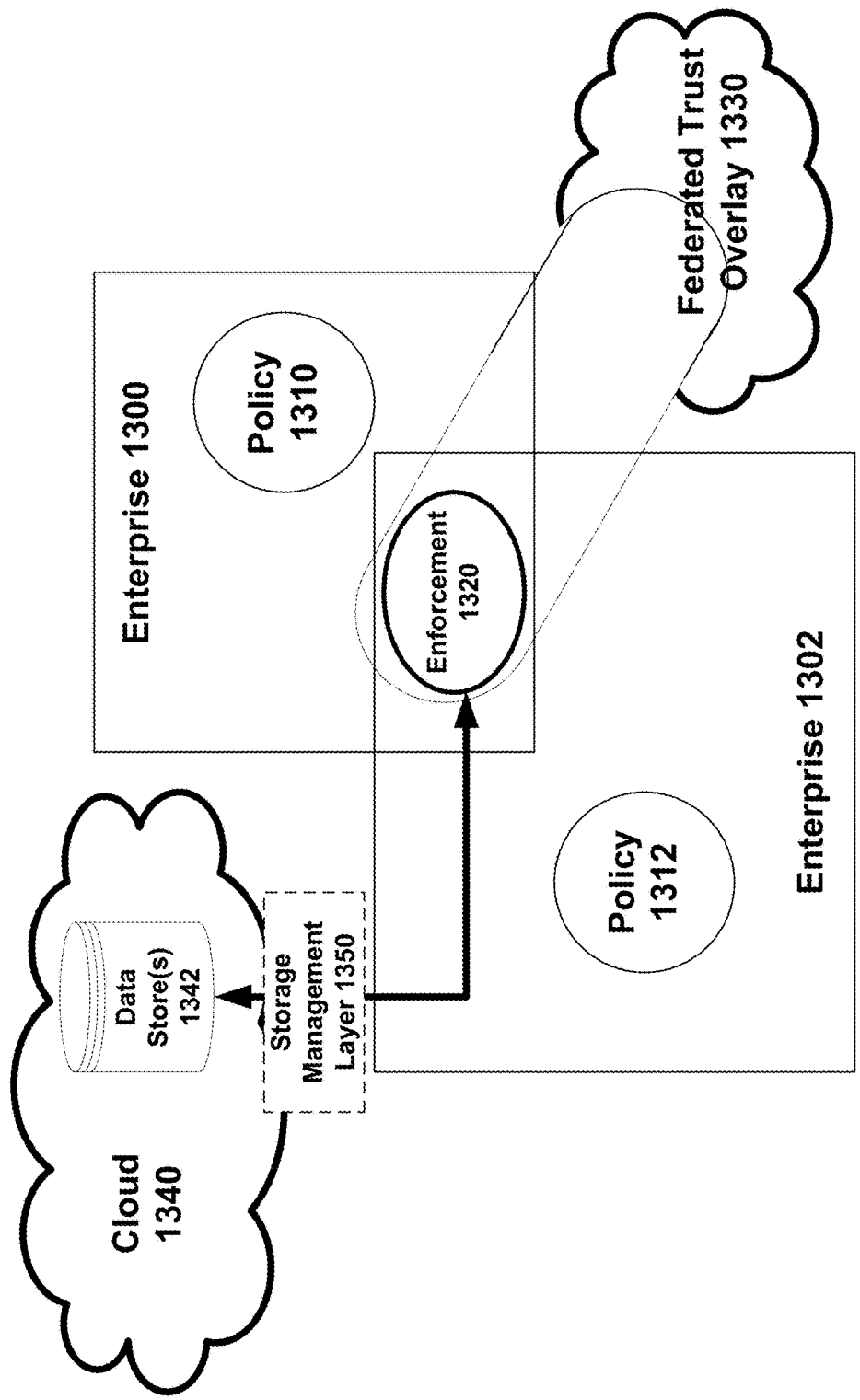
FIG. 13 is a block diagram of a general environment for providing one or more embodiments of secure, private and selectively accessible network data services.

FIG. 13 is a block diagram of a general environment for providing one or more embodiments of secure, private and selectively accessible network data services as described herein. For illustrative purposes, multiple enterprises 1300, 1302 are illustrated, though the techniques are applicable to a single enterprise or many collaborative enterprises too. In various embodiments, using a federated trust overlay 1330 as described in more detail below, enforcement 1320 of policy 1310 of enterprise 1300 and policy 1312 of enterprise 1302 can be shared based on the FTO infrastructure 1330 for collaborative efforts. Enforcement 1320 can also be applied separately by each enterprise 1300, 1302. In this regard, since policy and enforcement are entirely within the province of the enterprises 1300, 1302 as based on trust overlay 1330, the location of the actual data in cloud 1340 and what particular containers 1342 are used become irrelevant from the customer standpoint, except with respect to what the customer actually cares about: latency, reliability, quality of service guarantees, backup, time to retrieval, size guarantees, etc.

Accordingly, in recognition of the freeing of data from the containers that hold data by the trust overlay 1330, in various embodiments, a data storage management layer 1350 automatically takes care of what the customer cares about based on an analysis of real-time availability of storage resources and their respective characteristics in order to optimize data storage in containers that suit the customers need and wants. Storage management layer 1350 is dashed indicating that its location is not critical either. The storage management layer 1350 normally has no cryptographic privileges to access, view or change the data stored in one or more data store(s) 1342, however, it may be desirable to expose some of the metadata, such as file size or file type, in order to facilitate an understanding of how the customer will want to use the data in the future so that the storage management layer 1350 can make intelligent storage choices. For instance, the storage management layer 1350 can maintain video in a media store that meets the requirements for streaming media if it is given enough of a view over the data to understand that the data is video.

Figure 14:
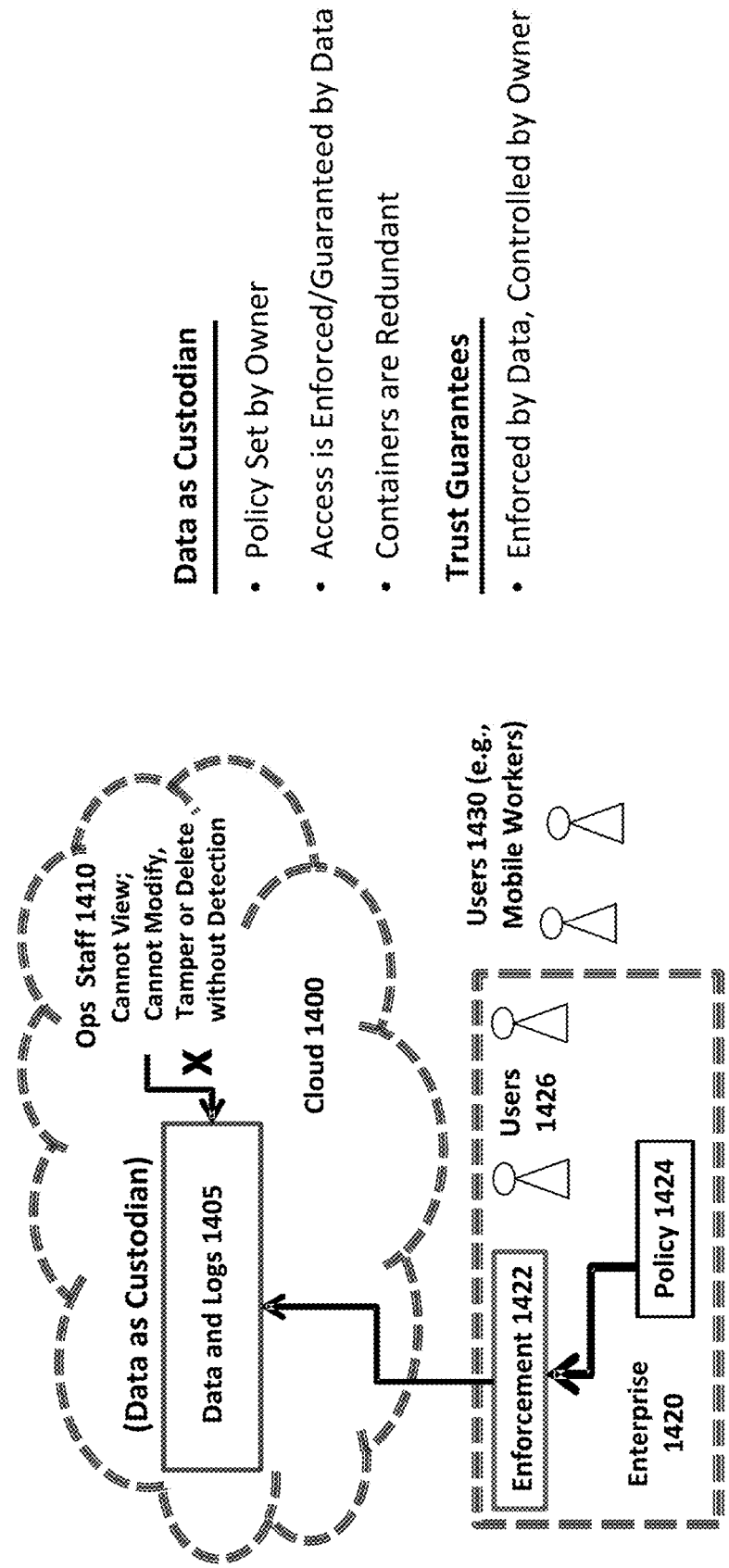
FIG. 14 is a block diagram illustrating one or more aspects of "data as its own custodian"

FIG. 14 is a block diagram illustrating a general "data as its own custodian" concept. With policy and enforcement within the control of users or an enterprise, data and corresponding logs are encrypted and accessible only with specific capabilities granted to a user as described in more detail below. For instance, normally, someone with no capabilities such as operations staff of the cloud storage provider cannot view, modify, tamper with or delete without detection since they do not have data privileges. With data as its own custodian, policy is set by the owner/publisher of the data, access is enforced/guaranteed by the data itself wherever it is stored, making container choices superfluous. Trust guarantees are enforced by the data, but controlled by the owner/publisher by describing what subscribers/customers can do with respect to the data.

As shown, in a non-limiting embodiment, an enterprise 1420 "owns" its policy 1424 and enforcement 1422 of the policy 1424 with respect to users 1426 and their use of system resources of the enterprise 1420 as well as with respect to external users 1430 (e.g., mobile workers). With data as its own custodian, the actual data and/or logs 1405 can be separated from policy 1424 and enforcement 1422 by storing the data in cloud 1400, however, the operations staff 1410 of the cloud 1400 are unable to view, modify, tamper or delete the data and/or logs 1405 without detection.

Figure 15:
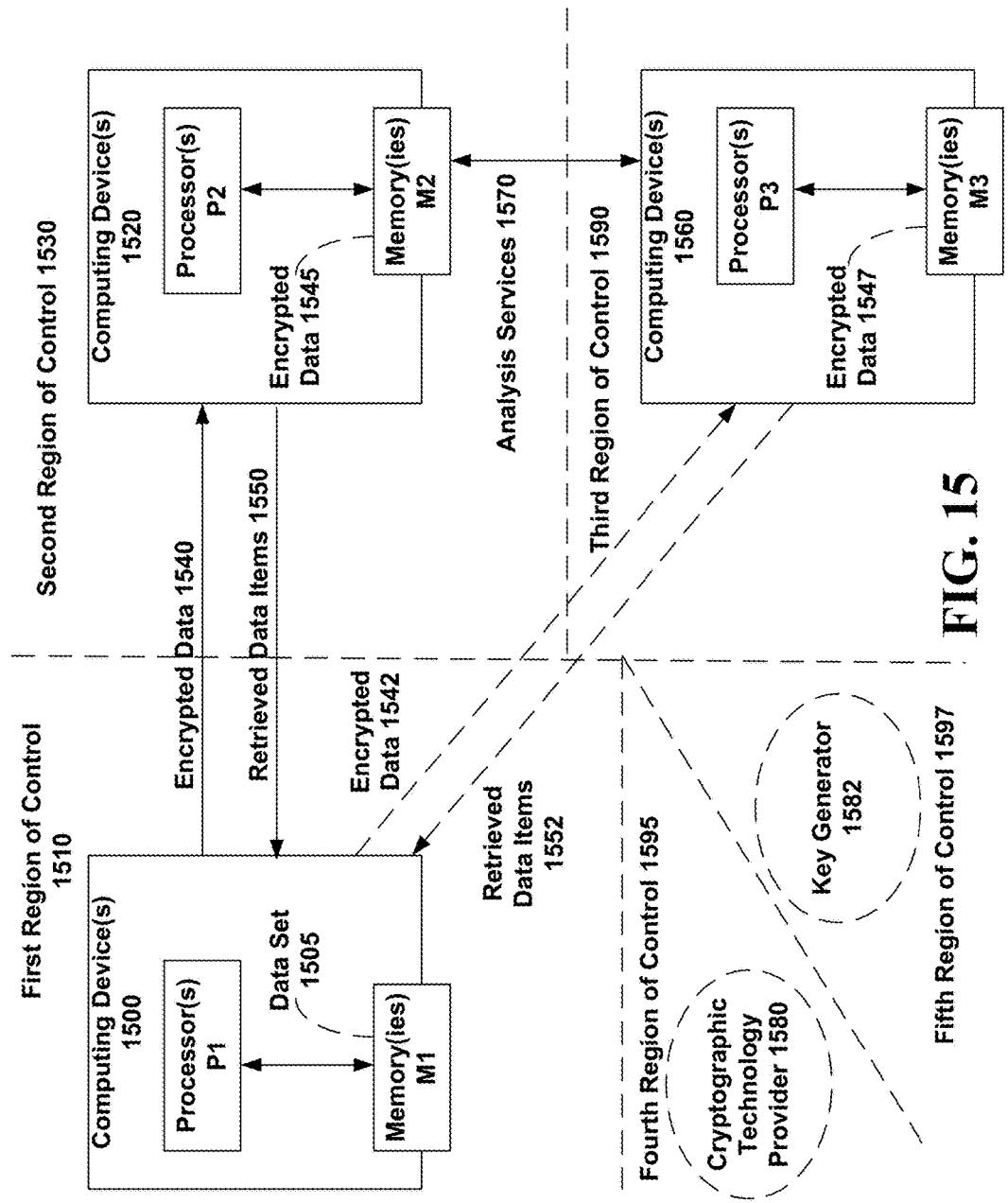
FIG. 15 is a block diagram of a general environment for providing one or more embodiments of secure, private and selectively accessible network data services.

FIG. 15 is a block diagram of a general environment for providing one or more embodiments of secure, private and selectively accessible network data services as described herein. In general, illustrating a non-limiting example of distributing trust using a federated trust overlay, computing device(s) 1500 (e.g., customers) are in a first region of control 1510, computing device(s) 1520 (e.g., the cloud service providers) are in a second region of control 1530, computing device(s) 1560 are in a third region of control 1590, cryptographic technology provider 1580 is provided within a fourth region of control 1595 and key generator 1582 can be provided in a fifth region of control 1597. Each of the computing device(s) 1500, 1520, 1560 may include processor(s) P1, P2, P3, respectively and storage M1, M2, M3, respectively. In this regard, as described in accordance with various non-limiting embodiments, techniques for enabling encrypted data 1540 in the cloud are provided so that items 1550, or parts of items, can be selectively retrieved from the cloud based on access privileges. In this regard, a set of analytical services 1570 can be provided as a layer on top of encrypted data 1545, 1547 to be stored, which automatically determines where to optimally store the encrypted data 1540 or encrypted data 1542 that is maintained in the cloud based on the local data set 1505 from device(s) 1500. In this regard, services 1570 ensure that when the data is retrieved by computing devices 1500 based on the CTP 1580/CKG 1582 federated trust overlay, the retrieved data 1552 or retrieved data 1550 are retrieved from optimal containers for the given request, or if sub-optimal, the containers are automatically switched. For instance, if a current container from computing devices 1560 is operating poorly for a customer's needs or if the customer's needs change, the analytic storage services 1570 can move or copy the data in real-time to another storage container and seamlessly switchover services to more suitable containers, e.g., for meeting quality of service requirements.

Figure 16:
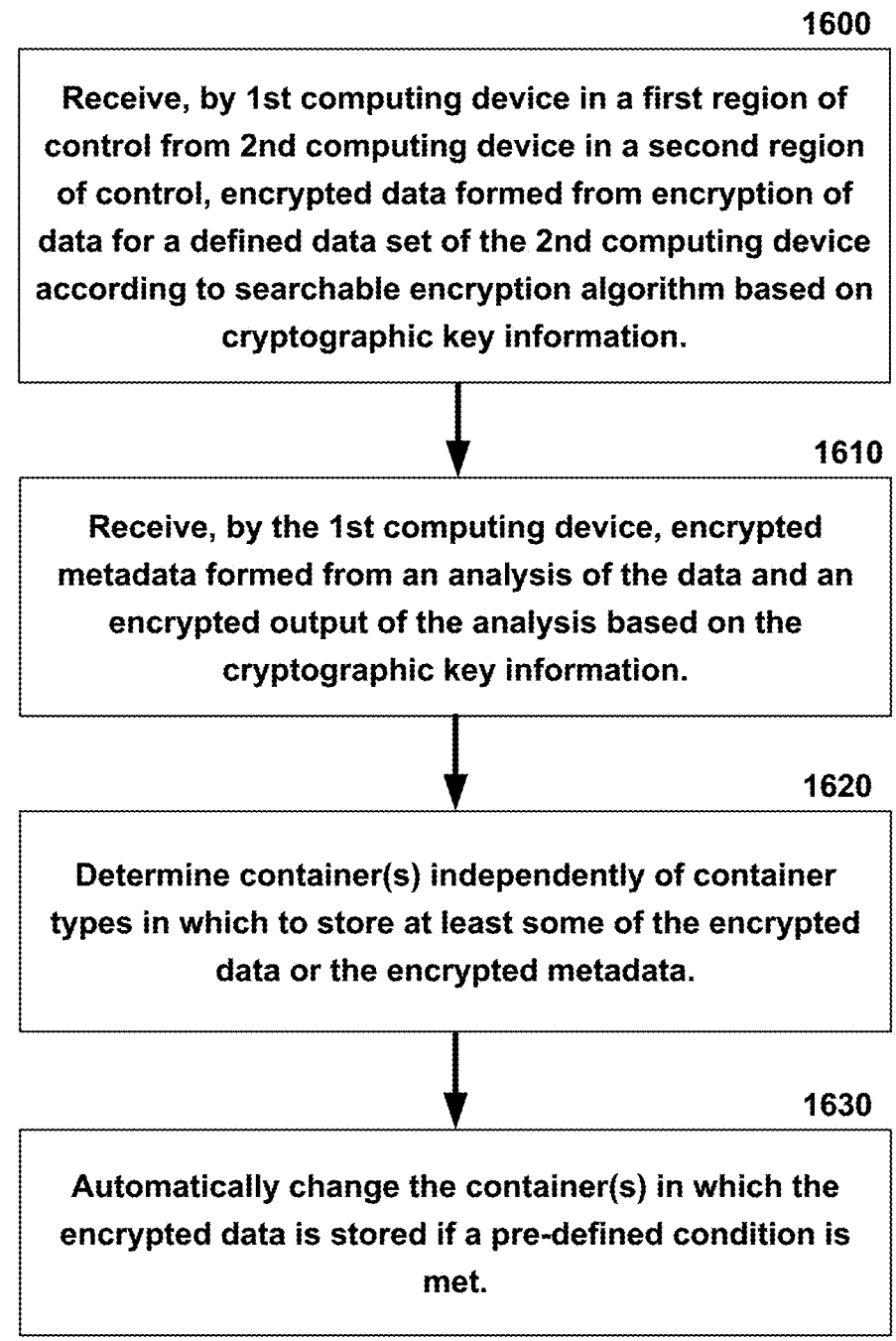
FIG. 16 is a flow diagram of a process for managing containers where data acts as its own custodian.

FIG. 16 is a flow diagram of a process for managing containers where data acts as its own custodian as described herein. At 1600, encrypted data is received by 1st computing device in a first region of control from 2nd computing device in a second region of control. The encrypted data is formed from encryption of data for a defined data set of a 2nd computing device according to searchable encryption algorithm based on cryptographic key information. At 1610, encrypted metadata is also received which is formed from an analysis of the data and an encrypted output of the analysis based on the cryptographic key information. At 1620, which container(s) to store at least some of the encrypted data or the encrypted metadata is determined. At 1630, the container(s) in which the encrypted data is stored can be automatically changed if a pre-defined condition is met.

Figure 17:
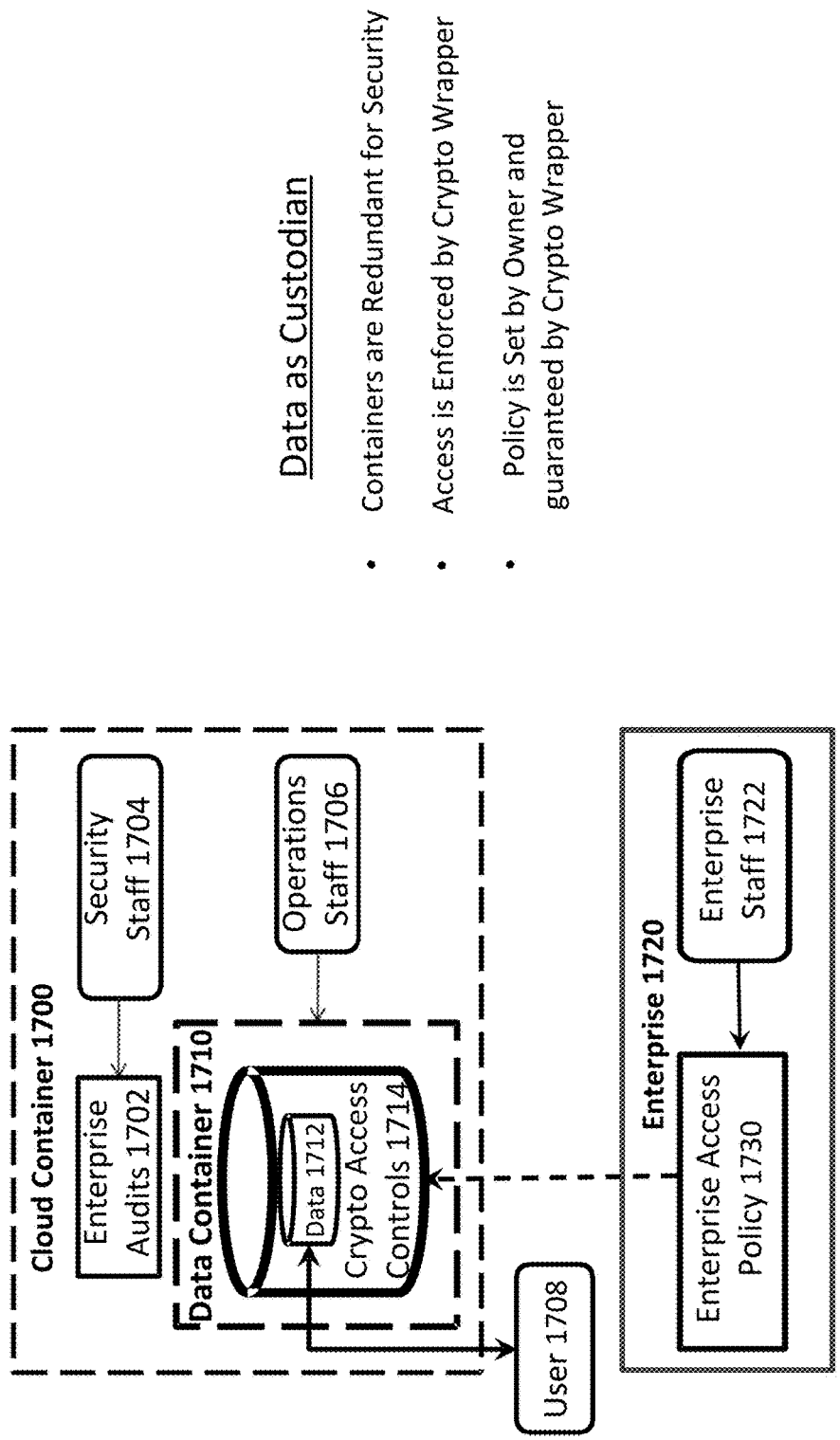
FIG. 17 is another block diagram illustrating one or more aspects of data acting as its own custodian.

FIG. 17 is another block diagram illustrating one or more aspects of data acting as its own custodian. In this regard, containers are redundant for security, access is enforced by a cryptographic wrapper and policy is set by the owner/publisher and guaranteed by the cryptographic wrapper. The wrapper can include a variety of cryptographic techniques depending on the specific security needs of the situation, as described in various embodiments below. For instance, as illustrated policy is set at the enterprise level, and then users seek access to data, which is wrapped by crypto access controls that either allow or deny entry. Other users such as enterprise auditors, security staff, operations staff, etc. may or may not have access privileges defined by the wrapper depending on the policy set at the enterprise.

As shown in the example of FIG. 17, an enterprise 1720 has enterprise staff 1722 that can are subject to enterprise access policy 1730, and some of whom enterprise staff 1722 can set enterprise access policy 1730. Enterprise access policy 1730 can affect how data 1712 stored in a data container 1710 of a cloud container 1700 can be accessed, manipulated, retrieved, searched, etc. Accordingly, when users 1708 of data 1712 attempt to access such data 1712, various crypto access controls 1714 guided by, but separated from, enterprise access policy 1730 protect the data 1712 from unwarranted access by users 1708. Different enterprise access policy 1730 can be reflected by the crypto access controls 1714 of data container 1710 to apply to different accessing entities or tasks, such as enterprise audits 1702 performed by security staff 1704, or cloud operations staff 1706, to ensure that visibility is restricted to those to whom access should be enabled. Data containers 1710 can be located anywhere and made redundant for security, and access is enforced by the crypto access controls 1714. In this regard, enterprise access policy 1730 can be set by the enterprise owners and guaranteed by the crypto wrapper as implemented by the crypto access controls 1714.

Figure 18:
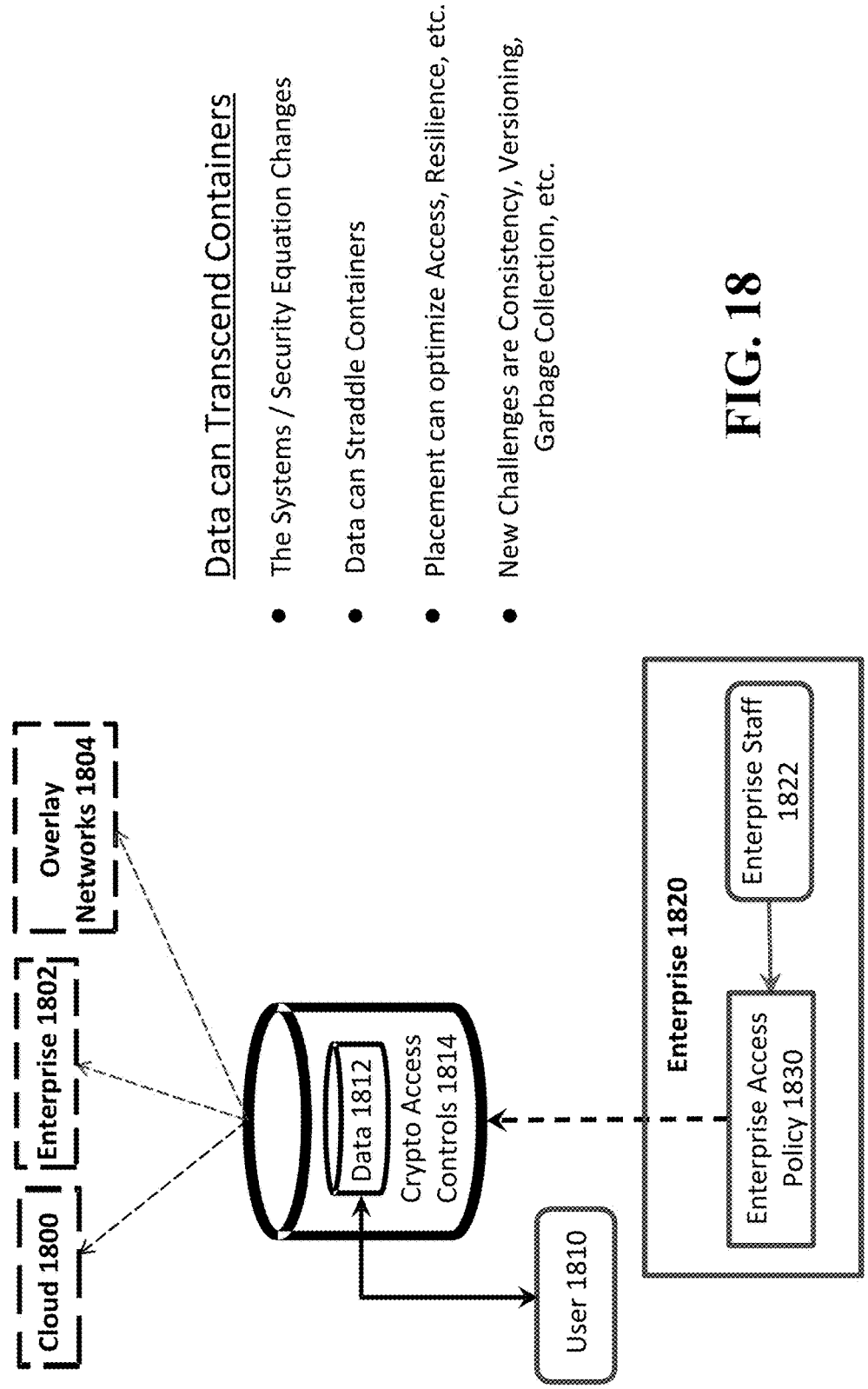
FIG. 18 is another block diagram illustrating aspects of data as its own custodian illustrating that data can transcend conventional container security models.

FIG. 18 is another block diagram illustrating aspects of data as its own custodian illustrating that data can transcend conventional container security models. In this regard, as recognized herein, data can not only be located anywhere, it can be spliced or divided to straddle multiple containers in a way that is optimal for a given situation. Placement can optimize, access, resilience, etc. and a storage management layer can handle consistency, versioning, garbage collection, etc.

As shown in FIG. 18, an enterprise 1820 defines its enterprise access policy 1830 applicable to enterprise staff 1822, while data 1812 is stored remotely and protected by cryptographic access controls 1814 applicable to users 1810 wishing to access data 1812. The system and users 1810 are agnostic whether containers storing data 1812 are stored in a cloud 1800, somewhere at the enterprise 1802, or stored via overlay networks 1804, or combinations thereof, and data can straddle containers.

Figure 19:
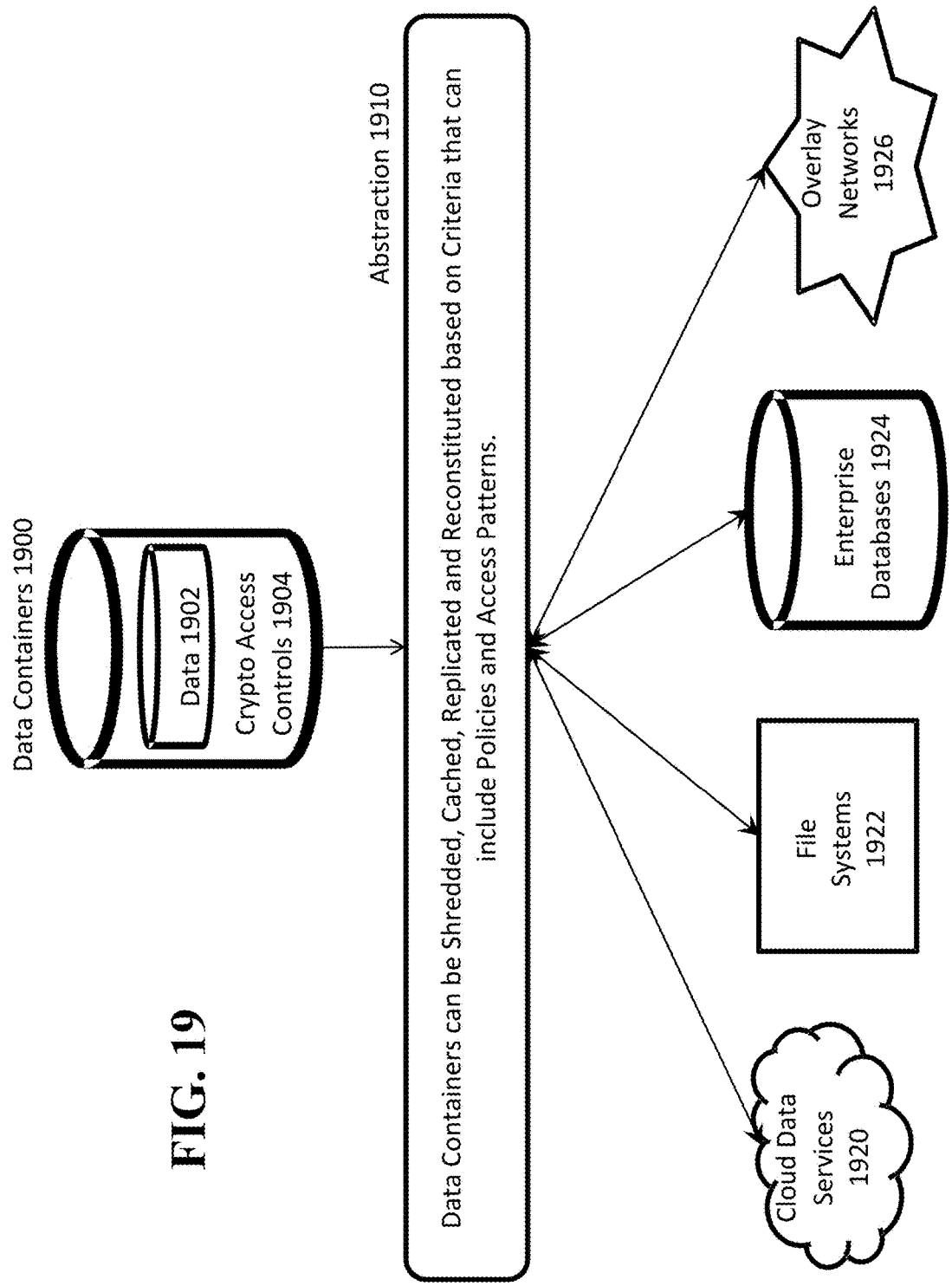
FIG. 19 illustrates a storage management layer that performs such functions as automatic shredding, caching, replication, reconstitution of data from multiple data containers of disparate types.

FIG. 19 illustrates a storage management layer that performs such functions as automatic shredding, caching, replication, reconstitution of data from multiple data containers of disparate types. Such processes can be performed based on criteria including explicit policies and access patterns. As shown, data containers 1900 including data 1902 and crypto access controls 1904, from the users standpoint, are stored at an abstraction storage layer 1910 for storing all data, however, in reality, the data 1902 as protected by the crypto access controls 1904 can be shredded, cached, replicated and reconstituted based on criteria, which can include policies and access patters, across any one or more of cloud data services 1920, files sytems, 1922, enterprise databases 1924, overlay networks 1926, etc.

Figure 20:
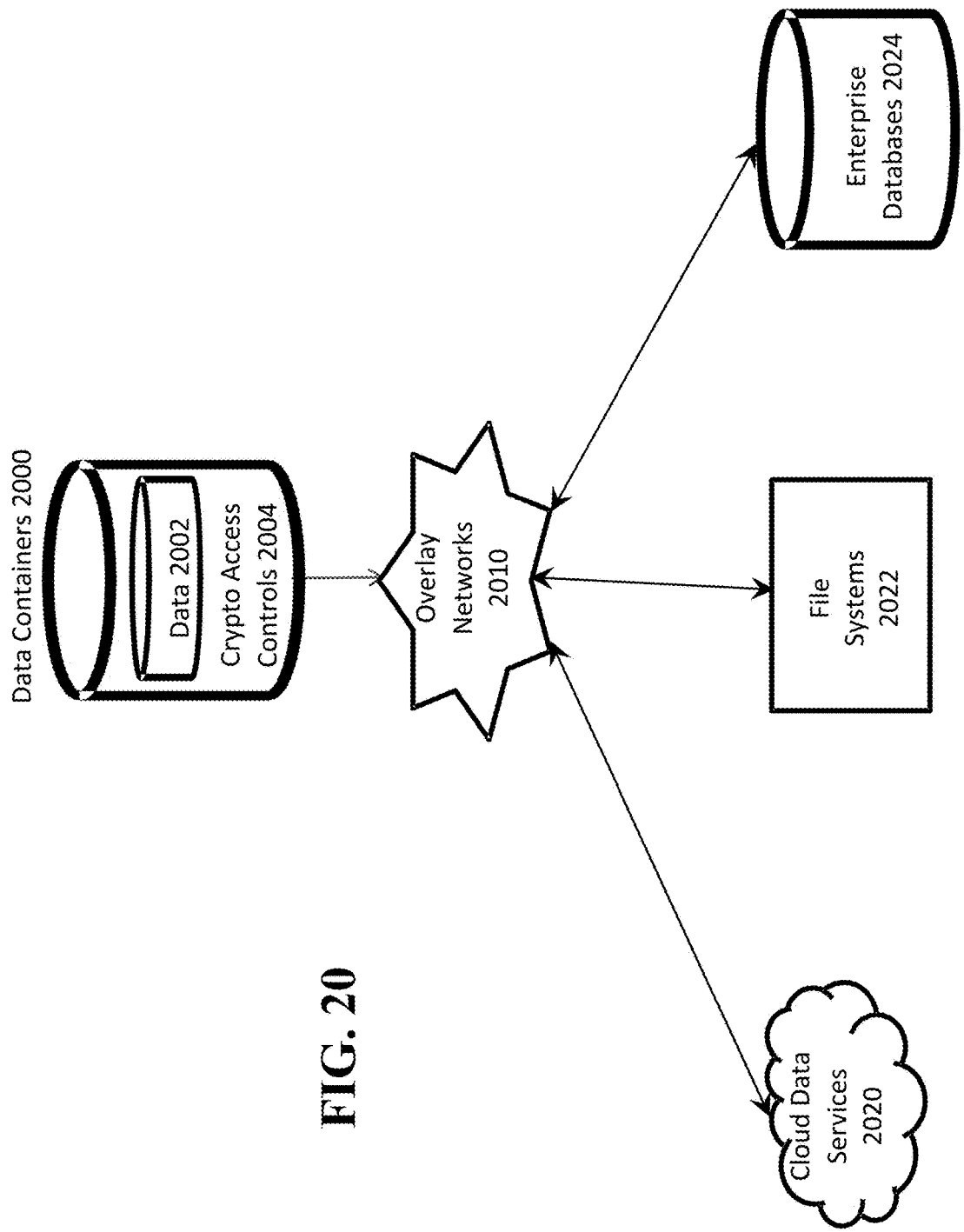
FIG. 20 is a block diagram illustrating secure overlay networks that add the cryptographic access wrapper to data wherever it is stored across various data containers.

FIG. 20 illustrates more generally that the pivot point for security, privacy, reliability, etc., enabling data to act as its own custodian, is the secure overlay networks that add the cryptographic access wrapper to data wherever it is stored across various data containers. Specifically, overlay networks 2010 can be an intermediate storage medium for further storage of containers 2000 of data 2002 as protected by crypto access controls 2004 in any one or more of cloud data services 2020, file systems 2022, or enterprise databases 2024. Storage can thus be hierarchical in terms of its ultimate destination.

Figure 21:
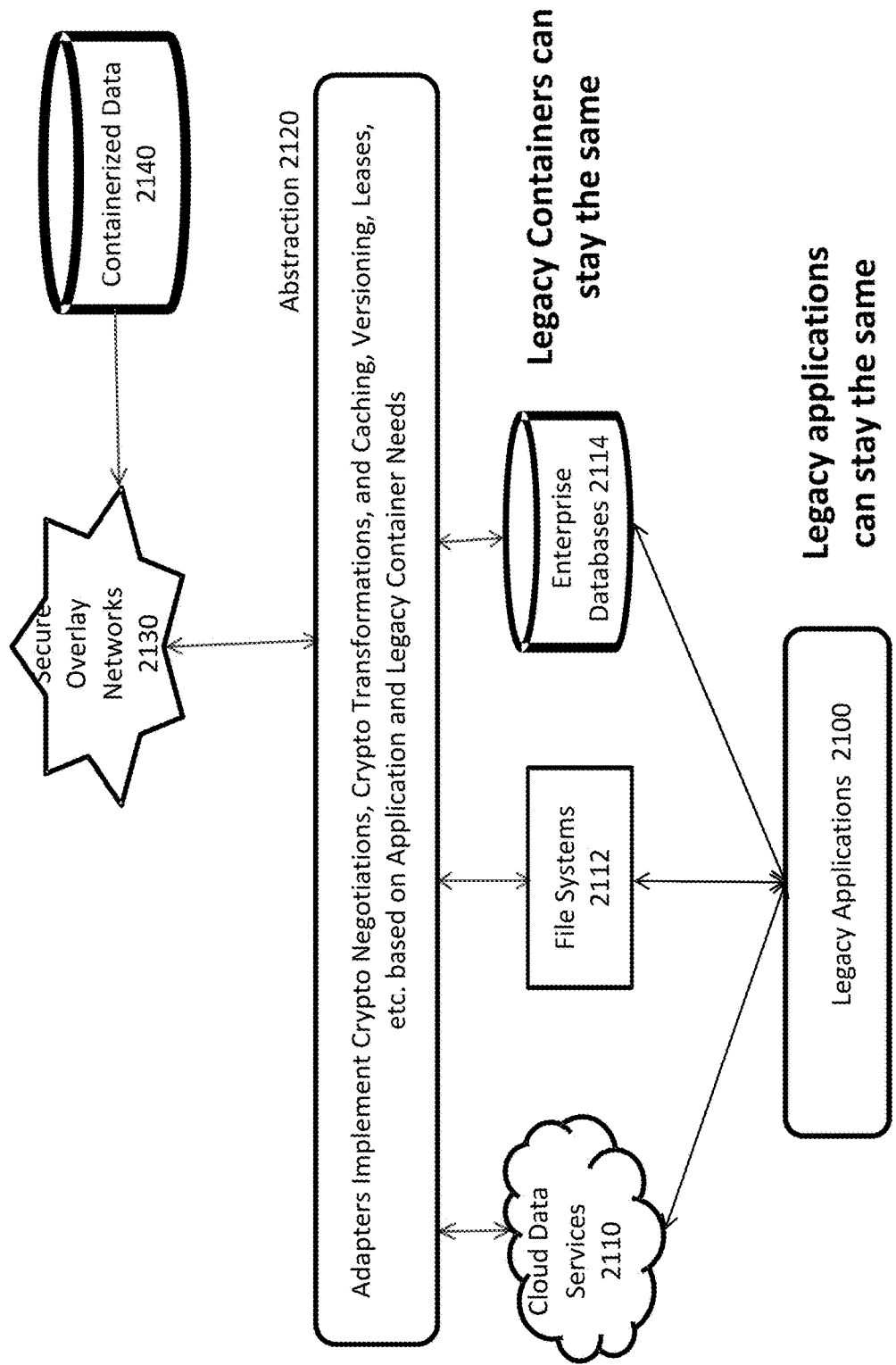
FIG. 21 is a block diagram illustrating an aspect relating to legacy applications.

FIG. 21 is a block diagram illustrating that legacy applications and their container based views of the world (e.g., database files) do not need to change. Rather, for use in a federated trust overlay storage scenario, adapters can be provided that perform the cryptographic negotiations, cryptographic transformations and caching, versioning, leasing, etc. based on application and legacy container needs. More specifically, legacy applications 2100 can interact with cloud data services 2110, file systems 2112 and enterprise databases 2114 just the same as always, however, then the abstraction storage layer 2120 can still make containerless data happen behind the scenes. The abstraction storage layer 2120 can expose adapters that implement crypto negotiations, crypto transformations, and caching, versioning, leasing, etc. based on application and legacy container characteristics, and then shepherd the containerized data 2140 to containerless data, e.g., via secure overlay networks 2130 as described in connections with FIG. 20, for instance.

Figure 22:
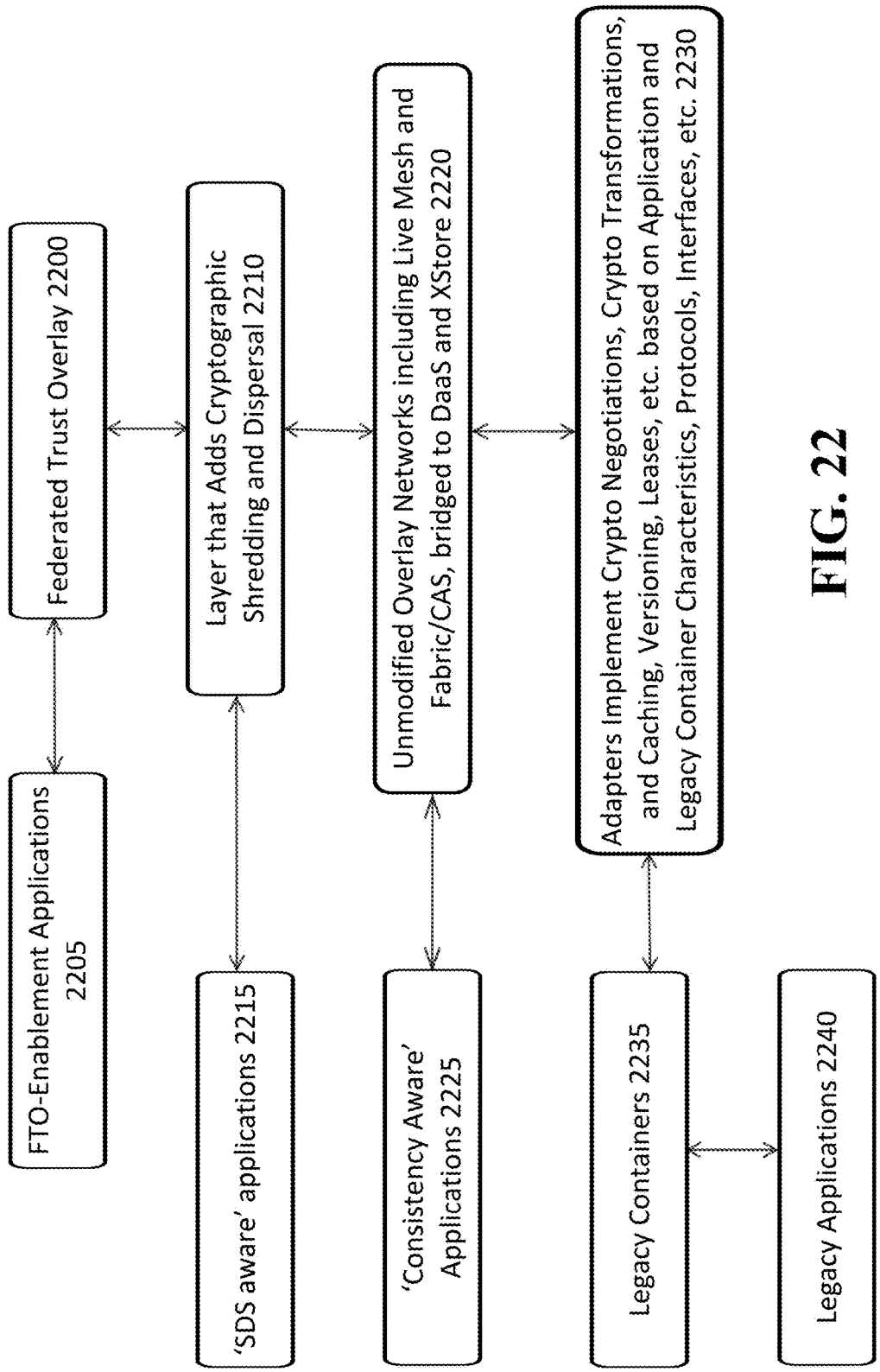
FIG. 22 is a sample architectural model that can be used in connection with legacy applications as well as FTO aware applications.

FIG. 22 is a sample architectural model that can be used in connection with legacy applications as well as FTO aware applications. In this regard, FTO-enabled applications 2205 can plug directly into the FTO 2200 and advantageously make use of the secure and private storage, processing, etc. of data. For SDS aware applications 2215, a layer 2210 can be provided that adds cryptographic shredding and dispersal of data. For consistency aware applications 2225, existing, unmodified overlay networks can be used and bridged to the system as shown by layer 2220. For example, Live Mesh, Fabric/CAS can be bridged to DaaS and XStore via layer 2220. Lastly, as described with FIG. 21, adapters 2230 can be provided that perform the cryptographic negotiations, cryptographic transformations and caching, versioning, leasing, etc. based on legacy application 2240 and legacy container 2235 characteristics. Together, such layers and applications can take advantage of the benefits offered by cloud storage based on a federated trust overlay.

Figure 23:
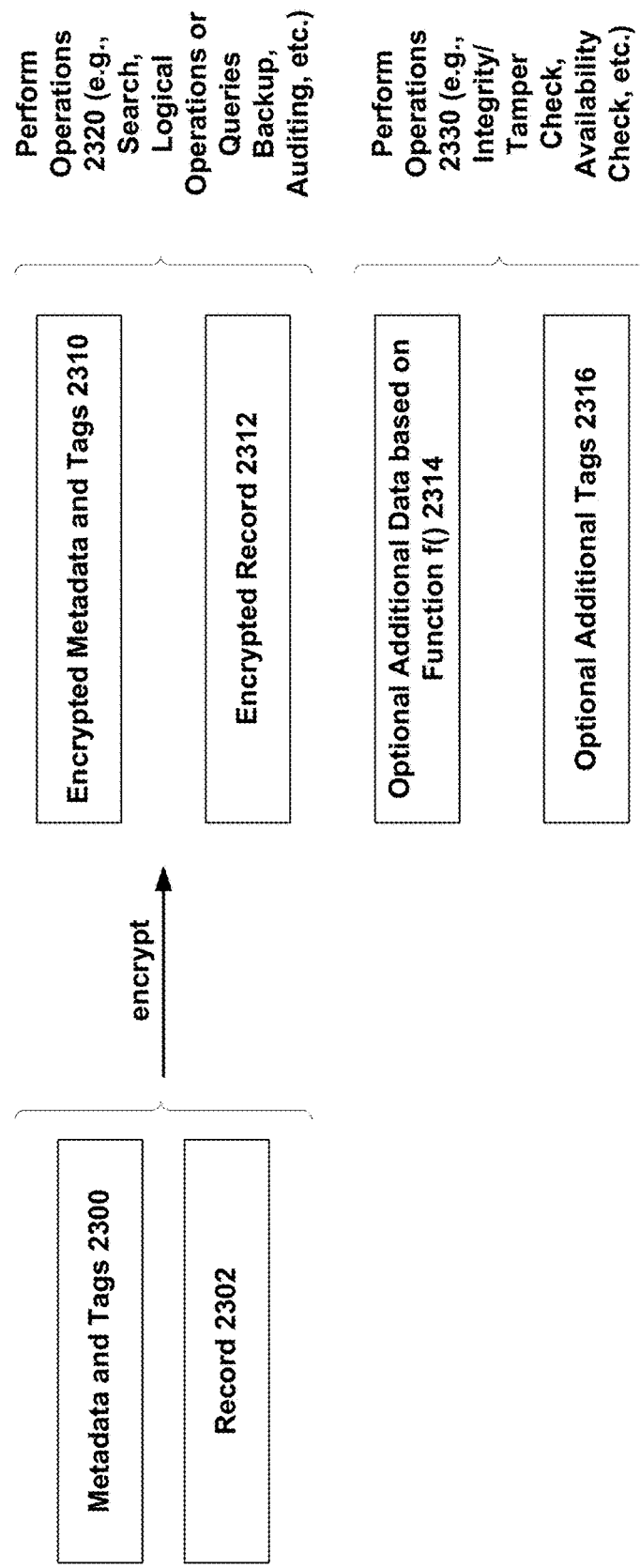
FIG. 23 is a block diagram illustrating general use of a cryptographic wrapper or envelope on data and/or metadata describing the data or a characteristic of the data.

FIG. 23 is a block diagram illustrating general use of a cryptographic wrapper or envelope on data and/or metadata describing the data or a characteristic of the data. As an example, a record 2302 (e.g., data payload) and associated metadata and/or tags 2300 can be encrypted together or separately in a mathematically selectively accessible way to produce encrypted metadata and tags 2310 and encrypted record 2312. With such encrypted data/metadata, various operations 2320 can be performed based on the mathematical selective accessibility, e.g., search of the data or metadata, logical operations over the data or metadata, queries, backup operations, auditing of the data, etc. In addition to encrypting the metadata 2300 and record 2302, optional additional data can be added to the encryption package as a function of any desirable goal 2314 or optional additional tags 2316 can be added to content as part of the encryption process, e.g., public or secret tags that either allow or disallow access to a certain class of users as an example. With such additional data 2314 or tags 2316, additional operations 2330 can be performed such as integrity check, tamper check, availability check, etc.

Figure 24:
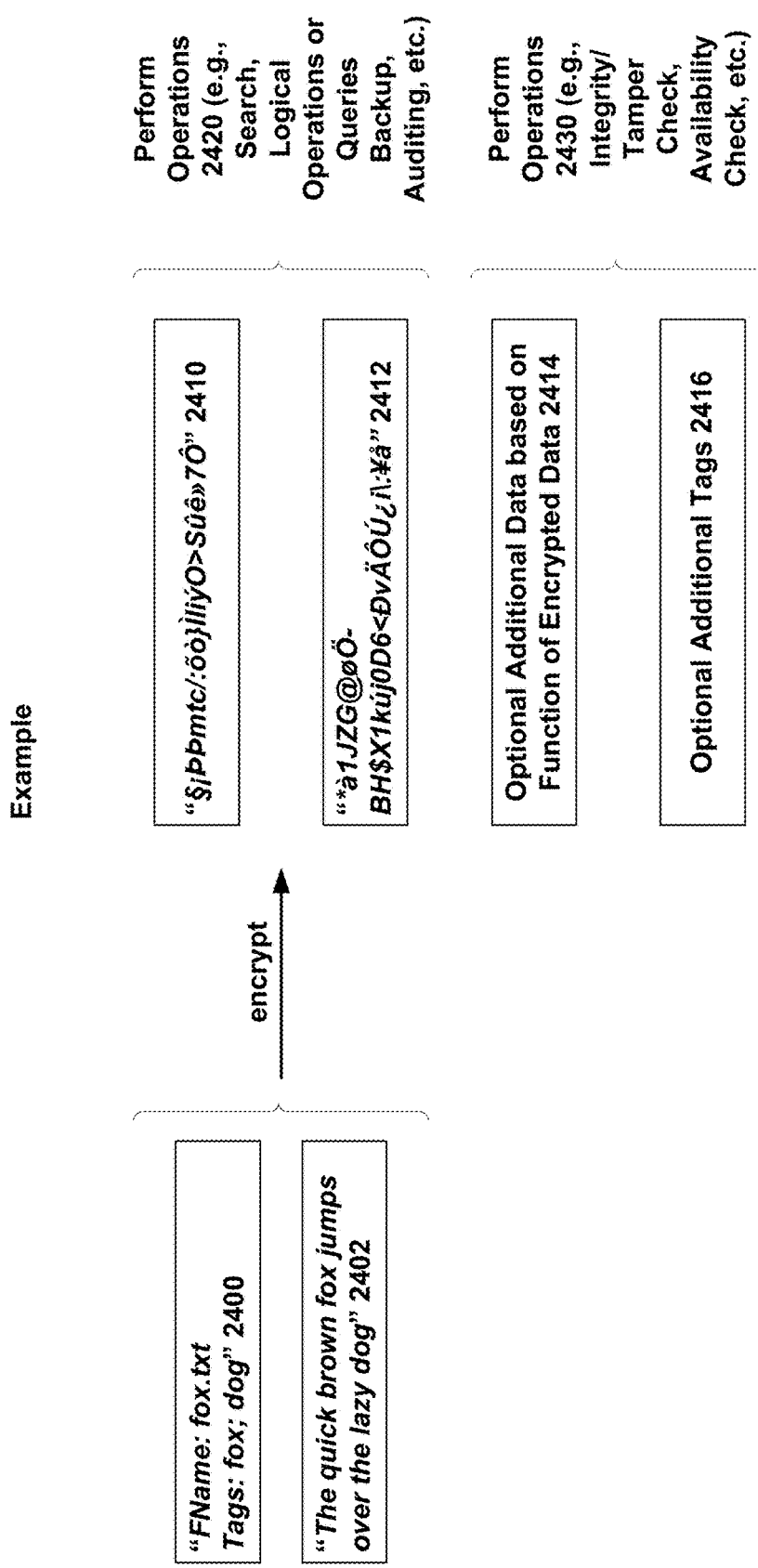
FIG. 24 is a particular example further highlighting the concepts presented generally in FIG. 23.

FIG. 24 is a particular example showing payload 2402 and tags 2400, which are encrypted to form encrypted tags 2410 and encrypted data 2412 for operations 2420. In addition, as mentioned, the data can be augmented with data 2414 and the tags can be augmented with tags 2416 which facilitate an additional set of operations 2430.

Figure 25:
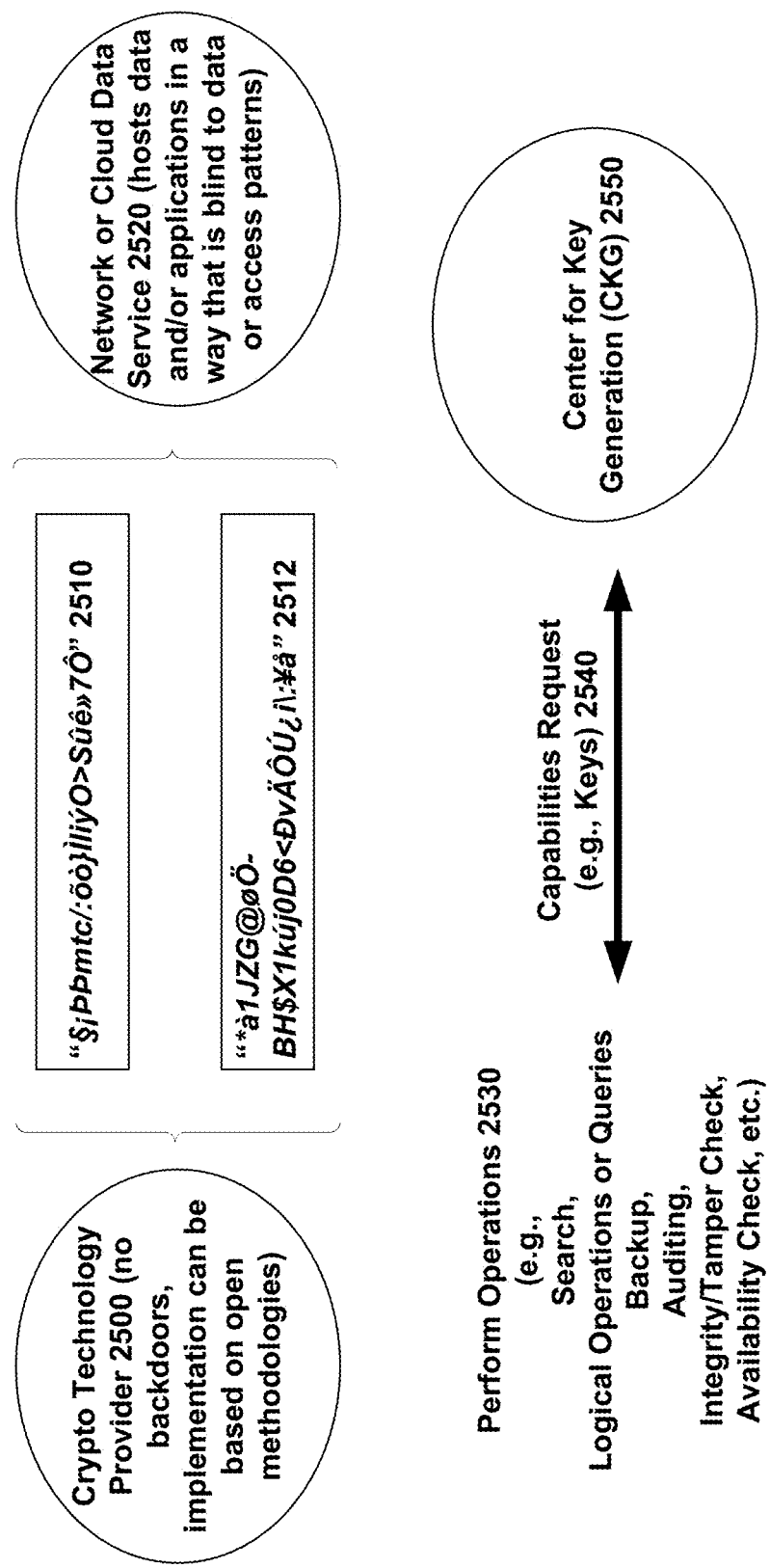
FIG. 25 is another example illustrating the federated trust overlay surrounding the protected data.

Building on the example of FIG. 24, FIG. 25 is an example illustrating the surrounding federated trust overlay. In this regard, a CTP 2500 with no backdoors can be implemented based on open methodologies subject to public inspection of robustness. Based on CTP 2500, a CKG 2550 can be spawned for handling requests for capabilities, e.g., keys 2540, for performing operations 2530 (e.g., search, logical operations or queries, backup, auditing, tamper check, integrity check, availability check, etc.). Cloud data service provider 2520 thus provides service, e.g., storage of the encrypted metadata 2510 and encrypted data 2512. In one optional embodiment, the cloud hosts the data in a way that is blind to data or access patterns.

Figure 26:
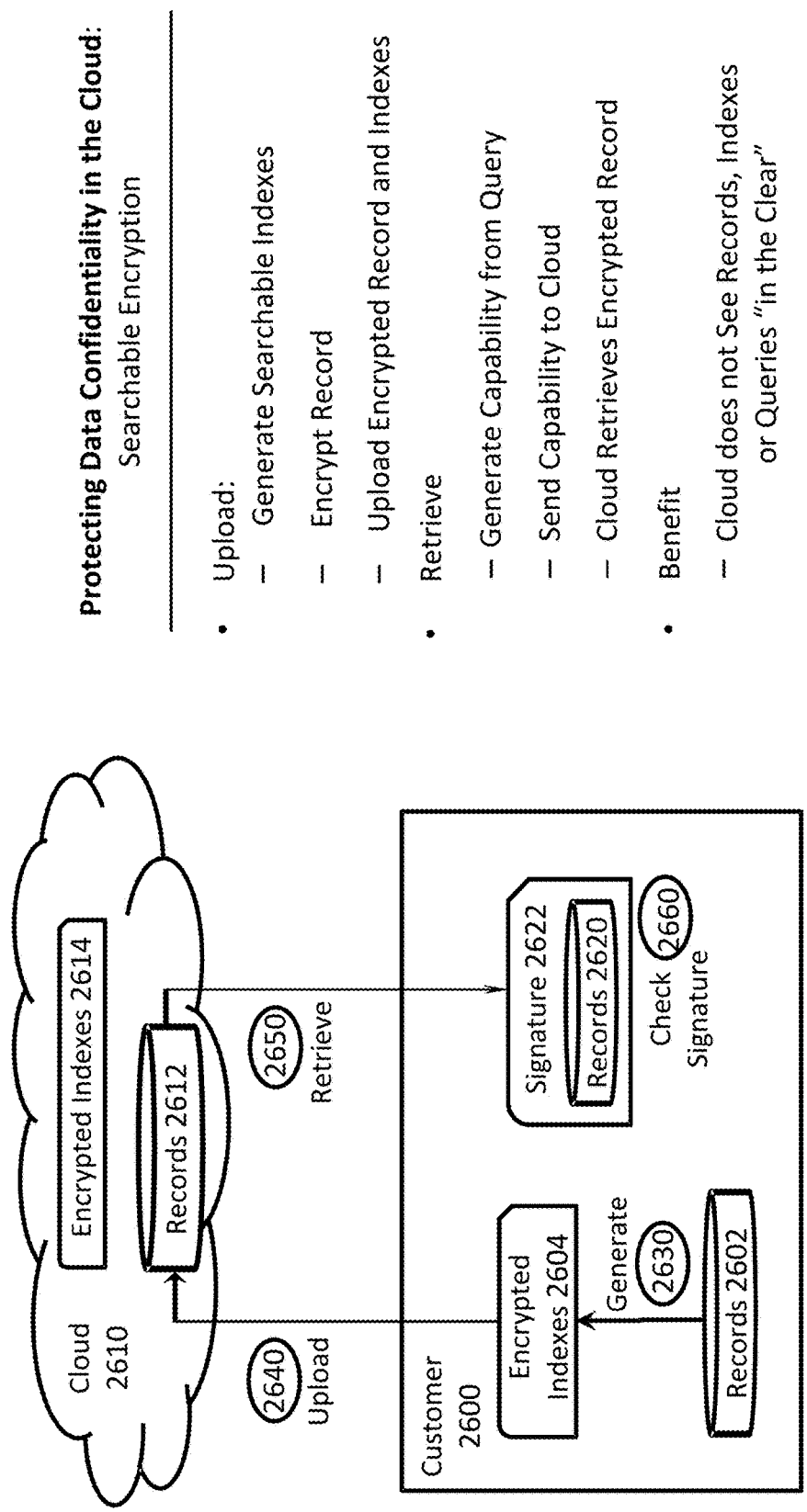
FIG. 26 is a block diagram illustrating an embodiment in which records as well as indexes are encrypted and uploaded to the cloud using a trust overlay.

FIG. 26 is a block diagram illustrating an embodiment in which records as well as indexes are encrypted and uploaded to the cloud using a trust overlay. In this regard, the records and indexes are searchably encrypted such that the indexes can be selectively accessed as a first layer of visibility into the associated data. Then, based on a search of the indexes, various content or records can be identified matching a given index or indexes and then the user can either access the matching content or records based on privileges or not, operating as a second layer of protection over the data—first over access to the indexes for search or other operations, and second over access to the data. In this regard, any number of layered cryptographic wrappers can be applied over different portions of the data and associated metadata. As shown, a customer 2600 may have various records 2602 from which at 2630, encrypted indexes 2604 are generated. The records 2602 and encrypted indexes 2604 are uploaded at 2640 to cloud 2610 and stored in the cloud 2610 as records 2612 and encrypted indexes 2614. To retrieve the records 2612, e.g., based on the encrypted indexes 2614, at 2650, the customer 2600 receives records 2620 signed with at least one signature 2622 from the cloud 2610, and at 2660, the at least one signature 2622 can be checked.

Figure 27:
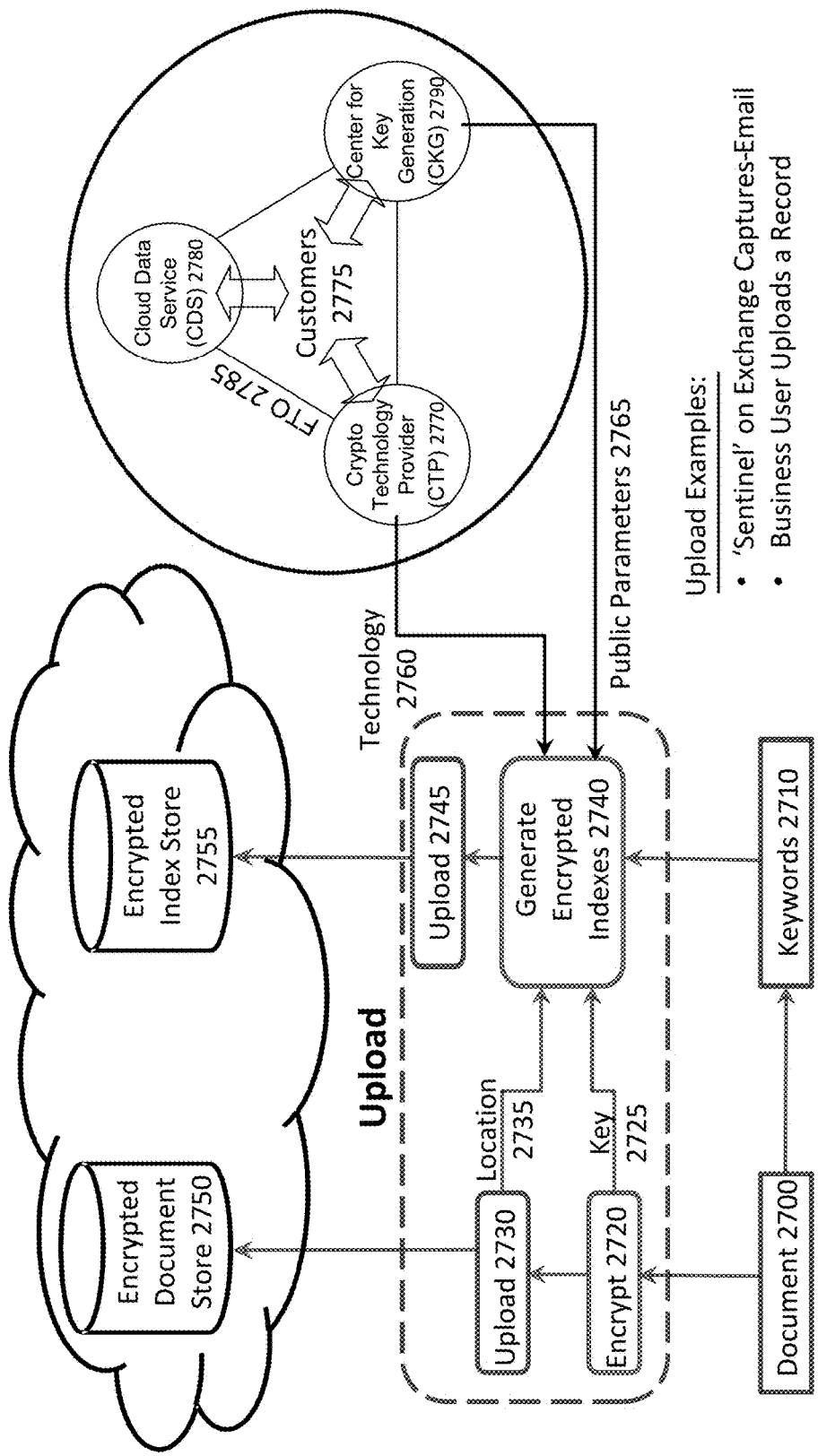
FIG. 27 illustrates how the client can make use of a federated trust overlay architecture to generate, upload and/or search encrypted indexes on top of encrypted data for richer cloud storage experiences.

FIG. 27 illustrates how the client can make use of a federated trust overlay architecture to generate and uploaded encrypted indexes on top of encrypted data for richer cloud storage experiences. The federated trust overlay architecture involves separation of powers to generate a trustworthy cryptographic ecosystem and is described in more detail below.

Figure 28:
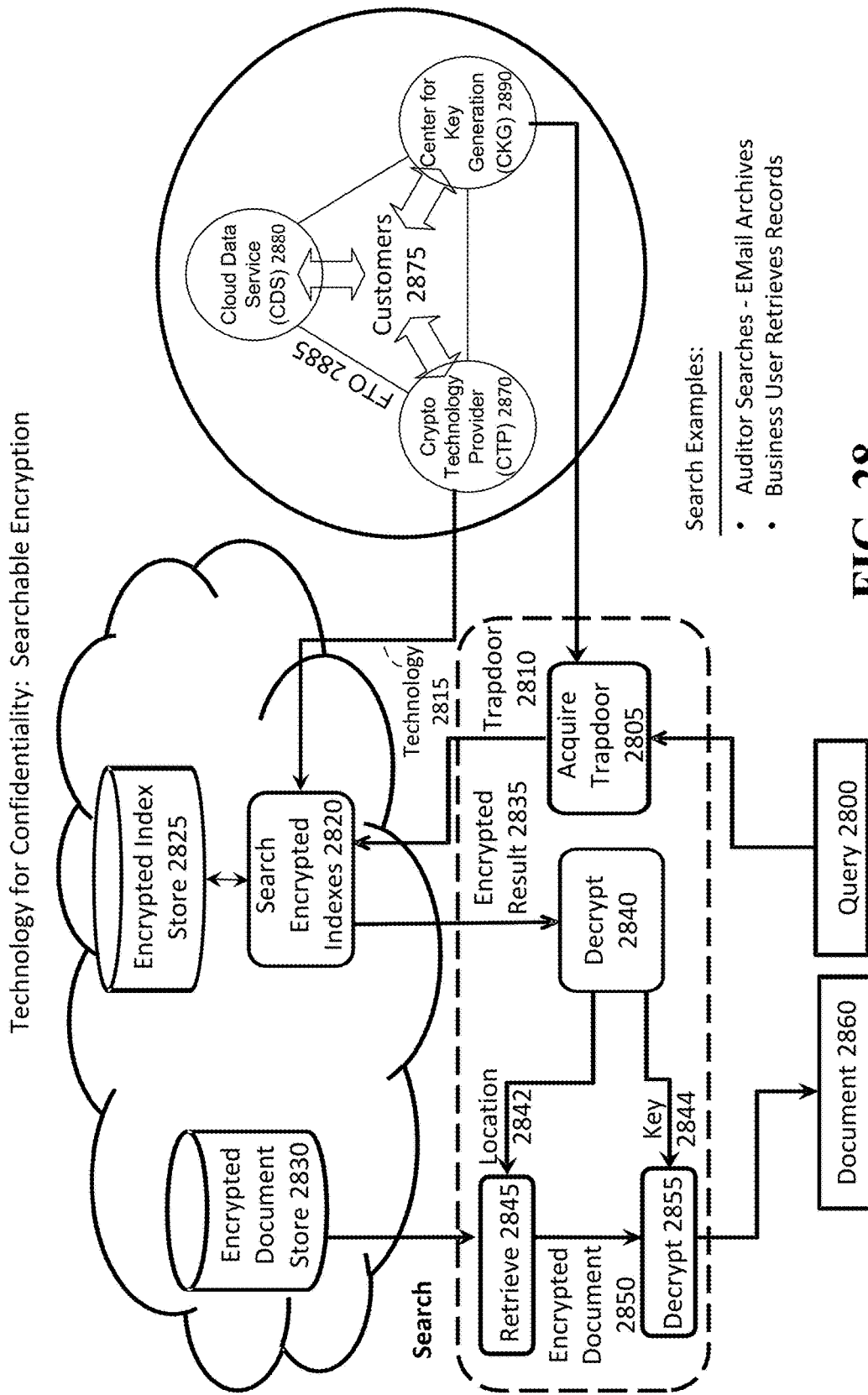
FIGS. 28-30 are block diagrams illustrating some additional non-limiting trust assurances by the system.

An FTO 2785 is an ecosystem that benefits customers 2775 by separating pieces of the mathematical transformations that take place with respect to containerless data in cloud or other storage, and as described elsewhere herein, includes a cloud data service (CDS) 2780, a crypto technology provider (CTP) 2770 and a center for key generation 2790. As an example, customers 2775 may have a document 2700 with which various keywords 2710 are associated. The public parameters 2765 for encryption are retrieved from the CKG 2790 whereas the technology for performing the mathematical transformation is retrieved from CTP 2770. To perform an upload, document 2700 is encrypted 2720 and uploaded 2730 to the cloud into an encrypted document store 2750. The location 2735 and the key 2725 for the upload, along with the keywords 2710 are input to generated encrypted indexes 2740 associated with the encrypted upload of document 2700, and the encrypted indexes generated at 2740 are uploaded at 2745 to encrypted index store 2755.

Where FIG. 27 illustrates the upload of encrypted index data, FIG. 28 illustrates the decryption of indexes to search for particular content, which is granted based on capabilities provided by the federated trust overlay, and then with visibility into the search results, the user can be granted capabilities or privileges to decrypt the actual documents pertinent to the search. In this regard, access to the index and access to documents can be separately controlled based on policy and enforcement by the FTO.

As mentioned, an FTO 2885 is an ecosystem that benefits customers 2875 by separating pieces of the mathematical transformations that take place with respect to containerless data in cloud or other storage, and as described elsewhere herein, includes a cloud data service (CDS) 2880, a crypto technology provider (CTP) 2870 and a center for key generation 2890.

In this example, a customer 2875 forms a query 2800, and then acquires a trapdoor 2810 at 2805 from CKG 2890, which is presented with the query 2800 to the cloud. In the cloud, the encrypted indexes in encrypted index store 2825 are searched at 2820 based on technology 2815 retrieved from CTP 2870. The results 2835 are then returned still encrypted and decrypted at 2840, from which the location 2842 and key 2844 are extracted. This gives the systems the information to retrieve at 2845 encrypted documents 2850 from encrypted document store 2830, which can be decrypted based on key 2844 at 2855 to return document or documents 2860, e.g., document 2700 from FIG. 27.

Figure 29:
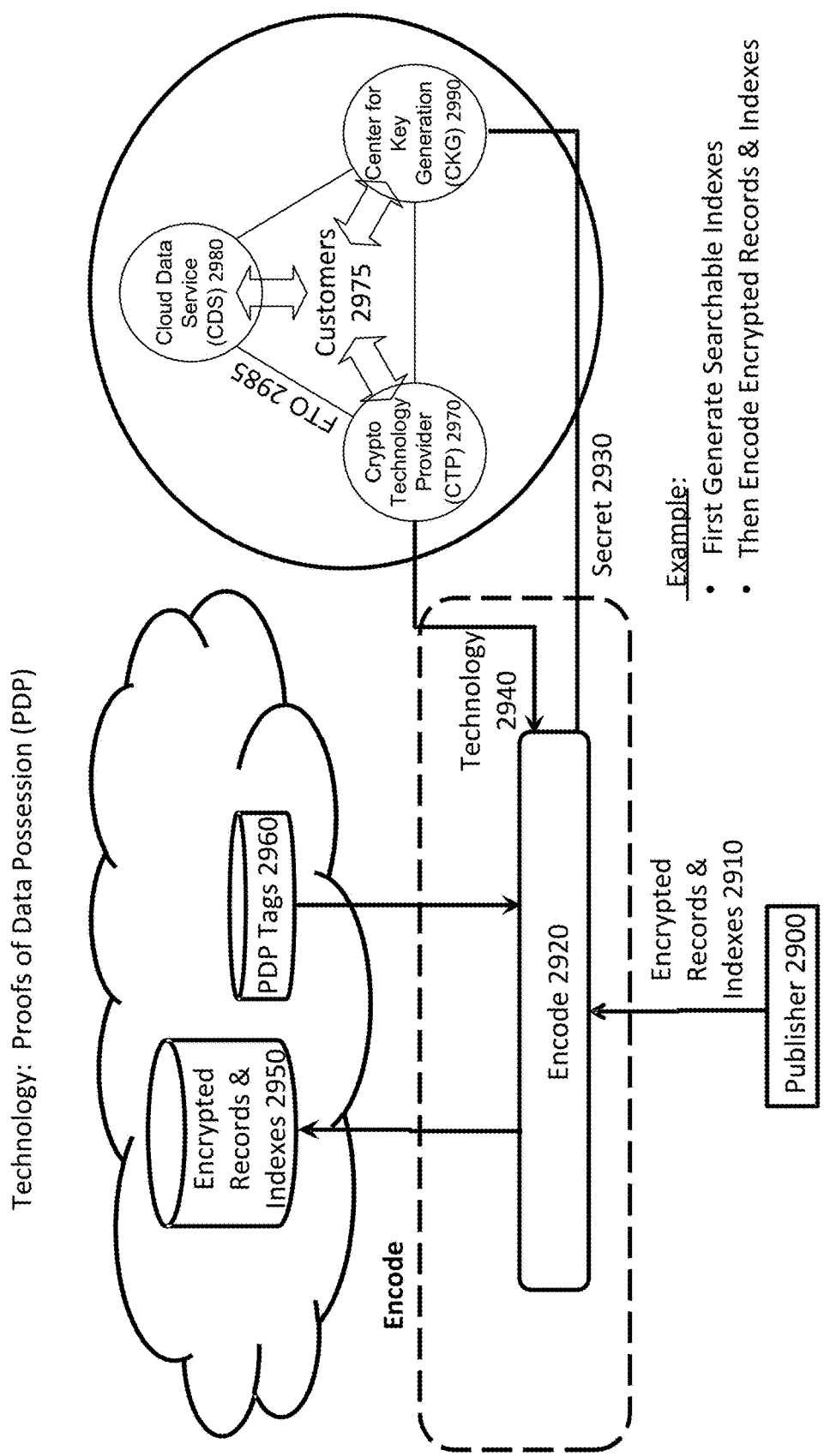
Figure 30:
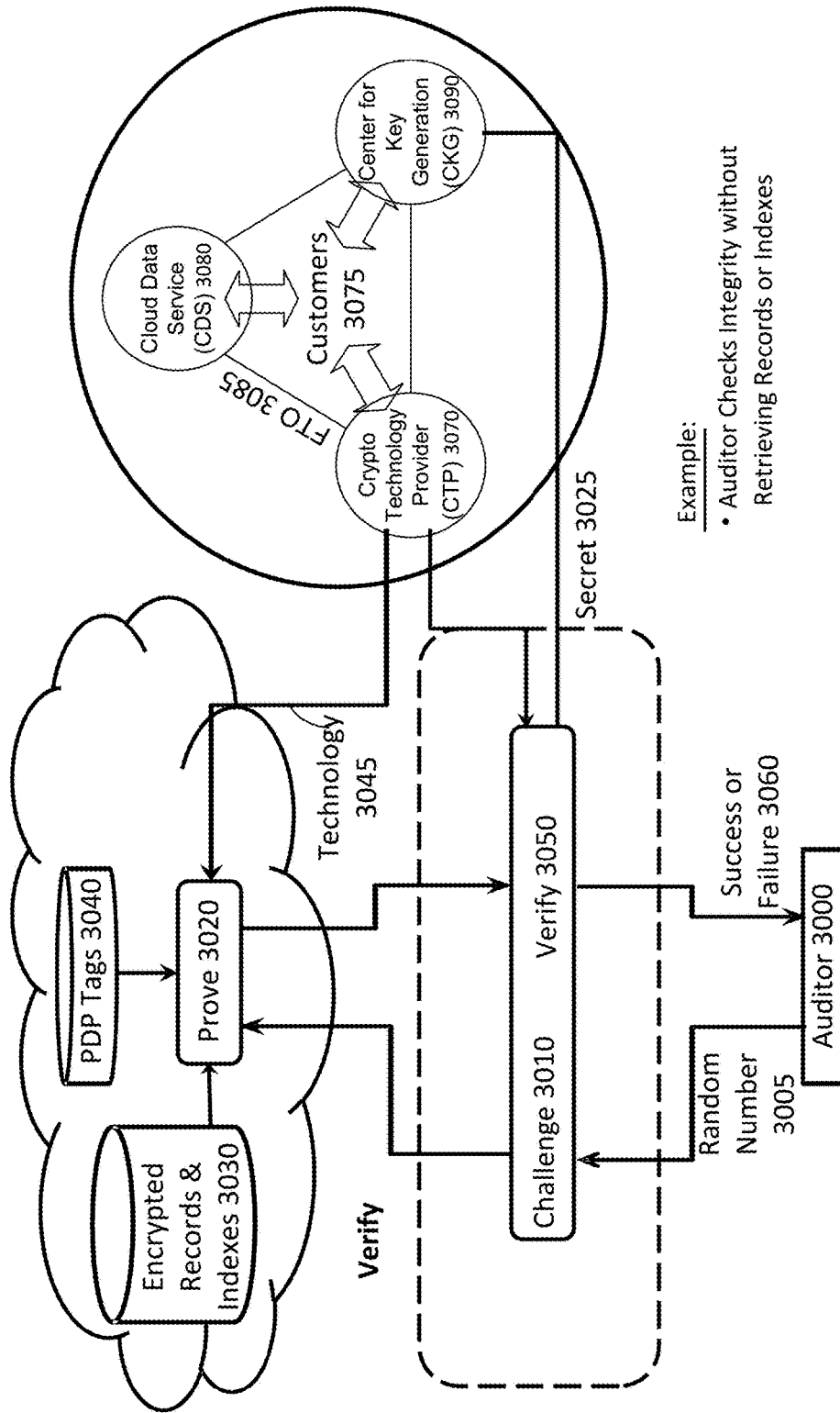

FIGS. 29-30 are block diagrams illustrating some additional non-limiting trust assurances by the system. In this regard, any algorithm that proves that what a user receives is correct can be used as an additional layer to mathematically prove to the user that gibberish is not being provided by the cloud. For example, one technique is known as proof(s) of data possession (PDP) in which tags are applied with respect to encrypted data which can be used in connection with validating the correctness of the data. Similar information can be applied (and encrypted) to prove that the data was not improperly altered or deleted while stored in the cloud. With cryptographic techniques, such proofs typically take the form of a cryptographic challenge and response. In FIG. 17, the PDP tags are encoded and encrypted in the cloud along with the encrypted records, indexes, metadata, etc. while in FIG. 18, a verification operation is being performed based on cryptographic consultation with the FTO that integrity of the data is intact.

With respect to FIG. 29, as mentioned, an FTO 2985 is an ecosystem that benefits customers 2975 by separating pieces of the mathematical transformations that take place with respect to containerless data in cloud or other storage, and as described elsewhere herein, includes a cloud data service (CDS) 2980, a crypto technology provider (CTP) 2970 and a center for key generation 2990. In this example, a publisher 2900 encrypts records and indexes 2910 by encoding the rocrds and indexes at 2920 based on a secret 2930 retrieved from CKG 2990 and technology 2940 retrieved from CTP 2970. The encrypted or encoded records and indexes 2950 are stored in the cloud. Proof(s) of data possession (PDP) tags 2960 can be used in connection with encoding at 2920 which later help to ensure certain aspects of the data while stored in the cloud as described elsewhere herein in more detail.

As mentioned, in FIG. 30, a verification operation is being performed based on cryptographic consultation with the FTO that integrity of the data is intact. In this regard, the FTO 3085 is an ecosystem that benefits customers 3075 by separating pieces of the mathematical transformations that take place with respect to containerless data in cloud or other storage, and as described elsewhere herein, includes a cloud data service (CDS) 3080, a crypto technology provider (CTP) 3070 and a center for key generation 3090. PDP Tags 3040 can be useful to an auditor 3000 of a system to check the integrity of data stored in the cloud. Based on a random number 3005, the auditor 3000 issues a challenge 3010 to a prover 3020 in the cloud and based on a secret 3025 retrieved from CKG 3090 and technology retrieved from CTP 3070. Prover 3020 also uses technology 3045 in connection with implementing the proving algorithms. In this regard, prover 3020 receives encrypted records and indexes 3030 and PDP tags as input and returns information to auditor 3000 which is verified at 3050. Based on whether the verify operation is successful or fails at 3060, the auditor 3000 is informed whether the integrity of the encrypted records and indexes 3030 has been maintained.

As described in more detail below, various cryptographic techniques can be incorporated into the provision of services that can provide strong guarantees of privacy and non-repudiation for service users. By integrating these cryptographic techniques with data protection techniques, remote services and layered applications can be implemented on top of the data in a manner that lets the owner of that data and the enterprise customer (the "customer"), to have precise control over the type of operations that can be performed by the entity hosting the data, or the Cloud Service Provider or Operator (the "CSP"). In addition, many of these operations can be performed by the CSP on behalf of the customer, without learning or otherwise seeing the actual contents of the data on which operations are performed. In addition, the customer can detect if the CSP is inappropriately deleting or modifying data, or moving the data to lower-performance secondary or tertiary storage. In this regard, a variety of cryptography techniques can be integrated with data services to provide confidence to the customer to relinquish control over data, e.g., to increase security and privacy.

For instance, searchable encryption is an encryption method where essential metadata is copied out of the data before it is encrypted. For a non-limiting example, in the case of Exchange e-mail, the data is a message with its attachments and the essential metadata could include selected messaging application programming interface (MAPI) properties and a full-text index. For instance, the data is encrypted, e.g., using advanced encryption standard (AES), whereas the metadata is encrypted in a manner that generates encrypted indices. As a result, the encrypted data and indices can now be handed over to another entity that is not fully trusted, such as a CSP. Subsequent selective access to the aggregated encrypted data and indices can be accomplished by the owner of that data, the customer, sending up an encrypted query to the CSP (or other authorized subscribers). Hence, the CSP can apply encrypted queries on the encrypted indices and return the encrypted data that matches, however, the CSP does not learn anything about the contents of the data, the metadata, the queries, or the results (unless authorized by the customer).

Proof(s) of Possession and Proof(s) of Retrievability are cryptographic techniques where a "Prover" (in this case, the CSP providing storage) and a "Verifier" (the customer) can engage in a protocol where the verifier can efficiently determine if the data they own is intact and available for easy retrieval from the possessor of the data, the CSP. These techniques are efficient in network bandwidth, and in the operations that the CSP performs, so the cost of goods sold (COGS) of the CSP remain relatively unchanged and the time for completing the protocol is reasonably short.

Another cryptographic technique that can be integrated into the provision of data services is Proof(s) of Application. Proof(s) of Application, similar to Proof(s) of Possession, enables the Verifier to ascertain that the data is being correctly maintained by the Prover, the CSP.

Blind Fingerprints represent another kind of cryptographic technique that extends network de-duping techniques, such as Rabin Fingerprints, which are typically used for minimizing the exchange of redundant data over a network. In various embodiments herein, fingerprinting is applied such that a participant in the protocol, e.g., the CSP in the case of storage of data, is unaware of the actual contents of the data that they are hosting.

A variety of scenarios based on the provision of services by a CSP thus emerge based on the above-described framework and corresponding cryptographic techniques ranging from storage and compute services to communication and collaboration services. Larger enterprise customers have significant compute and storage assets in their current enterprise data centers, and the inertia to adoption of Cloud services may be high. In addition, customers are experienced in, and familiar with data center operations, wanting to leverage the operating expenses (OPEX) and capital expenses (CAPEX) advantages, and thus are concerned about their sensitive business data moving from premise to the Cloud.

For this class of customers, in various embodiments, a set of applications are provided that involve the customer owning and operating their existing servers, such as Exchange server. The second copy of the data would then be delegated to the cloud service provider for reasons of data protection, archival, compliance, governance, legal or other reasons. The CSP thus has the skills, technologies and economies of scale to preserve this data against data loss or disclosure, and can facilitate running applications on top of this second copy. A small sampling of example products and services that can be offered based on maintaining a data to the customer include litigation support, monitoring and supervision, service dial-tone, data navigation, etc.

With respect to litigation support, when a company is being sued, there are a variety of entities that are required by the litigation process to perform searches on historical e-mail records. These entities include internal legal staff, HR, managers, external legal counsel, their external litigation support partner, and the opposing legal counsel. There are specific scope rules regarding who can perform what search. In current litigation support scenarios, it is difficult to bound scopes. Hence, it is possible for any individual involved in the litigation support to look at e-mail that is outside scope. In the case of email, results of searches are typically exchanged in the form of personal storage table (PST) files, which constitute additional risk, since these files can be inadvertently or maliciously handed over to unauthorized individuals.

In contrast, when the second copy is hosted remotely, e.g., in the cloud by a CSP, and maintained through a data, it is possible for a single trusted entity in the enterprise, e.g., the Chief Legal Officer, to provide each individual in the operation with specific trapdoors that will limit their query capabilities to their need. The data being hosted in the Cloud and protected through searchable encryption and a tamper-resistant audit log provides a higher level of protection so that inappropriate e-mail access is prevented. The need to exchange PST files is eliminated, since all individuals in the operation are directly accessing the cloud for queries, and the litigation support partner is the only entity exporting the targeted content for conversion to tagged image file format (TIFF) for case management.

With respect to monitoring and supervising the remote data copy, any reasonably sized corporation should proactively monitor their organization's e-mail for various purposes. These could range from legal/compliance, to governance reasons such as monitoring IP leakage, plagiarism, inappropriate language, etc. Typically, the monitoring and supervision software monitors either the primary servers, or a second copy that is backed up or archived. The problem with monitoring the primary servers is that this could place excessive load on busy production servers. In addition, since it is possible for administrators to accidentally or maliciously modify or delete data on the primary servers, a solution is to capture data in a compliant manner and transfer it to a second copy, where monitoring and supervision software continually scans incoming e-mail, looking or searching for patterns. However in many enterprise setups, there is local administrative access to these second copies, and as a result, a resourceful administrator can modify or delete information in spite of tamper detection and prevention mechanisms.

In contrast, maintaining a data by the CSP advantageously places the second copy in a different region of control. Suitable cryptographic techniques, such as searchable public key encryption (PEKS) and Proof(s) of Possession (POP) can ensure that even collusion between an enterprise administrator and an employee of the CSP still prevents them from positively identifying exactly what item they want to modify. The monitoring and supervision software runs at the remote site or in the Cloud and looks for items that have specific pre-determined keywords through trapdoors that have been previously provided.

As described herein according to various embodiments, independent data protection and cryptographic techniques are combined in a manner that enhances and modifies each to support the other, to provide solutions that are not currently available to consumers, enterprises, ecosystems and social networks, and to enable containerless, secure, private and selectively accessible data in a cloud environment.

Trustworthy XML

XML has evolved as a ubiquitous network exchange format for a variety of reasons including but not limited to its efficient descriptive capacity enabled via tags and its hierarchical arrangement. In this regard, XML data can be protected according to the above FTO infrastructure enabling different permissions to be applied to different parts an XML document (including payload and tags, and any metadata added on top of existing tags or metadata). Trustworthy XML can thus be stored in a containerless fashion, as described above as well.

Figure 31:
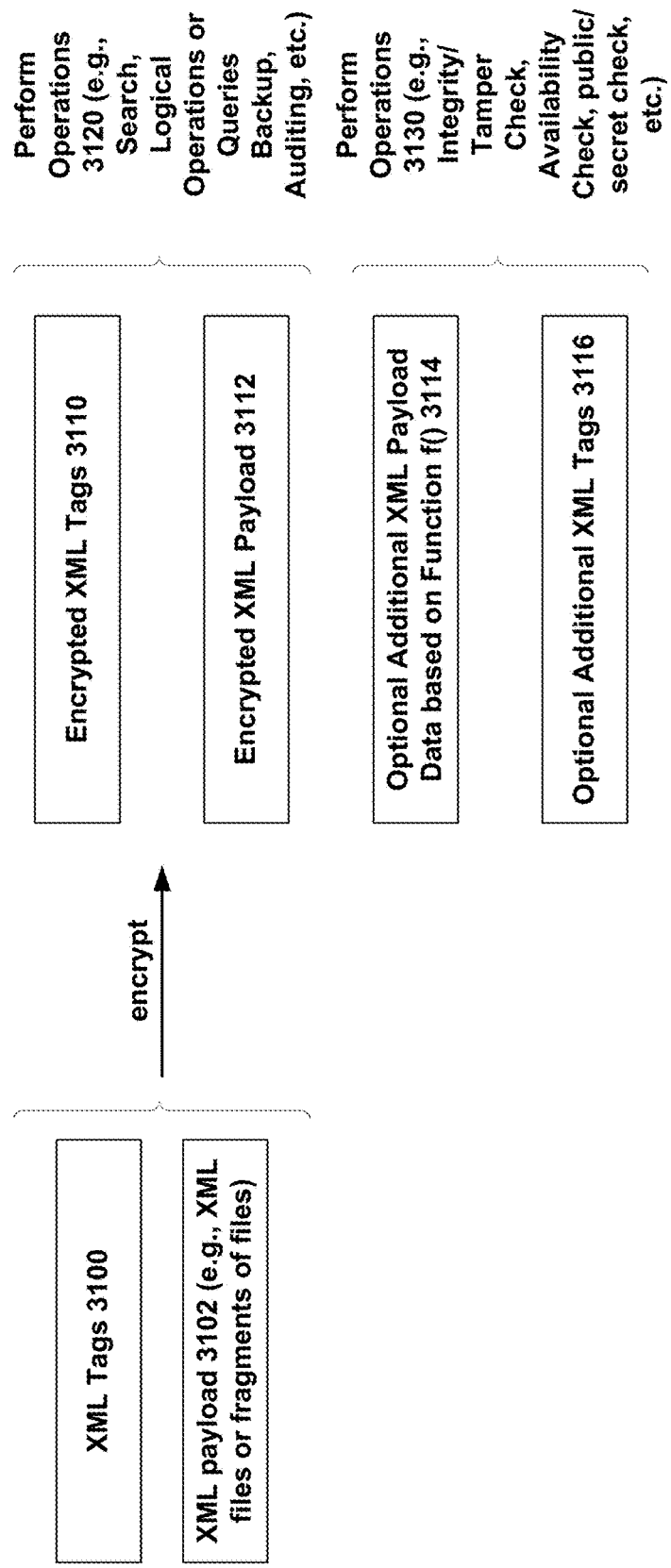
FIG. 31 is a diagram illustrating an embodiment of trusted overlay in the context of XML.

As illustrated in FIG. 31, XML payload 3102 and its tags 3100 can be encrypted to form encrypted tags 3110 and payload 3112. In this regard, by breaking an XML document into XML fragments with potentially different protection levels, a much more granular permission system is enabled that does not depend on the initial organization as a document on the publisher side. In addition additional data can be added to the payload data based on any function 3114 and additional XML tags can be applied to aid in additional functions to be applied over the trustworthy XML fragments. Operations on the payload 3112/tags 3110 include operations 3120, such as search, queries, backup, auditing, etc. Other operations 3130 can be implemented over the data based on the optional addition of data 3114 or tags 3116. For instance, any time data fits the pattern of a social security number, a tag 3116 can be automatically added that marks the XML fragment as private to preserve such information inviolate.

In this regard, if the data/information is in XML format, any of the above described techniques on data/metadata can be applied to structured XML data to selectively query and obtain access to XML fragments. XML has a standard format that is <tag "value"> or <tag "value" XML end-tag>. In this respect, with structure XML, there is a way to represent the structure hierarchically so that there is an outer wrapper that will point to the CKG/CTP 'frame' that is unique to the digital escrow pattern. So, when there is need to access an embedded fragment, existing (or materialize, new) trust is leveraged with the <CKG> and <CTP> wrapper. This allows for users to search, extract and decrypt the segments, where permitted. In addition, PDP can be used to verify that the specific XML segment requested has not been tampered with since it was originally authored.

Accordingly, in various embodiments, a "trusted envelope" for XML fragments or full records ("Payload") is created through variety of "decorations" that allow for the trust to run a gamut of trust guarantees like confidentiality, privacy, anonymity and integrity.

This is in line with the above-described container-less data embodiments. The opportunity to decouple data from its containers (e.g., file systems, databases) facilitates the sharing in a manner that preserves and extends the original guarantees without the need for containers to enforce. Any other wrapper can also be added beyond crypto search, crypto-based tamper detection, etc. as based on business needs and as different technologies emerge. With XML data, tags can be added to the data to help modulate the consistency of the data, which can be dependent on domain and applications.

Advantageously, the XML can include searchable metadata that encodes authentication, authorization, schemas, history, traces, consistency, etc. It could also encode manifest information for locating other related fragments if it is a dispersed sliver of a larger document. The technology independence of being able to use any agreed upon CKG/CTP combined with being able to add other wrappers in addition to searchable encryption and PDP as new technologies became applicable enables a flexible architecture to handle any kind of cloud scenario. XML tags can also be augmented or added in order to modulate consistency, trails, etc.

When this is combined with data dispersion techniques, strong guarantees regarding confidentiality, privacy, anonymity and integrity are achieved. This "trusted envelope" can be used to decorate any Payload with additional metadata that could include schema information, consistency hints, versions and trails, confidence levels (e.g., when using "crowd computing"), locators for reconstituting this payload from other peers of a sliver, etc.

In one non-limiting application, trustworthy XML provides the "loose format binding" to grow the ecosystem in order to catalyze network effects. The combination of FTO (parameterizes the technologies and the key managers) and the universal exchange formats of XML facilitates greater flexibility in accommodating diverse technical, application, domain, locale, sovereign, format, and other requirements.

In another application, current settlement and reconciliation for Syndication involves point-to-point exchanges that are prone to errors, omissions and fraud. Interposing secure and private data Services would thus directly benefit accounting, auditing, etc in a manner that facilitates selective disclosure so that a trusted entity stays reliable, and suitable regulators (compliance, legal) or mediator (conflict resolution, etc.) can be allowed to selectively peek at XML tags in order to build confidence in the transactions. The advantage of trustworthy XML is that the payloads can encode proprietary formats between participants that the storing party does not need to know about or even try to understand. The layers of trustworthy wrappers thus add significant technical and business value along with legal and compliance value and sovereign entity value.

In another application, health care system integration is onerous due to (a) disparate incompatible legacy systems, and (b) more important—loss of stickiness of patients to existing solution providers. By introducing cloud data services as the Clearing House, and trustworthy XML as the interchange format, these existing solution providers can consider this as an avenue to retain that stickiness while also leveraging the universal format facilitated by XML.

With respect to using "routers" ("gateways/guardians") that are FTO-enabled and leveraging Trustworthy XML is that (a) routers can do their thing without needing to learn more than necessary for routing, (b) routers have fewer degrees of freedom for errors or bad behavior, (c) due to the late binding, complex key management is eliminated.

In addition, tags can be added or augmented or additional metadata can be applied to XML documents to indicate that the contents are of various levels of sensitivity. For example, a document may exist that has Public, Secret and Top Secret paragraphs. A person performing a search and requesting access with a Secret clearance would only get access to Public and Secret paragraphs, for instance. A paragraph's classification could also be used to determine the encryption mechanism, key and access policy. For example, Top Secret content cannot be accessed from a wireless or remote device.

Similarly, the classification could be used to create a policy on how data could be stored, where it could be store, how long it could be stored. For example, medical data must be backed up once a day using AES 256 encryption to a secure server in a trustworthy datacenter.

Figure 32:
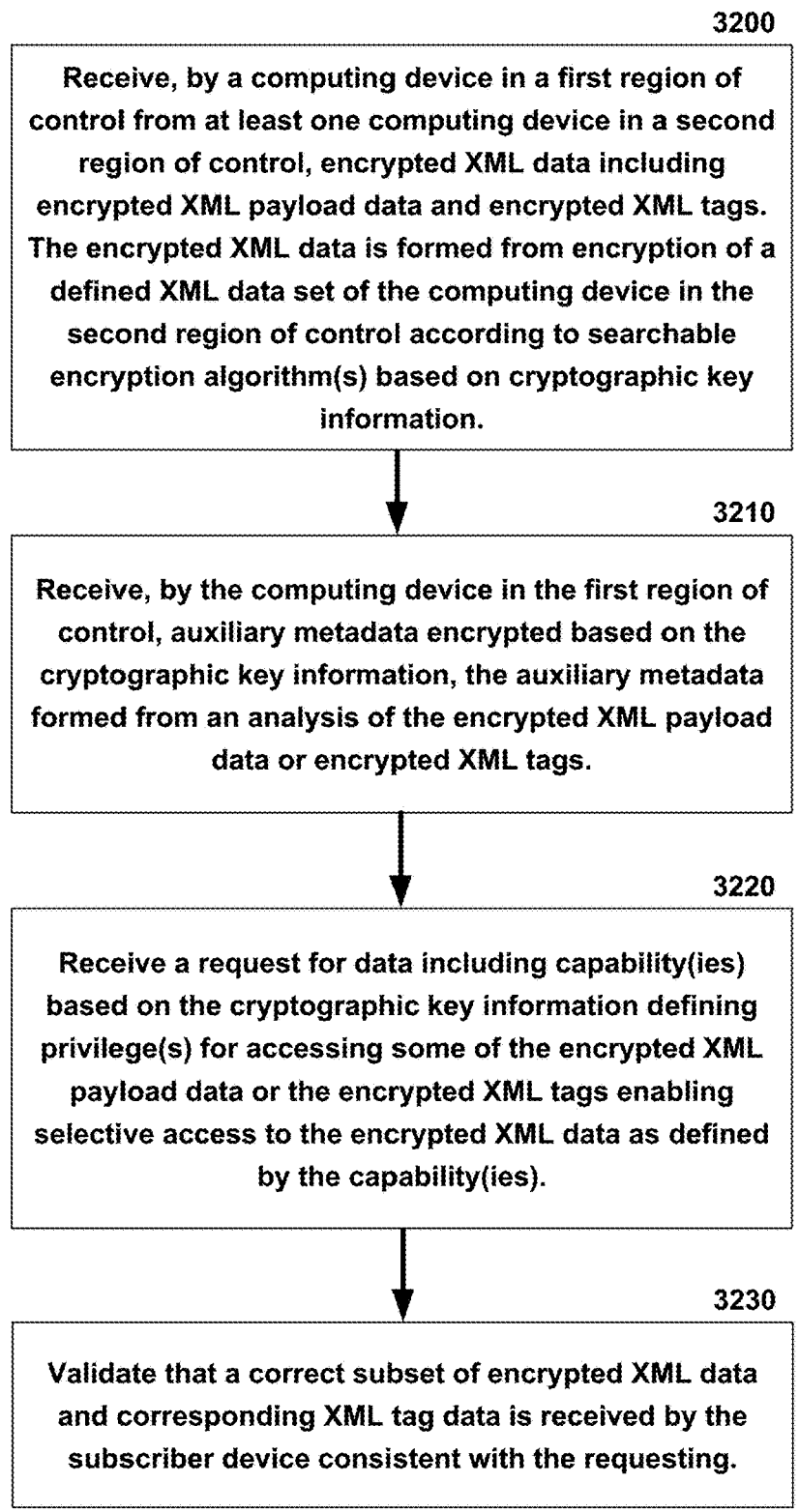
FIGS. 32-35 are flow diagrams illustrating exemplary processes for trustworthy XML in various embodiments.

FIG. 32 is a flow diagram illustrating an exemplary process for hosting trustworthy XML in an embodiment. At 3200, a computing device in a first region of control receives from a computing device in a second region of control encrypted XML data including encrypted XML payload data and encrypted XML tags. The encrypted XML data is formed from encryption of a defined XML data set of the computing device in the second region of control according to searchable encryption algorithm(s) based on cryptographic key information. At 3210, auxiliary metadata encrypted based on the cryptographic key information is received where the auxiliary metadata formed from an analysis of the encrypted XML payload data or encrypted XML tags. At 3220, a request for data including capability(ies) is received based on the cryptographic key information defining privilege(s) for accessing some of the encrypted XML payload data or the encrypted XML tags enabling selective access to the encrypted XML data as defined by the capability(ies). At 2030, optionally, it is validated that a correct subset of encrypted XML data and corresponding XML tag data is received by the subscriber device consistent with the requesting.

Figure 33:
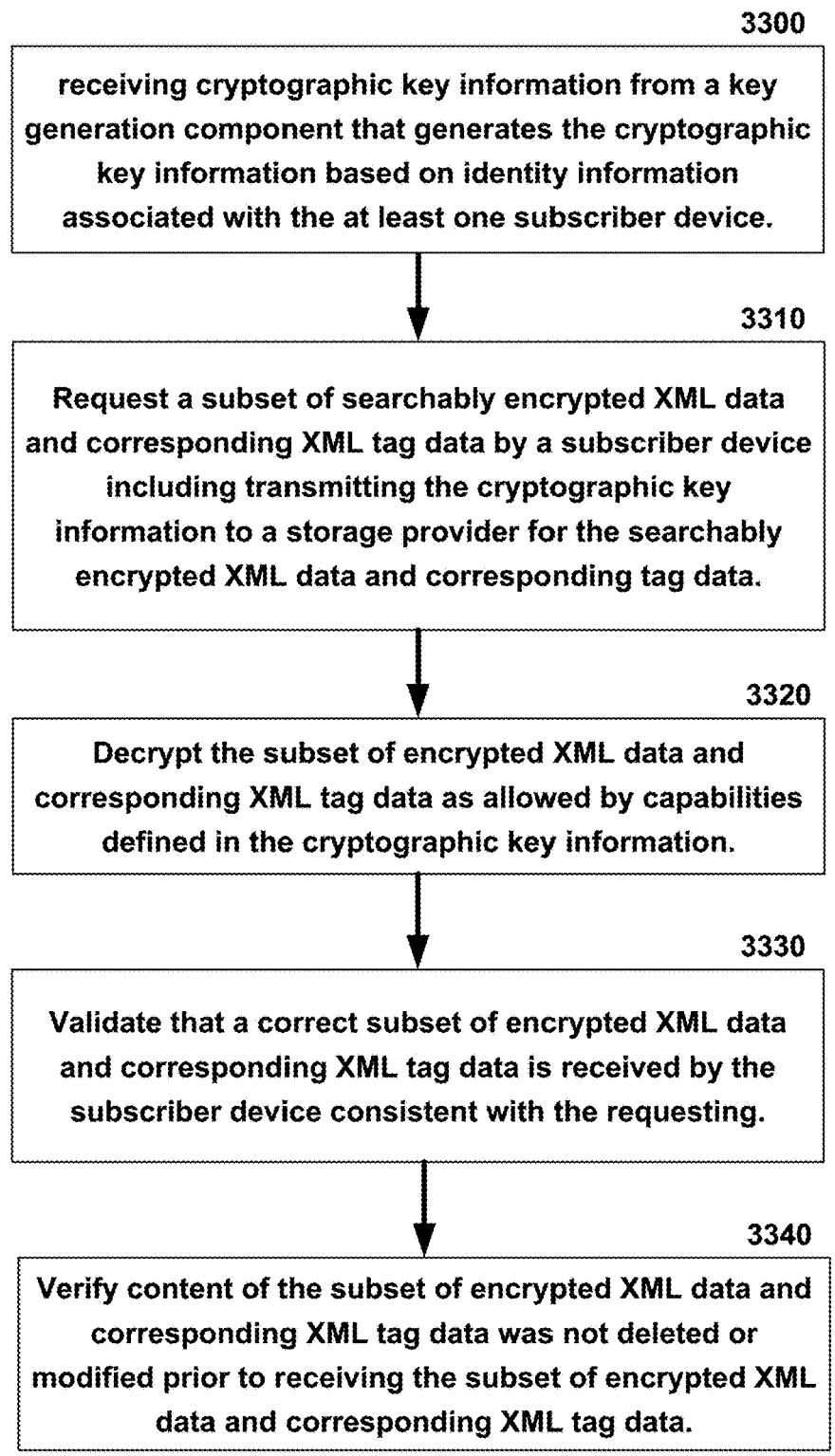

FIG. 33 is a flow diagram illustrating an exemplary process for hosting trustworthy XML in an embodiment. At 3300, cryptographic key information is received from a key generation component that generates the cryptographic key information based on identity information associated with the subscriber device. At 3310, a subset of searchably encrypted XML data and corresponding XML tag data is requested by a subscriber device. The cryptographic key information is transmitted to a storage provider for the searchably encrypted XML data and corresponding tag data. At 3320, the subset of encrypted XML data and corresponding XML tag data is decrypted as allowed by capabilities defined in the cryptographic key information. At 3330, it is validated that the correct subset of encrypted XML data and corresponding XML tag data is received by the subscriber device consistent with the requesting. At 3340, it is verified that the content of the subset of encrypted XML data and corresponding XML tag data was not deleted or modified prior to receiving the subset of encrypted XML data and corresponding XML tag data.

Figure 34:
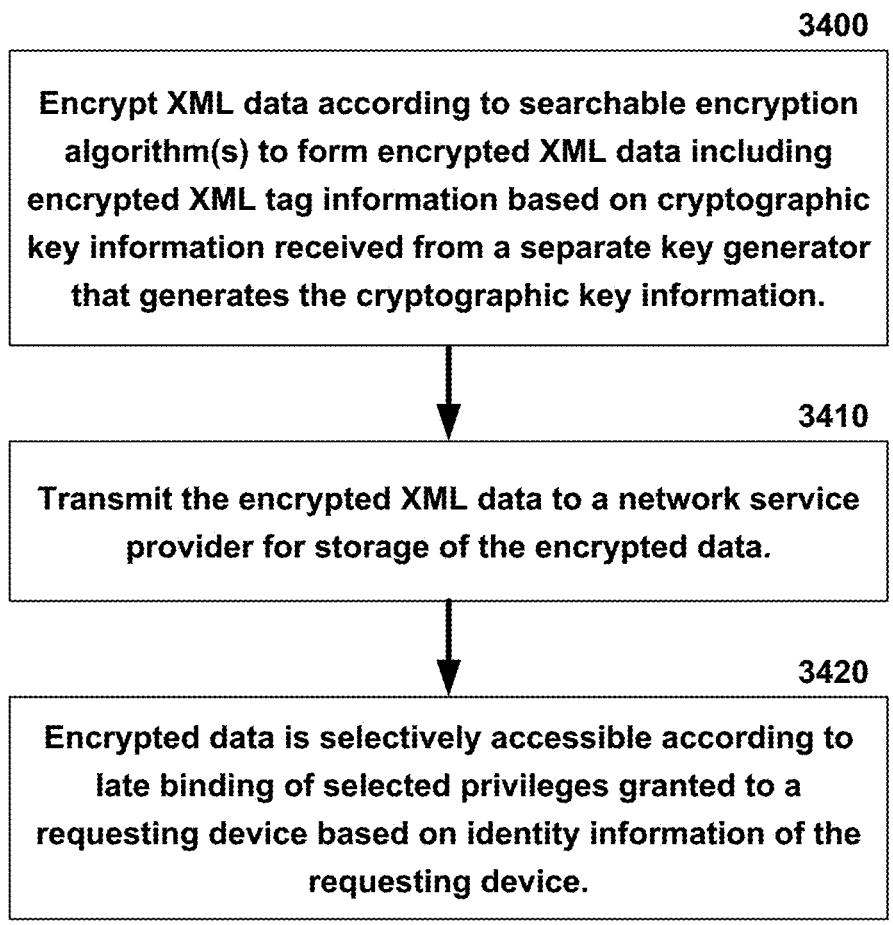

FIG. 34 is a flow diagram illustrating an exemplary process for hosting trustworthy XML in an embodiment. At 3400, XML data is encrypted according to searchable encryption algorithm(s) to form encrypted XML data including encrypted XML tag information based on cryptographic key information received from a separate key generator that generates the cryptographic key information. At 3410, the encrypted XML data is transmitted to a network service provider for storage of the encrypted data. At 3420, the encrypted data is selectively accessible according to late binding of selected privileges granted to a requesting device based on identity information of the requesting device.

Figure 35:
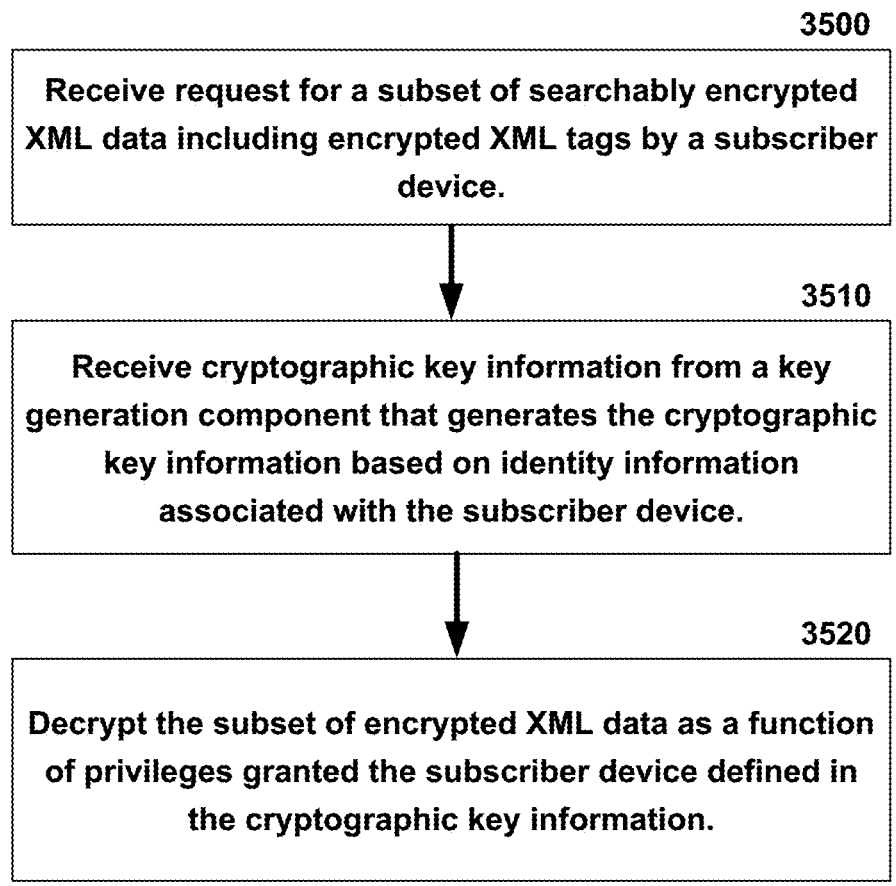

FIG. 35 is a flow diagram illustrating an exemplary process for hosting trustworthy XML in an embodiment. At 3500, a request for a subset of searchably encrypted XML data including encrypted XML tags is made by a subscriber device. At 3510, cryptographic key information is received from a key generation component that generates the cryptographic key information based on identity information associated with the subscriber device. At 3520, the subset of encrypted XML data is decrypted as a function of privileges granted the subscriber device defined in the cryptographic key information.

As provided for various embodiments, Trustworthy XML protects data in a whole to a lower node level and is capable of protecting access privileges at the node level in a generic and efficient way.

A variety of samples illustrating one or more concepts are set forth below in which anonymous IBE is employed and/or in which AES is used as a cryptographic technique for obscuring. However, it is to be understood that any suitable mathematical transformations can be used in such examples, and thus the given technique for obscuring or hiding XML data should not be taken as limiting on any of the more general concepts.

In one embodiment, the encoding of XML can be done by passing the XML through an Encoding Transducer, which outputs the Trustworthy XML and the decoding can be done by passing the Trustworthy XML through a corresponding Decoding Transducer. In this regard, the same node can be protected multiply (wrapped at multiple levels) to have higher protection over the boundary of the node.

In the following illustrative, but non-limiting, example, a patient record is used for explaining an implementation of Trustworthy XML using notions of selective encoding to treat different data portions differently.

```
<?xml version="1.0" encoding="utf-8"?>
<PatientInfo Id="JK392E8D">
  <Name>John McKenzie</Name>
  <Doctor>Dr. Smith </Doctor>
  <LabResults>
    <BloodTest>
      <TestData labname="Quest">
        <data> ... </data>
      </TestData>
    </BloodTest>
    <MRITest>
      <TestData labname="Mela">
        <data> ... </data>
      </TestData>
    </MRITest>
    <XRayTest>
      <TestData labname="Lest">
        <data> ... </data>
      </TestData>
      <TestData labname="Vanta">
        <data> ... </data>
      </TestData>
    </XRayTest>
  </LabResults>
</PatientInfo>
```

In one non-limiting aspect, Trustworthy XML enables the protection of selected parts of an XML document, but not the whole document. For instance, an implementation can protect the elements of the inner block which are all marked as 'action="encode"'.

For example, to protect the name of the patient, the Name element can be marked as follows:

<Name action="encode">John McKenzie</Name>

As a result, the data payload, here the name 'John McKenzie', will not be visible to anyone.

This selective encoding can be done in any element level, e.g., it can be done for the flat element (as the above) or it can be set for some hierarchical element like 'BloodTest' as following:

```
<BloodTest action="encode">
  <TestData labname="Quest">
    <data> ... </data>
  </TestData>
</BloodTest>
```

In the above example, the whole 'TestData' inside the 'BloodTest' element will not be visible to anyone.

For setup to perform the various mathematical transformations, such as but not limited to encryption, pre-processor information can be generated. For instance, anonymous IBE (AIBE) and AES can be used as crypto techniques, though it is again noted that these are non-limiting.

In one embodiment, the system can have an independent Capability Generation Center (CGC) for managing and generating the secrets for AIBE, as described generally for a federated architecture as described elsewhere herein.

To perform AIBE Setup, in one embodiment, the CGC can generate Public parameter(s) (PUB) and the Master Secret Key (MSK). The MSK can be kept secret in the CGC. The PUB can be supplied to the end users of the application for when using AIBE.

Figure 36:
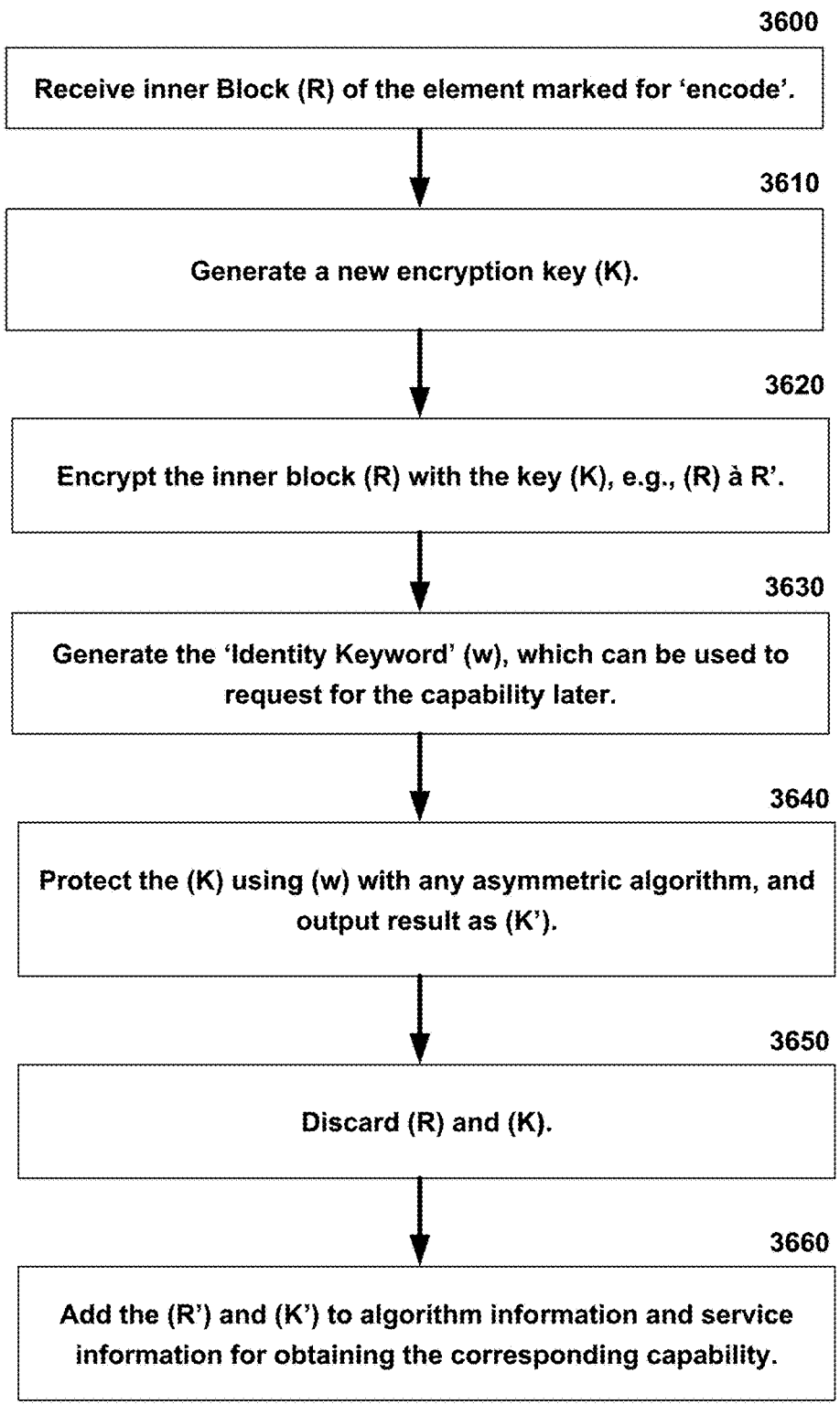
FIG. 36 is a flow diagram illustrating an exemplary non-limiting method for processing data to form trustworthy XML in an embodiment.

FIG. 36 is a flow diagram of an exemplary non-limiting algorithm for use in the context of AIBE in order to selectively encode a Trustworthy XML document. At 3600, an Inner Block (R) of the element marked for 'encode' is received. At 3610, a new encryption key (K) is generated and at 3620, the inner block (R) is encrypted with the key (K), e.g., (R)→R'. At 3630, the 'Identity Keyword' (w) is generated, which is the keyword used to request for the capability later. At 3640, the (K) is protected using (w) with any asymmetric algorithm, and the result is taken as (K'). At 3650, (R) and (K) can be discarded. At 3660, the (R') and (K') can be added to the algorithm information and the service information for later obtaining the corresponding capability.

The following is a sample implementation using AES and AIBE.

Starting with the following element:

```
<BloodTest action="encode">
  <TestData labname="Quest">
    <data> ... </data>
  </TestData>
</BloodTest>
```

In this sample implementation, (R) is as follows:

```
<TestData labname="Quest">
  <data> ... </data>
</TestData>
```

With respect to data processing to be performed as part of the encoding, first, a 256-bit AES Encryption key (K) is generated. Next, AES encrypts the record (R), e.g., $$AES_K(R) \rightarrow R'$$

As an example, the Base64Encoded value of R' might be represented as follows:

```
pDB9AaoGgBMbkUAox/+thz6IlIWpE21Qj0ZiW8I9vQ91OA3WrRaIUTWg
9iDqvgu7svclH1SjENgBWDzlo5gaWYX1D+Ib3j6VpGX13mwd5Dq5FctLQ
FbSLWZCBzsCC/ORbe6A1iwk+6fGam/GrVcyuXeocIxUsmSBc0hhhwwdbz
2IKpvY+rqW63uglgcbn4pyMbnOdiofbPOroqVXyCbFCDGbS46cmac8YKe
DGrCURayt/yZW3Z7AwCzLvN3py6LBZvj8W4lJbzND5fa/S3bdfg==
```

The 'Id' of the document can then be taken and it can be appended with the 'element' name. This will be used as the 'Identity Keyword' (w). For example, here (w) may be "JK392E8DBloodTest". Next, the (K) is protected using AIBE, e.g., as follows:

$$AIBE(PUB,w,K) \rightarrow K'$$

As a result of protection via AIBE, the K' might look like the following:

```
32,BuLI8ihhSAV3oxa9hm7Dx70BuLI8i,9uzEeIG89oAasixlbDLae9uzEeI,zn
9xpp89kZtTio0zn9x,fmmxLd3Ehg16Efmmx
```

As mentioned, at this point R and K can be discarded, and the output XML can be generated.

With respect to compiling the output XML, the (R') is kept inside the 'Value' element, e.g., as follows:

```
<Value>
    pDB9AaoGgBMbkUAox/+thz6IlIWpE21Qj0ZiW8I9vQ91OA3WrRaI
    UTWg9iDqvgu7svclH1SjENgBWDzlo5gaWYX1D+Ib3j6VpGX13m
    wd5Dq5FctLQFbSLWZCBzsCC/ORbe6A1iwk+6fGam/GrVcyuXeocI
    xUsmSBc0hhhwwdbz2IKpvY+rqW63uglgcbn4pyMbnOdiofbPOroqV
    XyCbFCDGbS46cmac8YKeDGrCURayt/yZW3Z7AwCzLvN3py6LB
    Zvj8W4lJbzND5fa/S3bdfg==
</Value>
```

Next, the transformation algorithm(s) used are added. Here, for example, it will be Encrypt and AES.

```
<TransformationMethod>
    <Type>Encrypt</Type>
    <Algorithm>AES</Algorithm>
</TransformationMethod>
```

Further, the namespace is defined and encapsulated inside the 'Data' element, e.g., as follows:

```
<t0:Data xmlns:t0="http://TrustedXml_01/transformers">
    <t0:TransformationMethod>
        <t0:Type>Encrypt</t0:Type>
        <t0:Algorithm>AES</t0:Algorithm>
    </t0:TransformationMethod>
    <t0:Value>
            pDB9AaoGgBMbkUAox/+thz6IlIWpE21Qj0ZiW8I9vQ91OA3WrRaI
            UTWg9iDqvgu7svclH1SjENgBWDzlo5gaWYX1D+Ib3j6VpGX13m
            wd5Dq5FctLQFbSLWZCBzsCC/ORbe6A1iwk+6fGam/GrVcyuXeocI
            xUsmSBc0hhhwwdbz2IKpvY+rqW63uglgcbn4pyMbnOdiofbPOroqV
            XyCbFCDGbS46cmac8YKeDGrCURayt/yZW3Z7AwCzLvN3py6LB
            Zvj8W4lJbzND5fa/S3bdfg==
    </t0:Value>
    <t0:Data>
```

As for the key, the (K') is maintained inside the Key element, e.g., as follows:

```
<Key>
    32,BuLI8ihhSAV3oxa9hm7Dx70BuLI8i,9uzEeIG89oAasixlbD
    Lae9uzEeI,zn9xpp89kZtTio0zn9x,fmmxLd3Ehg16Efmmx
</Key>
```

Again, the transformation information used is added. Here, for example, it is again Encrypt and AIBE, e.g., as follows:

```
<TransformationMethod>
    <Type>Encrypt</Type>
    <Algorithm>AIBE</Algorithm>
</TransformationMethod>
```

The service information is also added for which the decoder retrieves the Key, e.g., as follows

```
<EncryptionInfo
        xmlns:e0="http://TrustedXml_01/transformers/AIBE">
    <KeyProviderService>
        http://TrustedXml_01/aibe/cgc.svc
    </KeyProviderService>
    <KeyProviderAction>GetCapability</KeyProviderAction>
</EncryptionInfo>
```

For example, the namespace can be defined and encapsulated to 'KeyInfo', as follows:

```
<t0:KeyInfo xmlns:t0="http://TrustedXml_01/transformers">
    <t0:TransformationMethod>
        <t0:Type>Encrypt</t0:Type>
        <t0:Algorithm>AIBE</t0:Algorithm>
    </t0:TransformationMethod>
    <e0:EncryptionInfo
            xmlns:e0="http://TrustedXml_01/transformers/AIBE">
        <e0:KeyProviderService>
            http://TrustedXml_01/aibe/cgc.svc
        </e0:KeyProviderService>
        <e0:KeyProviderAction>GetCapability</e0:KeyProviderAction>
    </e0:EncryptionInfo>
    <Key>
        32,BuLI8ihhSAV3oxa9hm7Dx70BuLI8i,9uzEeIG89oAasixlbD
        Lae9uzEeI,zn9xpp89kZtTio0zn9x,fmmxLd3Ehg16Efmmx
    </Key>
</t0:KeyInfo>
```

An example transformation is illustrated by the following input record and transformed output.

Example Input Record:

```
<?xml version="1.0" encoding="utf-8"?>
<PatientInfo Id="JK392E8D">
    <Name action="encode">John McKenzie</Name>
    <Doctor>Dr. Smith </Doctor>
    <LabResults>
```

An example output element for BloodTest is as follows:

```
<BloodTest action="decode">
    <TransformedData>
        <t0:KeyInfo xmlns:t0="http://TrustedXml_01/transformers">
            <t0:TransformationMethod>
                <t0:Type>Encrypt</t0:Type>
                <t0:Algorithm>AIBE</t0:Algorithm>
            </t0:TransformationMethod>
            <e0:EncryptionInfo
                    xmlns:e0="http://TrustedXml_01/transformers/AIBE">
                <e0:KeyProviderService>
                    http://TrustedXml_01/aibe/cgc.svc
                </e0:KeyProviderService>
                <e0:KeyProviderAction>GetCapability</e0:KeyProviderAction>
            </e0:EncryptionInfo>
            <Key>
                32,BuLI8ihhSAV3oxa9hm7Dx70BuLI8i,9uzEeIG89oAasixlbD
                Lae9uzEeI,zn9xpp89kZtTio0zn9x,fmmxLd3Ehg16Efmmx
            </Key>
        </t0:KeyInfo>
        <t0:Data xmlns:t0="http://TrustedXml_01/transformers">
            <t0:TransformationMethod>
                <t0:Type>Encrypt</t0:Type>
                <t0:Algorithm>AES</t0:Algorithm>
            </t0:TransformationMethod>
            <t0:Value>
                pDB9AaoGgBMbkUAox/+thz6IlIWpE21Qj0ZiW8I9vQ91OA3WrRaI
                UTWg9iDqvgu7svclH1SjENgBWDzlo5gaWYX1D+Ib3j6VpGX13m
                wd5Dq5FctLQFbSLWZCBzsCC/ORbe6A1iwk+6fGam/GrVcyuXeocI
                xUsmSBc0hhhwwdbz2IKpvY+rqW63uglgcbn4pyMbnOdiofbPOroqV
                XyCbFCDGbS46cmac8YKeDGrCURayt/yZW3Z7AwCzLvN3py6LB
                Zvj8W41JbzND5fa/S3bdfg==
            </t0:Value>
        </t0:Data>
    </TransformedData>
</BloodTest>
```

```
<BloodTest action="encode" >
    <TestData labname="Quest">
        <data> ... </data>
    </TestData>
</BloodTest>
<MRITest>
    <TestData labname="Mela">
        <data> ... </data>
    </TestData>
</MRITest>
<XRayTest>
        <TestData labname="Lest" action="encode">
            <data> ... </data>
        </TestData>
        <TestData labname="Vanta">
            <data> ... </data>
        </TestData>
    </XRayTest>
    </LabResults>
</PatientInfo>
```

Example Transformed Output Record:

```
<?xml version="1.0" encoding="utf-8"?>
<PatientInfo Id="JK392E8D">
    <Name action="decode">
        <TransformedData>
            <t0:KeyInfo xmlns:t0="http://TrustedXml_01/transformers">
                <t0:TransformationMethod>
                    <t0:Type>Encrypt</t0:Type>
                    <t0:Algorithm>AIBE</t0:Algorithm>
                </t0:TransformationMethod>
                <e0:EncryptionInfo
xmlns:e0="http://TrustedXml_01/transformers/AIBE">
<e0:KeyProviderService>http://TrustedXml_01/aibe/cgc.svc</e0:KeyProvider
Service>
                    <e0:KeyProviderAction>GetCapability</e0:KeyProviderAction>
                </e0:EncryptionInfo>
                <Key>
32,GlQOI2Wooxa9hm7Dx70BuLI8ihhSAV3,oAasixlbDLa42gFFe9uzEeIG89
,89XBMSkZtTio0zn9xpp,hgHA16EfmmxLd3E
                </Key>
            </t0:KeyInfo>
            <t0:Data xmlns:t0="http://TrustedXml_01/transformers">
                <t0:TransformationMethod>
                    <t0:Type>Encrypt</t0:Type>
                    <t0:Algorithm>AES</t0:Algorithm>
                </t0:TransformationMethod>
                <t0:Value>
9ItK1H62OezLZXG4QGr6DKikZ0gMxFePzFs849Ftv9WEbaOqhPO/UUVA
kmfHP2HRW7SOQfd1hNj1wBdM95KtgeKrjb2O/OS/1i9SHU6zprU=
                </t0:Value>
            </t0:Data>
        </TransformedData>
    </Name>
    <Doctor>Dr. Smith </Doctor>
    <LabResults>
        <BloodTest action="decode">
            <TransformedData>
                <t0:KeyInfo xmlns:t0="http://TrustedXml_01/transformers">
                    <t0:TransformationMethod>
                        <t0:Type>Encrypt</t0:Type>
                        <t0:Algorithm>AIBE</t0:Algorithm>
                    </t0:TransformationMethod>
                    <e0:EncryptionInfo
xmlns:e0="http://TrustedXml_01/transformers/AIBE">
<e0:KeyProviderService>http://TrustedXml_01/aibe/cgc.svc</e0:KeyProvider
Service>
                        <e0:KeyProviderAction>GetCapability</e0:KeyProviderAction>
                    </e0:EncryptionInfo>
                    <Key>
32,BuLI8ihhSAV3oxa9hm7Dx70BuLI8i,9uzEeIG89oAasixlbDLae9uzEeI,zn
9xpp89kZtTio0zn9x,fmmxLd3Ehg16Efmmx
                    </Key>
                </t0:KeyInfo>
                <t0:Data xmlns:t0="http://TrustedXml_01/transformers">
                    <t0:TransformationMethod>
                        <t0:Type>Encrypt</t0:Type>
                        <t0:Algorithm>AES</t0:Algorithm>
                    </t0:TransformationMethod>
                    <t0:Value>
pDB9AaoGgBMbkUAox/+thz6IlIWpE21Qj0ZiW8I9vQ91OA3WrRaIUTWg
9iDqvgu7svclH1SjENgBWDzlo5gaWYX1D+Ib3j6VpGX13mwd5Dq5FctLQ
```

-continued

```
FbSLWZCBzsCC/ORbe6A1iwk+6fGam/GrVcyuXeocIxUsmSBc0hhhwwdbz
2IKpvY+rqW63uglgcbn4pyMbnOdiofbPOroqVXyCbFCDGbS46cmac8YKe
DGrCURayt/yZW3Z7AwCzLvN3py6LBZvj8W4lJbzND5fa/S3bdfg==
                        </t0:Value>
                    </t0:Data>
                </TransformedData>
        </BloodTest>
        <MRITest>
            <TestData labname="Mela">
                <data> ... </data>
            </TestData>
        </MRITest>
        <XRayTest>
            <TestData labname="Lest" action="decode">
                <TransformedData>
                    <t0:KeyInfo xmlns:t0="http://TrustedXml_01/transformers">
                        <t0:TransformationMethod>
                            <t0:Type>Encrypt</t0:Type>
                            <t0:Algorithm>AIBE</t0:Algorithm>
                        </t0:TransformationMethod>
                        <e0:EncryptionInfo
xmlns:e0="http://TrustedXml_01/transformers/AIBE">
<e0:KeyProviderService>http://TrustedXml_01/aibe/cgc.svc</e0:KeyProvider
Service>
                            <e0:KeyProviderAction>GetCapability</e0:KeyProviderAction>
                        </e0:EncryptionInfo>
                        <Key>
32,ooxa9hmSoxa9hm7DSAV3oxai,iDqvgu7svclH1SjENgBWDzlo5gaWYX1,
4QGr6DKikZ0gMxFePz,DLa42gFFe9uzEeI
                        </Key>
                    </t0:KeyInfo>
                    <t0:Data xmlns:t0="http://TrustedXml_01/transformers">
                        <t0:TransformationMethod>
                            <t0:Type>Encrypt</t0:Type>
                            <t0:Algorithm>AES</t0:Algorithm>
                        </t0:TransformationMethod>
                        <t0:Value>
bSLWZCBzsCWDzlo5gaWYX1D+Ib3j6VpGX13mwd5Dq5FctLQFbSLWZC
BzsCC/ORbe6A1CbFCDGbS46cm+6fGam/GrVcyuXeocIxUsmSBc==
                        </t0:Value>
                    </t0:Data>
                </TransformedData>
            </TestData>
            <TestData labname="Vanta">
                <data> ... </data>
            </TestData>
        </XRayTest>
    </LabResults>
</PatientInfo>
```

The above example thus highlights that any data obscuring or other mathematical transformations can be applied to different parts of the XML data encoding the different parts differently, and enabling selective access into the data.

With respect to decoding, initially, a capability is retrieved or received by a requesting entity. To obtain a capability, the decoder supplies the 'Identity Keyword' (w) to the CGC asking for the 'Capability' (C). Depending on the request, the CGC supplies the capability (C) for the given 'Identity Keyword'.

In this regard, the supplied Capability opens the (K') for the matched 'Identity Keyword' (w), but not other K's. In the given sample, if the user wants to get the 'Name' in the document, the user supplies the 'Identity Keyword' (w) for the element 'Name'.

Here the (w) will be "JK392E8DName".

Once the user obtains the Capability, it can be applied on the K' to get the K according to the following:

$$AIBE(K', PUB, C) \to K$$

Now, with K, the user will be able to Decrypt the R' using the K, e.g., as follows:

$$AES_K(R') \to R$$

Various additional embodiments and detail regarding a federated trust overlay architecture as described for containerless data is provided below for supplemental context.

Supplemental Context for Trustworthy Cloud Services Ecosystem

As described above, independent data protection and cryptographic techniques are variously combined to enhance privacy, trust and security concerning data, e.g., stored as a data, at a remote site, such as maintained by a CSP. While a general ecosystem is described below in the context of a general data or network service, such general data or network service can be used to for any one or more of the above-described scenarios for storing data at a remote site.

A digital escrow pattern is provided for network data services including searchable encryption techniques for data stored in a cloud, distributing trust across multiple entities to avoid compromise by a single entity. In one embodiment, a key generator, a cryptographic technology provider and a cloud services provider are each provided as separate entities, enabling a publisher of data to publish data confidentially (encrypted) to a cloud services provider, and then expose the encrypted data selectively to subscribers requesting that data based on subscriber identity information encoded in key information generated in response to the subscriber requests.

With respect to the searchable encryption/decryption algorithm(s), a searchable public key encryption (PEKS) scheme implemented by one or more cryptographic technology providers generates, for any given message W, a trapdoor TW, such that TW allows a check of whether a given ciphertext is an encryption of W or not, where TW does not reveal any additional information about the plaintext. In accordance with various embodiments described below, PEKS schemes can be used to prioritize or filter encrypted data, such as encrypted messages, based on keywords contained in the data, e.g., the message text. A data recipient can thus be given selected access to parts of the encrypted data relating to keyword(s) by releasing the capabilities (sometimes called "trapdoors" by cryptographers) for the corresponding keyword(s). This way, the encrypted data can be checked for these keywords, but there is assurance that nothing more will be learned from a subscriber than the subscriber's capabilities allow.

For the avoidance of doubt, while PEKS is disclosed as an algorithm for implementing searchable encryption in one or more embodiments herein, it can be appreciated that a variety of alternative algorithms exist for achieving searchable encryption. Some exemplary non-limiting alternatives to PEKS, for instance, include Oblivious RAMs. Thus, the terminology "Searchable Encryption" as used herein should not be limited to any one technique and thus refers to a wide range of encryption mechanisms or combination of encryption mechanisms that allow selective access of a subset of encrypted data based on search or query functionality over the encrypted data.

Optionally, validation and/or verification of results can be provided as an additional benefit to subscribers and publishers of data in the ecosystem. Validation provides a way of validating that the items of data received as a result of a subscription request for a subset of data is the correct set of items, i.e., that the correct subset of data that should have been received was in fact received. A technique in the cryptographic arts is proof(s) of data possession (PDP); however, for the avoidance of doubt, PDP is just an example algorithm that can be implemented and that others that achieve the same or similar objectives can be used. Provable or Proof(s) of Data Possession is a topic about how to frequently, efficiently and securely verify that a storage server is faithfully storing its client's potentially large outsourced data. The storage server is assumed to be untrusted in terms of both security and reliability.

Verification of results provides an additional mechanism for checking that the contents of the items themselves, i.e., to ensure that the items received in connection with the subscription request were not tampered with by any unauthorized entity. An example of verification in the cryptographic arts is proof(s) of data possession (PDP); however, for the avoidance of doubt, PDP is just an example algorithm that can be implemented and that others that achieve the same or similar objectives can be used. Another technique known in the cryptographic arts is proof(s) of retrievability (POR); however, for the avoidance of doubt, POR is just an example algorithm that can be implemented and that others that achieve the same or similar objectives can be used. A POR is a compact proof by a service provider or data hoster (prover) to a client (verifier) that a target file F is intact, in the sense that the client can fully recover file F, and that no tampering has occurred.

As an additional option, the ecosystem can implement notions of anonymous credentials, whereby publishers can upload information about themselves in an anonymous way without exposing critical details, and subscribers can be limited by their capabilities so that they cannot be exposed or provided access to critical details uploaded by a publisher. In this way, a publisher or subscriber can interact with the system while exposing only as much information as they wish to third parties.

Conventional web services have been limited to static client server arrangements and statically defined user policy for accessing data of the web service. However, when many publishers and subscribers are contemplated according to constantly changing and evolving complex business and other relationships, such conventional web services model fail to be flexible or secure enough. Accordingly, in various embodiments, late binding is enabled such that publishers and/or owners of data and content can change access privileges to encrypted content based on who the subscriber(s) are, based on their capability(ies) and based on what they are looking for, e.g., based on the keyword(s) employed in a request for data. Thus, what a subscriber can selectively access changes dynamically consistent with changes to the access privileges by the publishers and/or owners, since subscriber capabilities are encoded in the key information provided by the key generator on the fly. Thus, subscriber privileges are defined for a given request at the time of key generation for the request, and thus always reflect current policy with respect to request from the subscriber.

Similarly, an administrator of a server of a trustworthy cloud service can be permitted to observe the log of activity and data transactions handled by the server, but can also be restricted from seeing any customer names or credit card information. The identity of the subscriber can thus be the basis for limiting the kind of data the subscriber can access.

Various non-limiting embodiments of a trustworthy ecosystem are presented herein in the context of building trust for a cloud service; however, the trust building of the ecosystem provided herein is much more general, and not limited to application to cloud services. Rather, the embodiments described herein are similarly applicable to different servers or participants within enterprise data centers. Thus, while the data may never leave a given entity, the techniques for building trust as described herein are equally applicable where different processes within an enterprise operate within separate regions of control. Without visibility across all enterprise processes, similar mistrust issues can develop as if the participants were external to the enterprise. For instance, a Server could be breached within the enterprise, even though it is in the control of the administrator, or the administrator could be careless or malicious.

In addition to applying to encrypted data in the cloud, the various techniques of the subject disclosure can also apply to data stored on a laptop or other portable device, since the laptop may be lost or stolen. In such a case, the device could end up in the possession of an overly curious or malicious entity; however, the same techniques described herein that apply to protecting data in the cloud can also be applied to protect data on servers or laptops. If the local data is encrypted, without proper subscriber credentials, a thief will not be able to understand the local encrypted data being able to show no proper role or capabilities to access the data.

Figure 37:
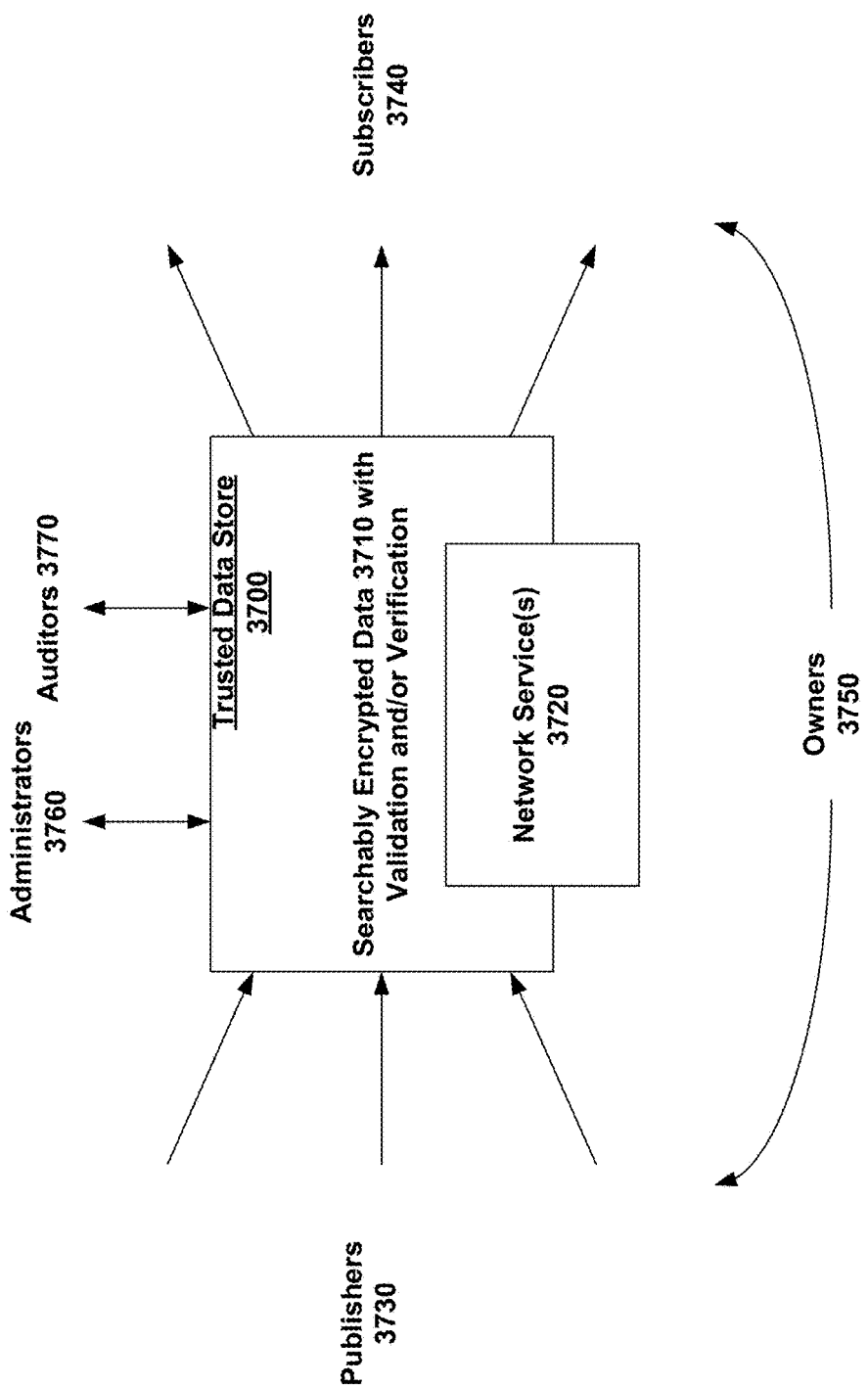
FIG. 37 is a block diagram of a trustworthy cloud services framework or ecosystem in accordance with an embodiment.

FIG. 37 is a block diagram of a trustworthy cloud services framework or ecosystem in accordance with an embodiment. The system includes a trustworthy data store 3700 for storing searchably encrypted data 3710 with the results of subscriber requests being subject to validation and/or verification. In this regard, network services 3720 can be built on top of the secure data 3710 such that the publishers of the data retain control over the capabilities granted to subscribers 3740 who request the data, e.g., via network service(s) 3720. Publishers 3730 can also be subscribers 3740, and vice versa, and owners 3750 of the data can be either publishers 3730 and/or subscribers 3740 as well. As an example of some common roles and corresponding sets of capabilities that can be defined, a specialized kind of publishers 3730 and subscribers 3740 are administrators 3760 and auditors 3770.

For instance, administrators 3760 can be a specialized set of permissions over data 3710 to help maintain the operation of trustworthy data store 3700, and auditor entities 3770 can help maintain the integrity of certain data within scope of the audit. For instance, an auditor 3770 could subscribe to messages of data 3710 containing offensive keywords in which case the auditor 3770, if permitted according to capabilities granted, would be alerted when messages of data 3710 contained such offensive keywords, but unable to read other messages. In this regard, a myriad of scenarios can be built based on the ability to place publisher data into digital escrow such that keys can be handed out enabling selective access to that data.

For instance, a publisher authenticates to the ecosystem and indicates a set of documents to upload to the ecosystem. The documents are encrypted according to a searchable encryption algorithm based on cryptographic key information received from a separate key generator that generates the cryptographic key information. Then, the encrypted data is transmitted to a network service provider for storage of the encrypted data such that the encrypted data is selectively accessible according to late binding of selected privileges granted to a requesting device based on identity information of the requesting device. Separating the cryptographic technology provider from the storage of the encrypted data additionally insulates the encrypted data from further compromise.

Figure 38:
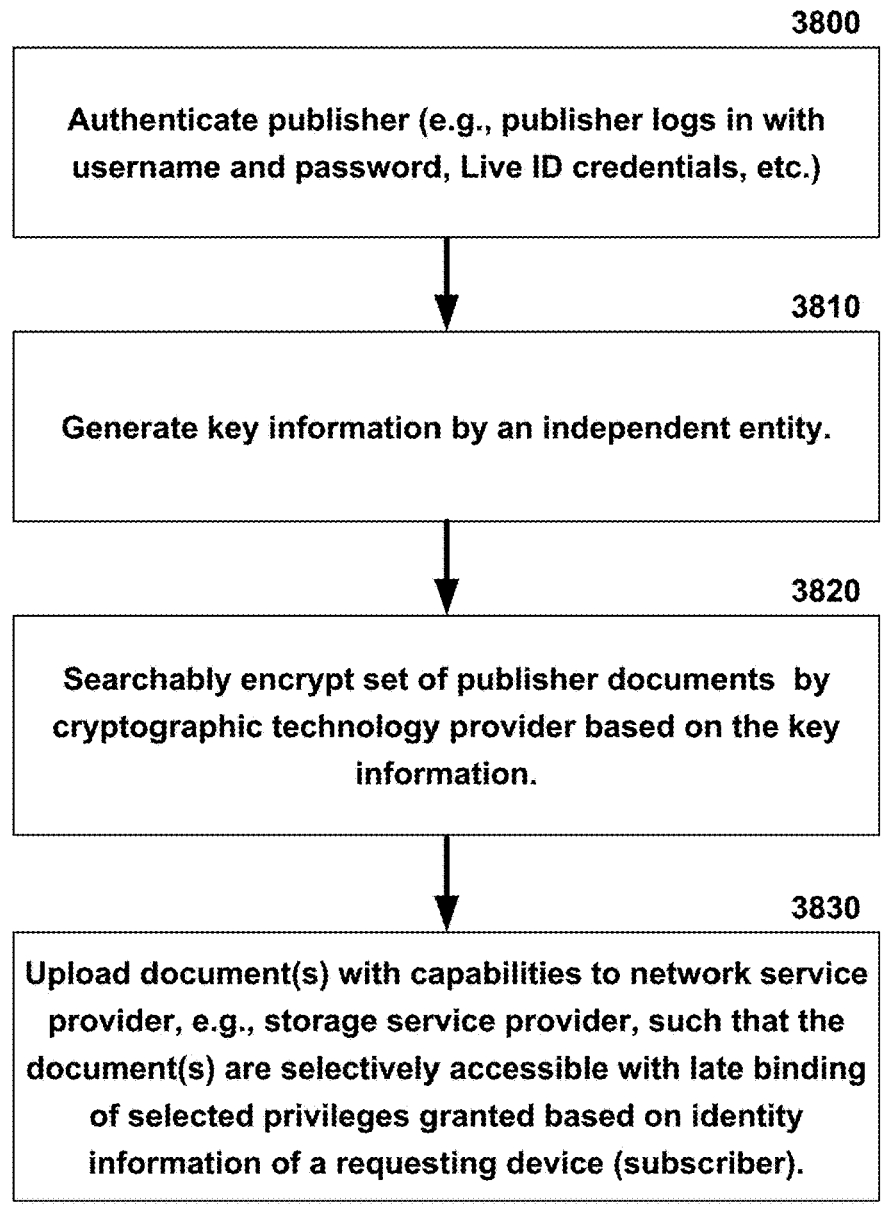
FIG. 38 is a flow diagram illustrating an exemplary non-limiting method for publishing data according to the trustworthy cloud services ecosystem.

In this regard, FIG. 38 is a flow diagram illustrating an exemplary non-limiting method for publishing data according to the trustworthy cloud services ecosystem. At 3800, a publisher authenticates to the system (e.g., publisher logs in with username and password, Live ID credentials, etc.). At 3810, key information is generated by key generator, such as a center for key generation as described in one or more embodiments below. At 3820, a separate cryptographic technology provider encrypts a set of publisher documents based on the key information. At 3830, the encrypted documents are uploaded with capabilities to network service provider, e.g., storage service provider, such that the encrypted document(s) are selectively accessible with late binding of selected privileges granted based on identity information of a requesting device (subscriber).

On the subscriber side, for example, a subscriber authenticates to the ecosystem and indicates a request for a subset of data, e.g., a query for a subset of documents containing a given keyword or set of keywords. In response to a request for a subset of searchably encrypted data from at least one subscriber device, a key generation component generates cryptographic key information based on identity information associated with the subscriber device. Then, the subset of encrypted data is decrypted as a function of privileges granted the subscriber device as defined in the cryptographic key information.

Figure 39:
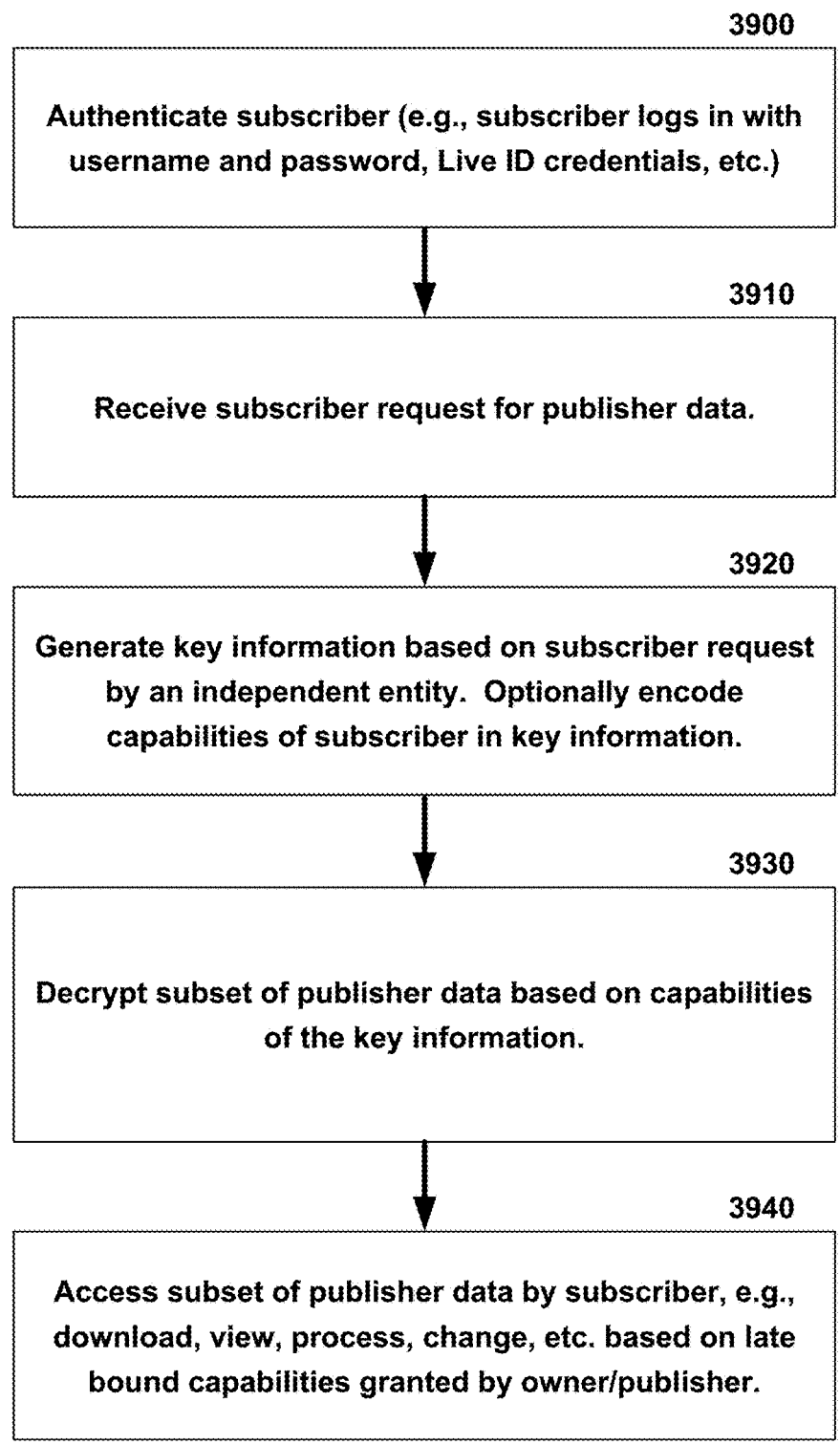
FIG. 39 is a flow diagram illustrating an exemplary non-limiting method for subscribing to data according to the trustworthy cloud services ecosystem.

FIG. 39 is a flow diagram illustrating an exemplary non-limiting method for subscribing to data according to the trustworthy cloud services ecosystem. At 3900, a method for subscribing to data includes authenticating a subscriber (e.g., subscriber logs in with username and password, Live ID credentials, etc.). At 3910, a subscriber makes a request for data. At 3920, key information is generated by an independent key generation entity based on the subscriber request, where the capabilities of the subscriber can be defined in the key information. At 3930, a subset of publisher data is decrypted based on the capabilities defined in the key information. For instance, the CSP can decrypt the data. At 3940, the subset of publisher data is made accessible to the subscriber, e.g., the subscriber can download, view, process, change, etc. the data based on the dynamically definable capabilities granted by owner/publisher. Optionally, the technology used for encryption, decryption and key generation can be supplied by a separate cryptographic technology provider, but hosted by any participant.

In one embodiment, the identity information of the subscriber device includes a role of the subscriber. For instance, an auditor role, or administrator role, or other pre-specified role can be used by publishers/owners as a basis for restricting or granting access to various portions of the searchably encrypted data store.

Figure 40:
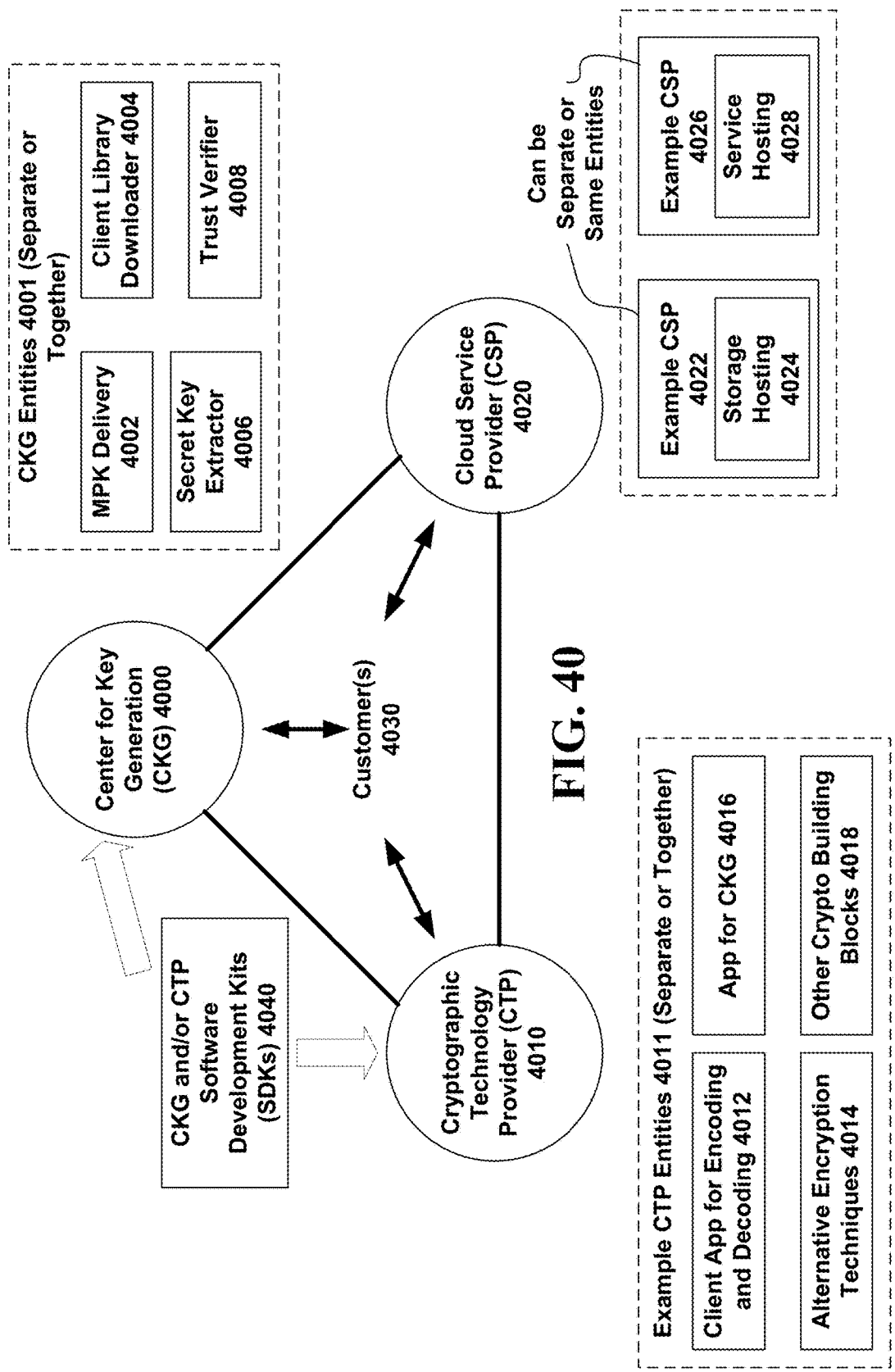
FIG. 40 illustrates an exemplary ecosystem showing the separation of center for key generation (CKG), cryptographic technology provider (CTP) and cloud service provider (CSP) in a trustworthy ecosystem.

FIG. 40 illustrates an exemplary ecosystem showing the separation of center for key generation (CKG) 4000, cryptographic technology provider (CTP) 4010 and cloud service provider (CSP) 4020 thereby eliminating the possibility of compromise by a single entity in the trustworthy ecosystem. In this regard, customer(s) 4030 include publishers and/or subscribers of data. Optionally, CKG 4000 can be built based on reference software, open source software, and/or a software development kit (SDK), e.g., provided by CTP 4010, enabling the building blocks for parties to create such components by themselves, or be satisfied by third party implementations of such ecosystem components. In one embodiment, the SDK is provided by the CTP 4010, and can be used by one or more participants to host or implement CKG 4000, a compute and storage abstraction (CSA) described in more detail below and/or cryptographic client libraries. Optionally, the SDK can be distributed to the entity hosting the CKG 4000 from CTP 4010.

In general, each of CKG 4000, CTP 4010 or CSP 4020 can be subdivided into subcomponents depending on a given implementation, however, the overall separation is preserved to maintain trust. For instance, CKG entities 4001, such as master public key (MPK) delivery 4002, client library downloader 4004, secret key extractor 4006, trust verifier 4008, or other subcomponents, can be provided separately, in subsets, or together as an integrated component. CTP entities 4011, such as client app for encoding and decoding 4012, alternative encryption techniques 4014, an application for interfacing with the CKG 4016, other crypto building blocks 4018, etc., can also be provided separately, in subsets or together. Moreover, CSP 4020 can be thought of as many separate service providers, such as CSPs 4022, 4026 hosting storage service 4024 and service hosting 4028, respectively, or such services can be provided together.

It can be appreciated that the CKG, or CKG instance(s) hosted by one or more participants in the trustworthy ecosystem, is not required to be a single monolithic entity. Rather, the CKG can be separated into a number of (redundant) entities that cooperate to generate keys, so that operation can continue even if a small subset of the participants are offline. In one embodiment, optionally, a set of participants can be trusted in aggregate even if a small subset of these participants have been compromised by an adversary, or otherwise become unavailable or untrusted.

Figure 41:
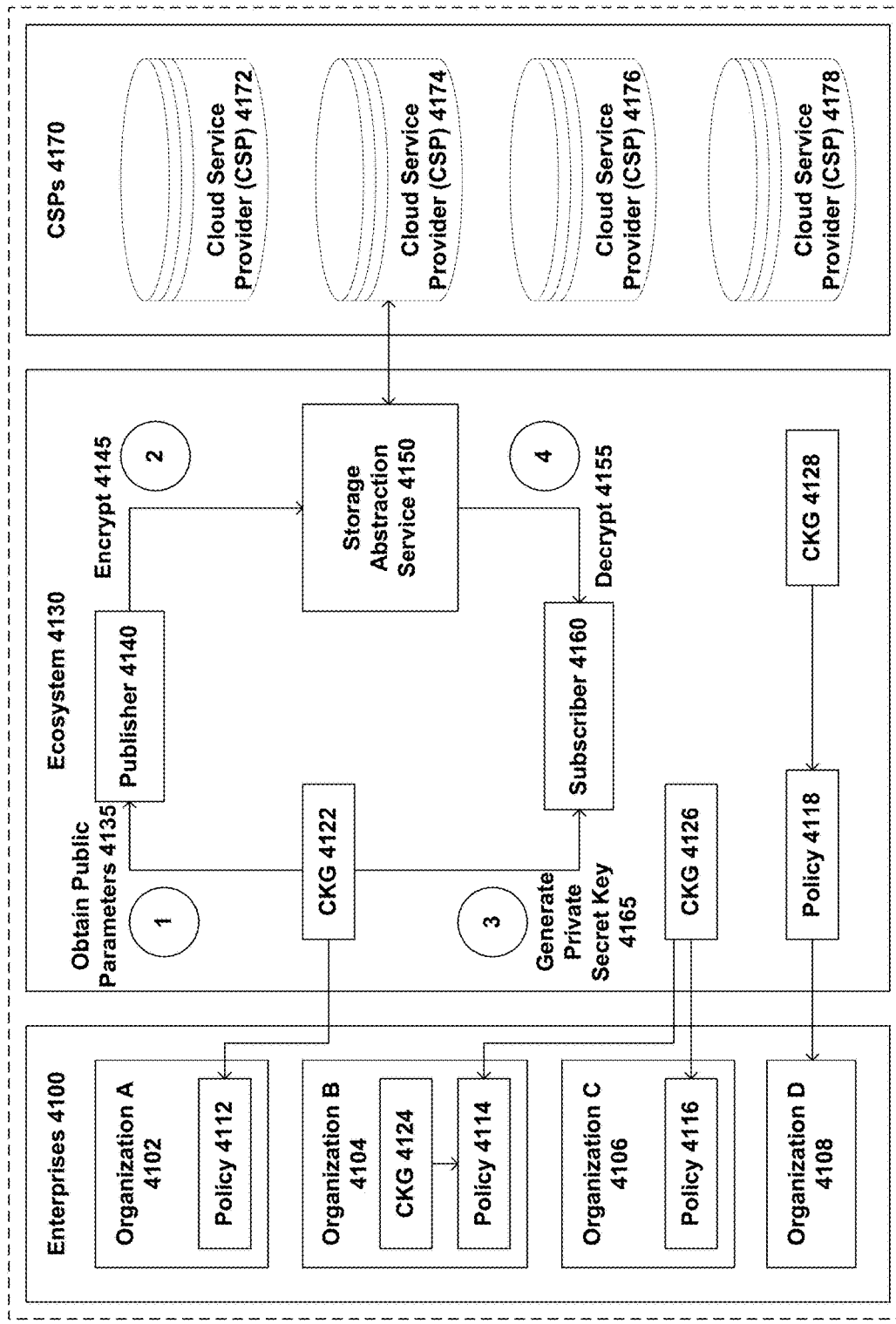
FIG. 41 is another architectural diagram illustrating further benefits of a trustworthy ecosystem for performing cloud services for enterprises.

FIG. 41 is another architectural diagram illustrating further benefits of a trustworthy ecosystem for performing cloud services for enterprises 4100. For instance, enterprises 4100 can include different organizations 4102, 4104, 4106, 4108. The different organizations 4102, 4104, 4106, 4108 in this diagram illustrate that organizations can take on as much or as little ownership with respect to implementing policy for using the system, or key generation. For instance, organization 4102 implements its own policy 4112, but uses a centralized key generator 4122 whereas organization 4104 chooses to implement its own key generator 4124 and implement its own policy 4114. Organization 4106 also implements its own policy but relies on a third part CKG 4126 whereas organization 4108 chooses to rely on a third party policy provider 4118 and an independent CKG 4128.

In this regard, to publish data, a publisher 4140 obtains public parameters for encrypting data 4135 based on the output from CKG 4122. Based on the public parameters, the data is encrypted by the publisher device 4140 at 4145 using an independent cryptographic technology provider. The encrypted data is uploaded to a storage abstraction service 4150, which hides the storage semantics in connection with storing the encrypted data by one or more CSPs 4170, such as CSPs 4172, 4174, 4176, or 4178. On the subscriber device 4160, a request for data results in the generation of a private secret key 4165 from CKG 4122. The private secret key 4165 includes information that enables the subscriber device 4160 to selectively access the searchably encrypted data by decrypting the data at 4155. Again, the semantics of retrieving the data from CSPs 4170 is hidden by the storage abstraction service 4150. Also, the privileges granted to the subscriber device 4160 are the current set of privileges due to late binding of capabilities granted by publishers/owners.

It can be appreciated from FIG. 41 that multiple data owners, either enterprises or consumers, can participate in a trustworthy ecosystem as described herein to establish trusted relationships. In such case, each owner can host, or control their own CKG (e.g., CKG 4124 of organization 4104) so that requests or queries for data are forwarded to the corresponding CKGs to gather the necessary keys from all co-owners of the requested data.

Figure 42:
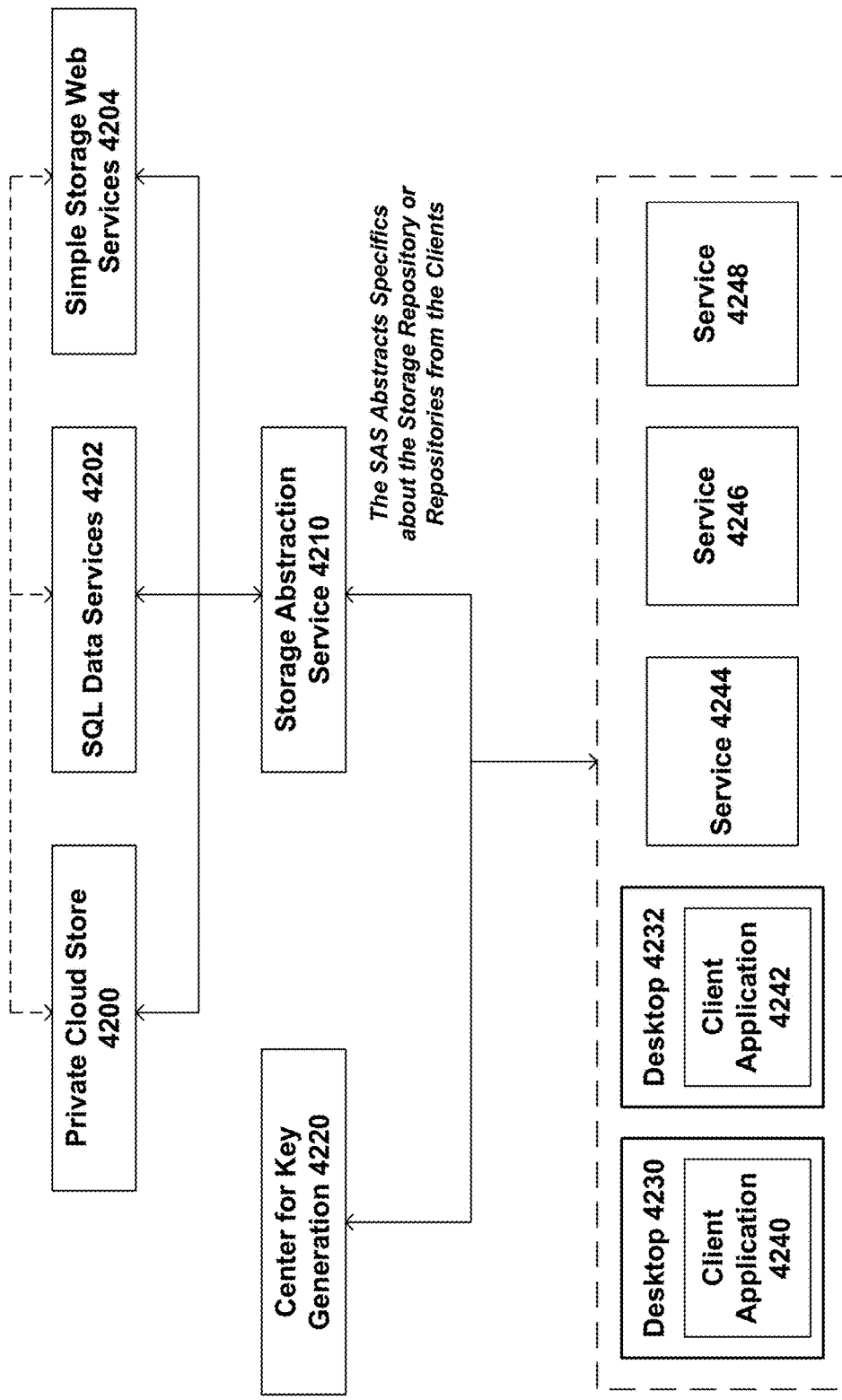
FIG. 42 is another block diagram illustrating the accommodation of different storage providers via a storage abstraction layer.

FIG. 42 is another block diagram illustrating the accommodation of different storage providers via a storage abstraction layer 4210. With the trustworthy ecosystem, desktops 4230, 4232 having client applications 4240, 4242, respectively, may publish or subscribe to data as described above, initiating a request to the center for key generation 4220 for key information for use in encrypting or decrypting data. Similarly, services 4244, 4246, 4248 might also be a publisher and/or a subscriber in the ecosystem. In this regard, to make the storage or extraction of data by any of a private cloud store 4200, SQL data services store 4202, or simple storage web service 4204, etc., the storage abstraction service 4210, as the name implies, abstracts the specifics about the particular storage repository or repositories away from the clients.

In this regard, for the avoidance of doubt, FIG. 42 is directed to multiple situations. In one situation, FIG. 42 covers the disintermediation of storage providers (abstracting them out as individuals) through the Storage Abstraction Service, also referred to sometimes as the Compute and Storage Abstraction (CSA). In addition, FIG. 42 covers scenarios where data is segmented and/or fanned out (e.g., for redundancy) to multiple back-end storage providers, which can be of the same or different type, such that the original data can be reconstituted even is one (or a small number) of the back-end Storage Providers accidentally or intentionally delete or alter their copies of the data.

Figure 43:
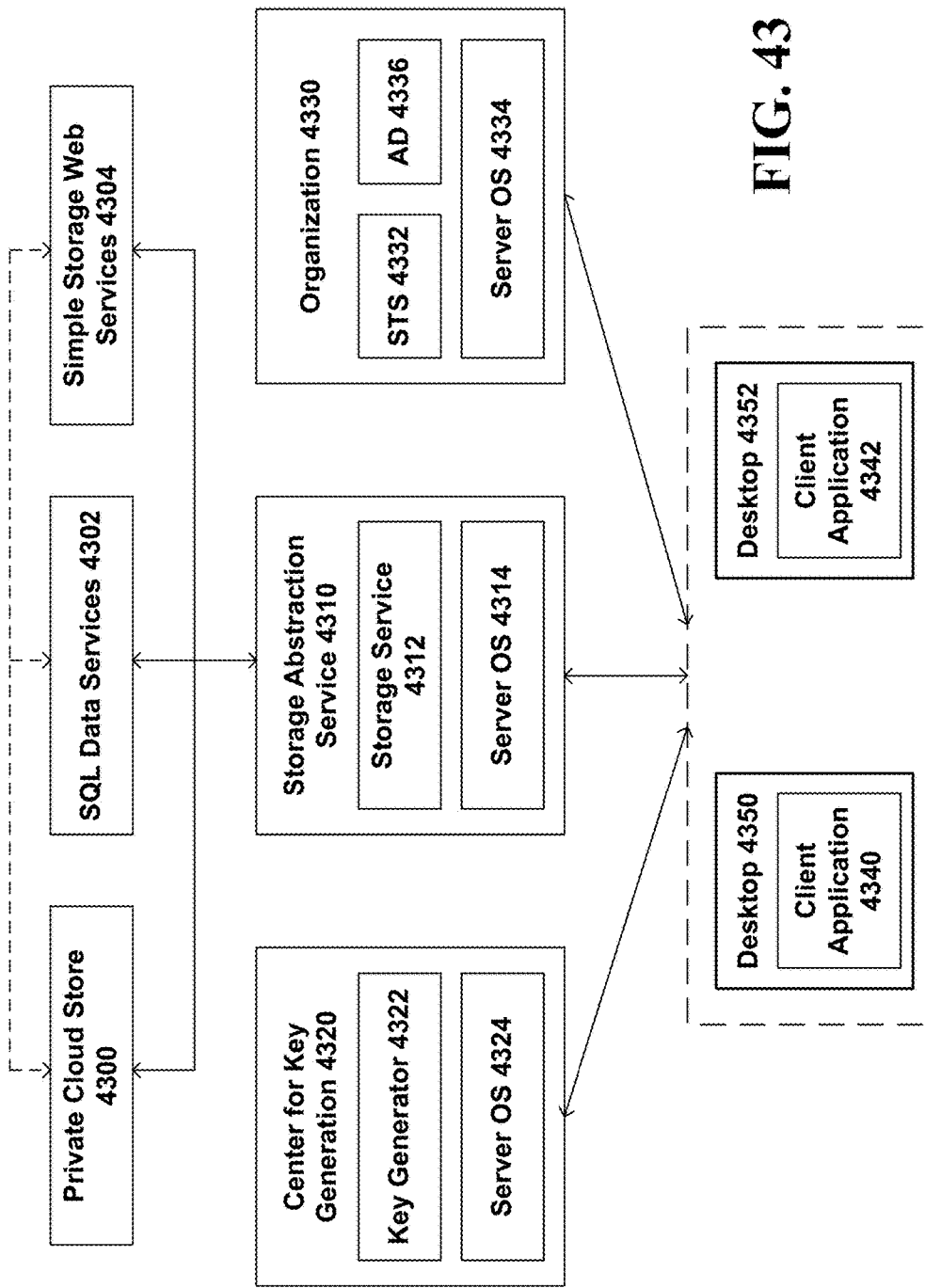
FIG. 43 illustrates further aspects of storage in connection with a storage abstraction service.

FIG. 43 illustrates further aspects of storage in connection with a storage abstraction service 4310 including server operating system (OS) 4314 and a storage service 4312 that abstracts the details of storage of private cloud store 4300, SQL data store 4302, simple storage web service store 4304, etc. The clients can be desktops 4350 or 4352 having client applications 4340 and 4342, respectively. The center for key generation 4320 can include a key generator application 4322 executing on server OS 4324. In this regard, an organization 4330 having active directory 4336, server OS 4334 and security token service (STS) 4332 can be a publisher or subscriber in the ecosystem. In this regard, storage transfer format (STF) is a standard interchange format that can be used for exchanging encrypted data and metadata across repositories. For instance, organization 4330 may wish to transfer e-mail data among storage service providers 4300, 4302 or 4304 in which case STF can be used.

Figure 44:
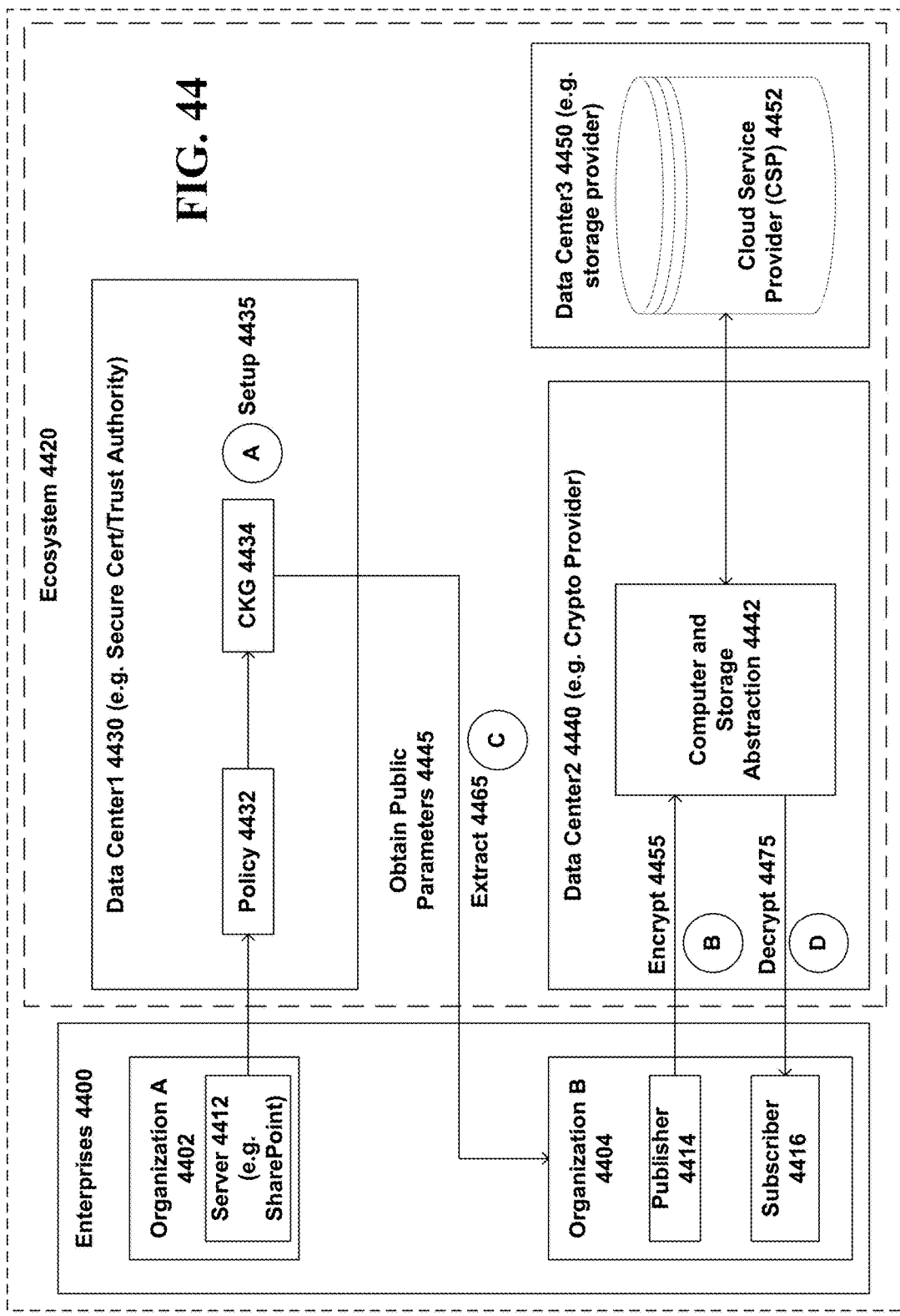
FIG. 44 is another block diagram illustrating various different participants in a trustworthy ecosystem.

FIG. 44 is another block diagram illustrating various different participants in a trustworthy ecosystem 4420. As mentioned, advantageously, enterprises 4400 can offload the storage and maintenance of volumes of data from on-site to cloud storage service providers better suited to handling such volumes while at the same time maintaining comfort that the data will not be decrypted to the wrong subscribers since the enterprise maintains control over capabilities defined over the encrypted data. For instance, an organization 4402 may operate a collaborative application 4412 such as Sharepoint. In this regard, organization 4402 may set up a digital escrow, or trusted domain, for the sharepoint data. The policy 4432 and CKG 4434 can be implemented by a first data center 4430, which operates to setup the secure space by defining cryptographic key information 4445 for the trusted domain.

Then, another organization 4404, e.g., behaving as a publisher 4414, can encrypt data based on the key information obtained from CKG 4434, at which point computer and storage abstraction component 4442 of a second data center 4440 handles the details of storing the searchably encrypted data at a third data center 4450, e.g., in CSP 4452. On the flip side, when a subscriber 4416 of organization 4404 requests data, private or secret key information is delivered to subscriber 4416 as part of extraction 4465. Next, based on the private key information which includes capabilities defined for the subscriber, data requested by the subscriber is decrypted at 4475 assuming the subscriber has privileges, and again abstraction layer 4442 handles the details of the underlying storage 4452.

Figure 45:
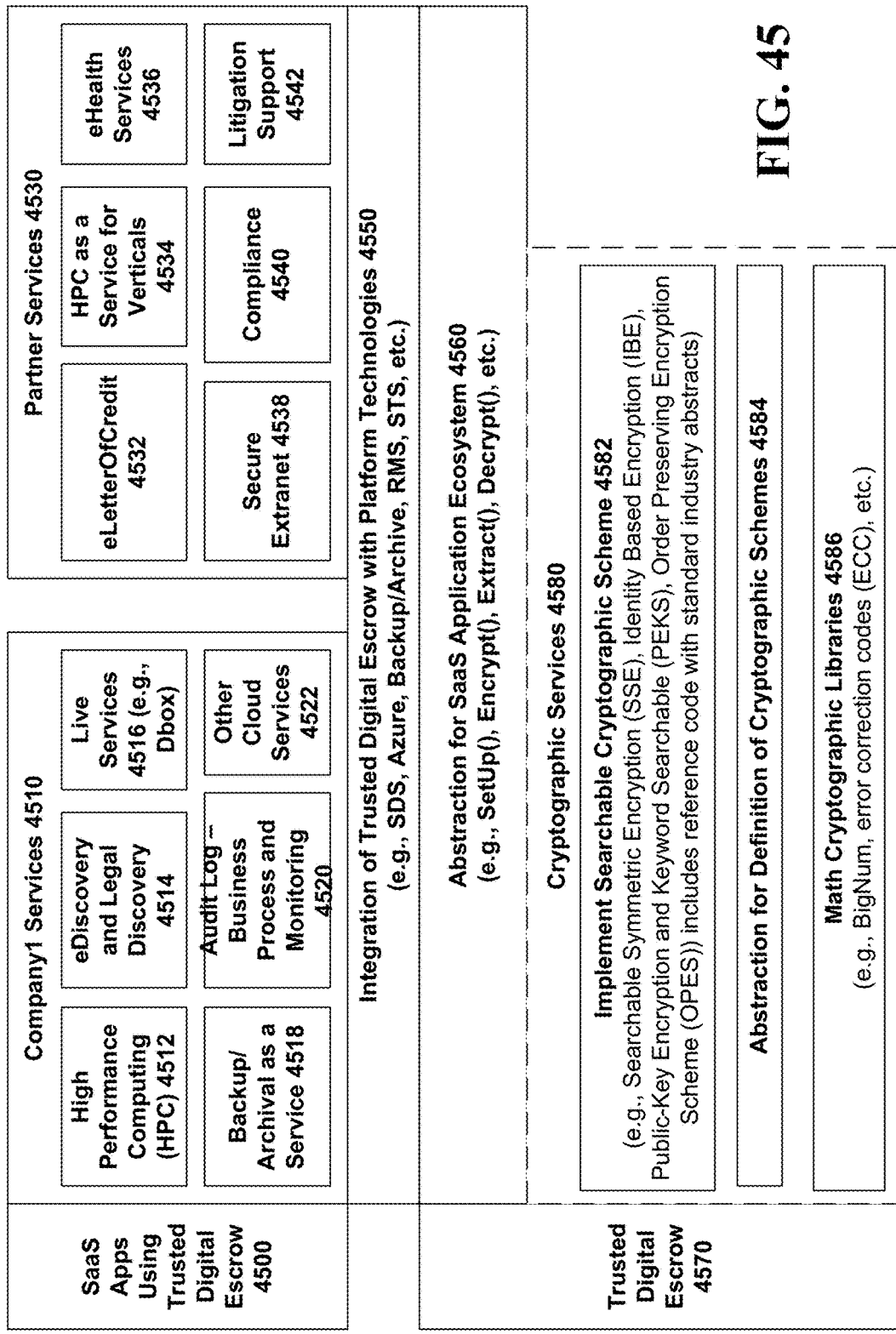
FIG. 45 is a representative view of some layers of an exemplary, non-limiting implementation of a trustworthy cloud computing system in which the different pieces can be provided by different or the same entities.

FIG. 45 is a representative view of some layers of an exemplary, non-limiting implementation of a trustworthy cloud computing system in which the different pieces can be provided by different or the same entities. At the bottom of the layer stack are math and cryptographic libraries 4586 used for implementing the encryption/decryption algorithms. Abstraction of the definitions of various cryptographic schemes can be provided as a middle layer 4584 between the detailed libraries 4586 and the actual implementation of the searchable cryptographic schemes 4582. Together, layers, 4582, 4584 and 4586 form a larger cryptographic services layer 4580, which when combined with an abstraction layer 4560 for the software as a service (SaaS) application ecosystem, form the basis for an implementation of the trusted digital escrow 4570 and storage therefor. The abstraction layer 4560 contains the basic language used to implement the digital escrow pattern, namely commands such as SetUp( ) Encrypt( ) Extract( ), Decrypt( ) etc.).

On top of abstraction layer 4560 is the layer 4550 that ties into various more specific platform technologies (e.g., SDS, Azure, Backup/Archive, RMS, STS, etc.). On top of the layer 4550 that ties into various specific platform technologies are the various SaaS applications that use the trusted digital escrow 4500. The exemplary, non-limiting illustration shows that the digital escrow apps 4500 can be implemented by a single company 4510 or by partners 4530 or by both. For instance, company 4510 may implement services such as high performance computing (HPC), eDiscovery and Legal Discovery 4514, Live Services 4516 (e.g., DBox), backup/archive as a service 4518, audit log—business process and monitoring 4520 or other cloud services 4522. In turn, partners 4530 could implement services such as eLetterOfCredit 4532, HPC as a service for verticals 4534, eHealth services, secure extranet 4538, compliance 4540, litigation support 4542, etc.

Scenarios Based on Trustworthy Cloud Services Ecosystem

Any type of application can be realized in the cloud due to the increased trust inherent in the division of key generator, crypto provider and cloud service provider, and other technique(s) described herein. In this regard, having enabled such a trustworthy cloud services ecosystem, a set of rich services and scenarios can be realized that take advantage of one or more of the benefits of the trustworthy ecosystem described herein.

Figure 46:
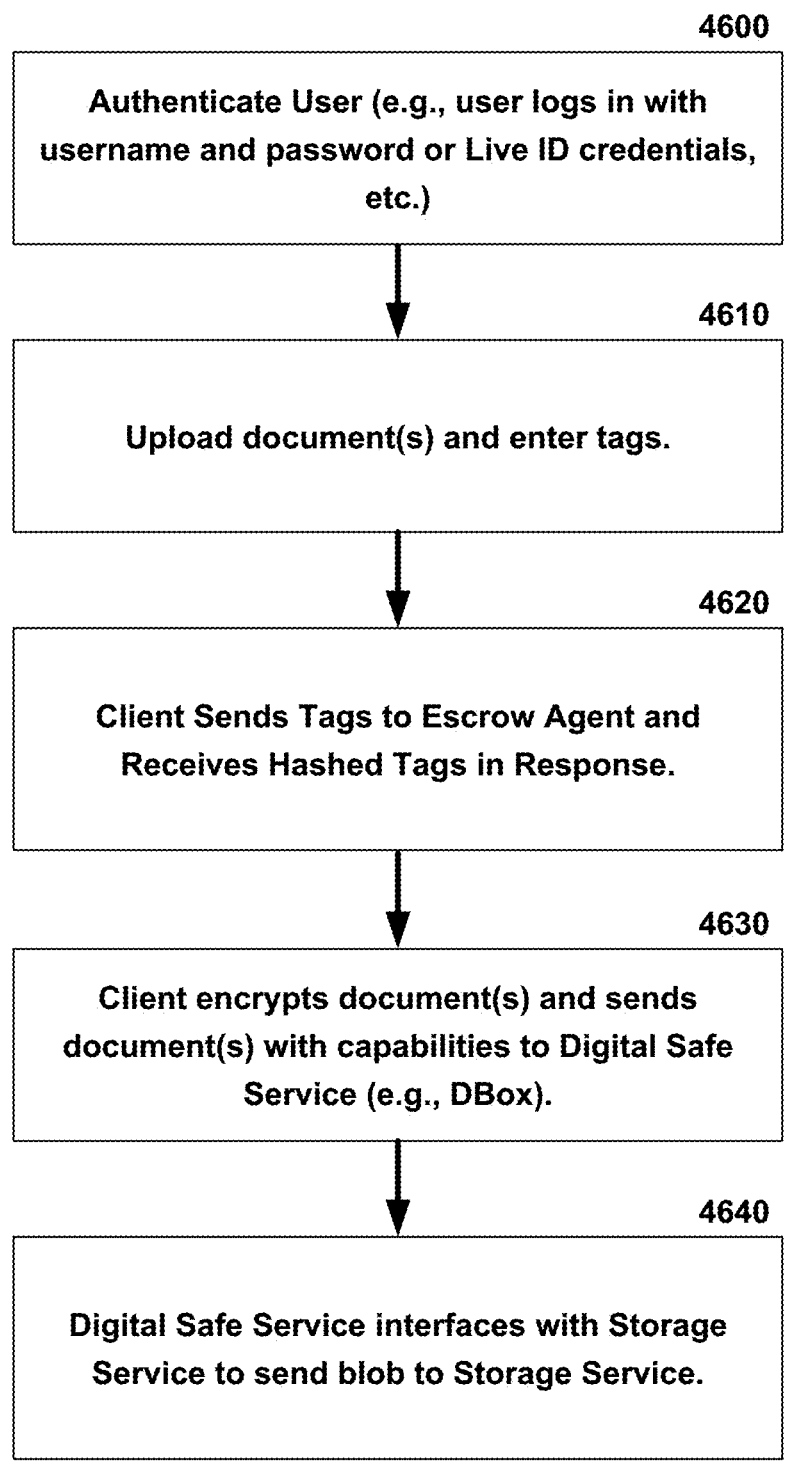
FIG. 46 is a flow diagram of an exemplary non-limiting process for publishing documents to a digital safe application in a way that provides publisher controlled selective access to the data with late binding.

For instance, FIG. 46 is a flow diagram of an exemplary non-limiting process for publishing documents to a digital safe application in a way that provides publisher controlled selective access to the data with late binding as described above. At 4600, a device is authenticates (e.g., the device logs in with a username and password, password credentials, biometric credentials, Live ID credentials, etc.). At 4610, the document(s) are uploaded and tags are entered. The tags are sent to an escrow agent at 4620 and hashed tags are received from the escrow agent in response. In this regard, the tags can be supplied as mentioned, or alternatively can be automatically extracted from the payload (record, document), e.g., through full-text indexing. At 4630, the client encrypts the documents with the publisher's key information and the document(s) are sent to a secure digital cloud storage provider along with capabilities for subscribers with respect to the document(s). At 4640, the secure digital cloud storage provider sends the encrypted blob to a storage service, e.g., vis-à-vis a storage abstraction layer.

Figure 47:
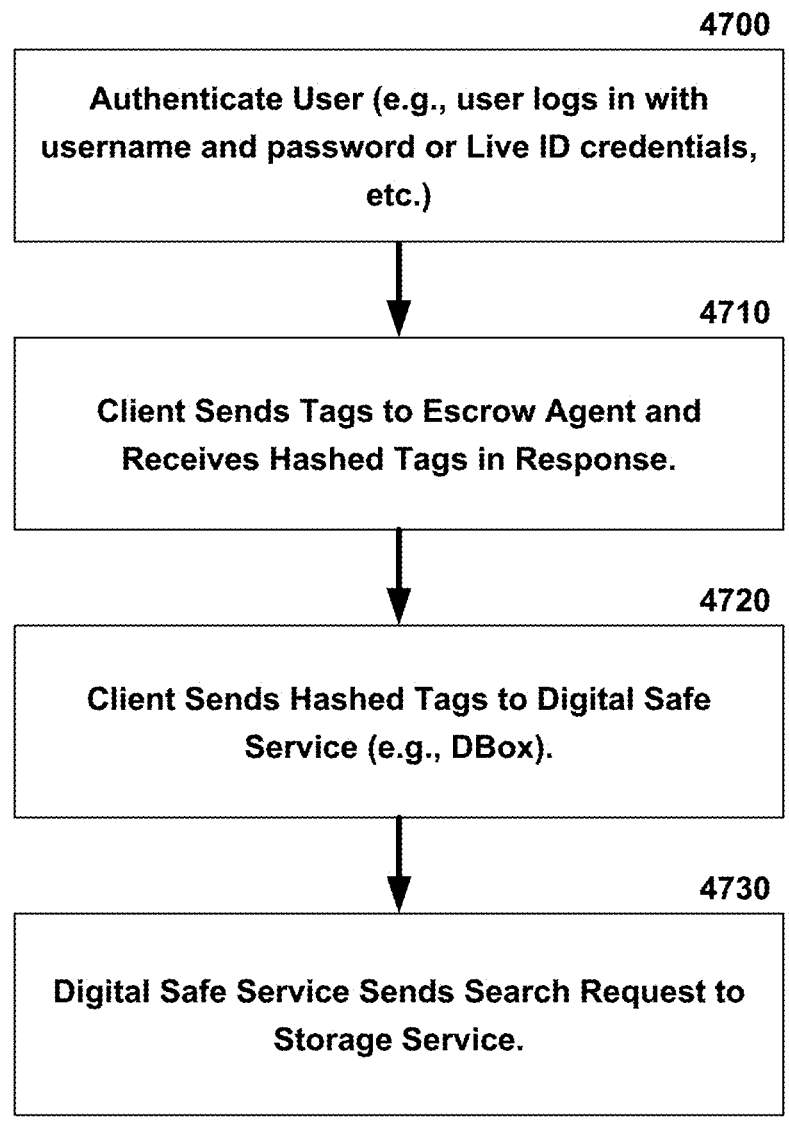
FIG. 47 is a flow diagram of an exemplary, non-limiting process for subscribing to materials placed in the digital safe.

FIG. 47 is a flow diagram of an exemplary, non-limiting process for subscribing to materials placed in the digital safe. At 4700, the subscriber is authenticated and the client device sends tags to an escrow agent who sends back hashed tags in response at 4710. The client then sends the hashed tags to the digital safe service at 4720 and the hashed tags are interpreted to understand whether, at 4730, the client is entitled to have its search request carried out by the storage service, in whole or in part.

Figure 48:
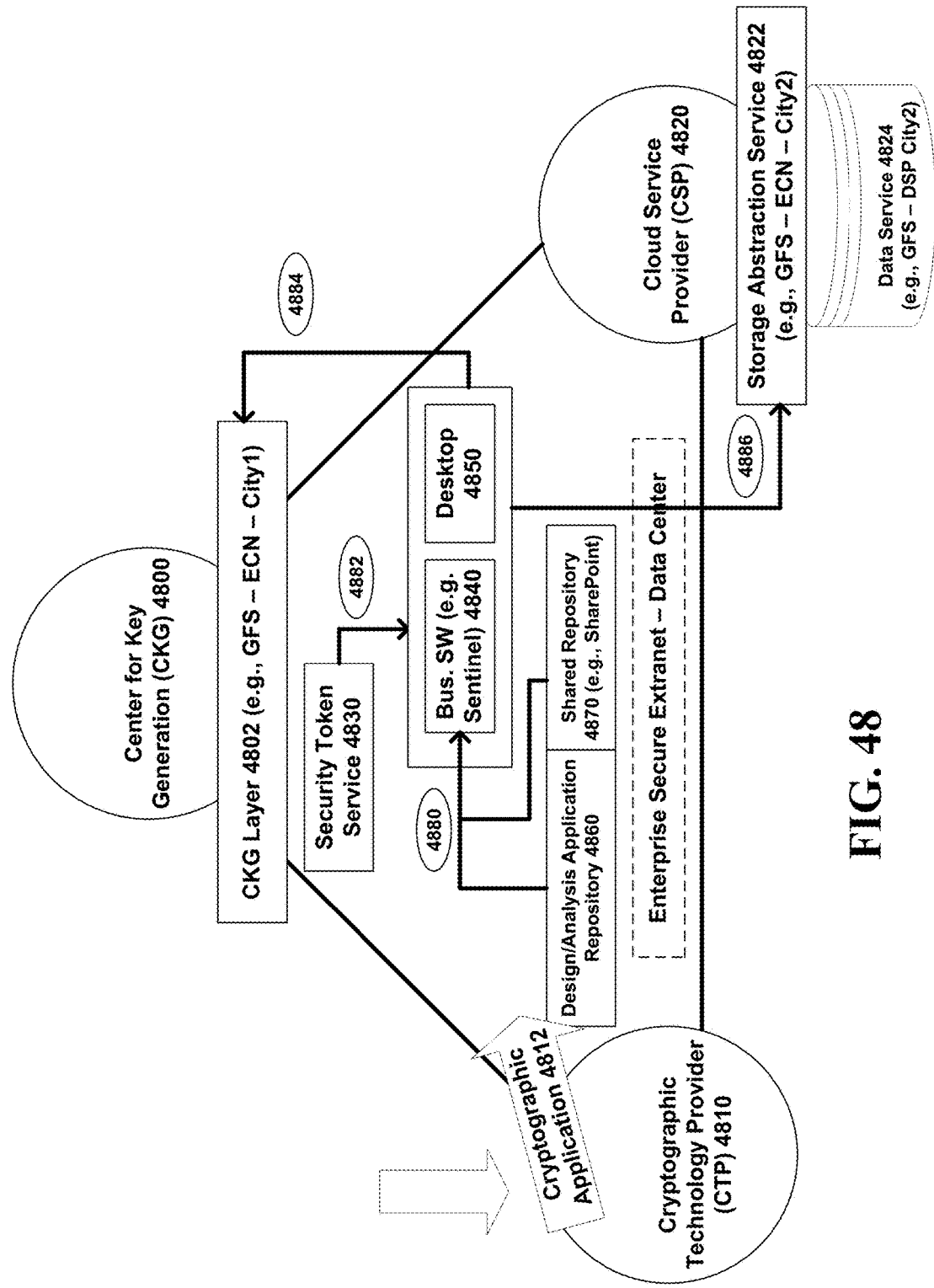
FIG. 48 illustrates an exemplary non-limiting implementation of a trustworthy cloud services using the digital escrow pattern to implement a secure extranet for an enterprise via one or more data centers.

FIG. 48 illustrates an exemplary non-limiting implementation of a trustworthy cloud services using the digital escrow pattern to implement a secure extranet for an enterprise via one or more data centers. As mentioned, the trustworthy computing ecosystem can include a center for key generation 4800 implemented separately from a cryptographic technology provider (CTP) 4810, which provides reference implementations for use in implementing cryptographic techniques consistent with the ecosystem that are implemented separately from one or more cloud service providers (CSPs) 4820. In an exemplary non-limiting implementation of secure extranet, 4880 shows that the enterprise maintains a shared repository 4870 (e.g., SharePoint) and a repository 4860 of design or analysis applications for use in connection with the documents in shared repository 4870. Business software 4840 (e.g., Sentinel) can monitor application or server performance and the like for a computer having desktop 4850.

In this regard, in a trustworthy cloud services ecosystem, when a subscriber using the desktop 4850 seeks information selectively accessible and encrypted from storage, a security token service 4830 can deliver some information to identify the subscriber 4882 and the CKG 4800 can be consulted via interfaces of the CKG layer 4802 of a first data center as shown by 4884. The CKG 4800 returns key information which can then be used to selectively access data as shown by 4886 held by data service 4824 via storage abstraction service 4822. Any type of data can be therefore be shared across an enterprise and selectively according to the roles of the subscribers in the enterprise.

Figure 49:
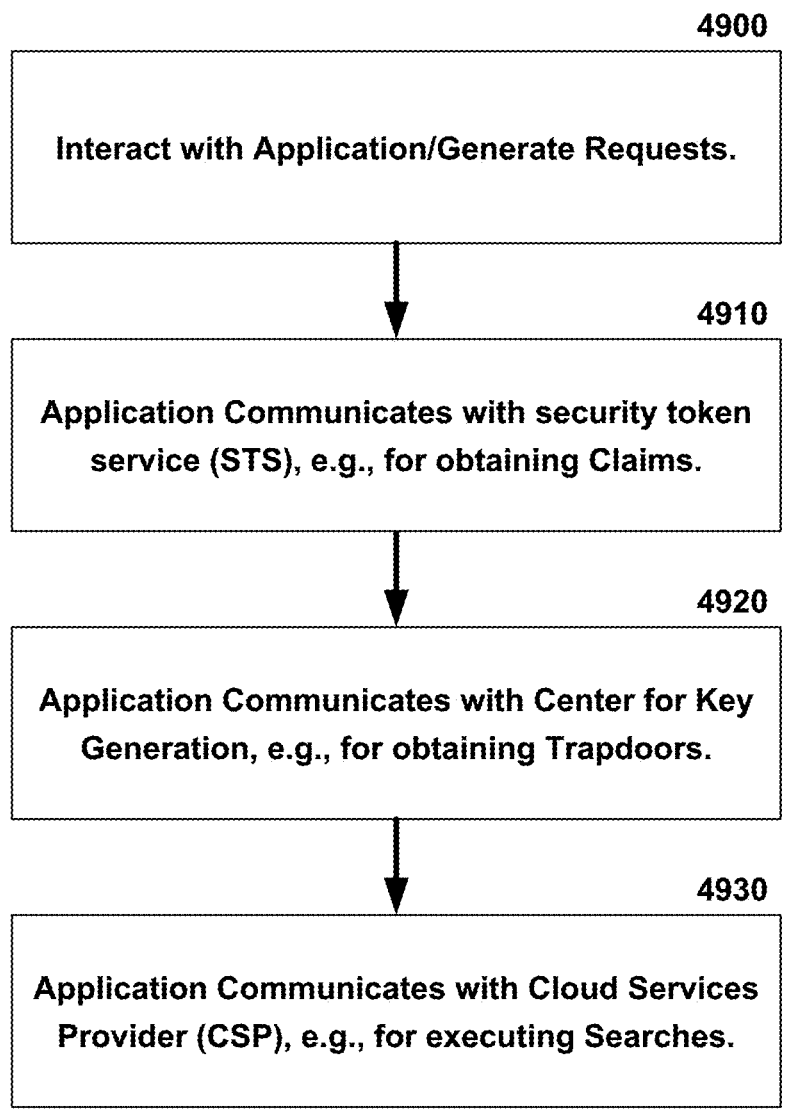
FIG. 49 is a flow diagram illustrating another exemplary non-limiting scenario based on a trustworthy cloud services ecosystem in which a subscriber is given selective access to encrypted data stored by a CSP.

FIG. 49 is a flow diagram illustrating another exemplary non-limiting scenario based on a trustworthy cloud services ecosystem in which a subscriber is given selective access to encrypted data stored by a CSP, e.g., within an enterprise. Initially, the subscriber device has acquired no privileges to access the encrypted data. By making a request for some or all of the encrypted data however, e.g., by interacting with an application, at 4900, the application automatically communicates with a corresponding STS for obtaining Claims (in the parlance of cryptography) at 4910. At 4920, the application communicates with the CKG to obtain key information that encodes information about capabilities for the subscriber (capabilities are sometimes referred to as Trapdoors in the parlance of cryptography, though the term capabilities is not restricted to the context in which the term Trapdoor typically appears). Lastly, the application provides the key information to the CSP at 4930, which permits searches or queries over the encrypted data to the extent allowed by the subscriber's capabilities.

Figure 50:
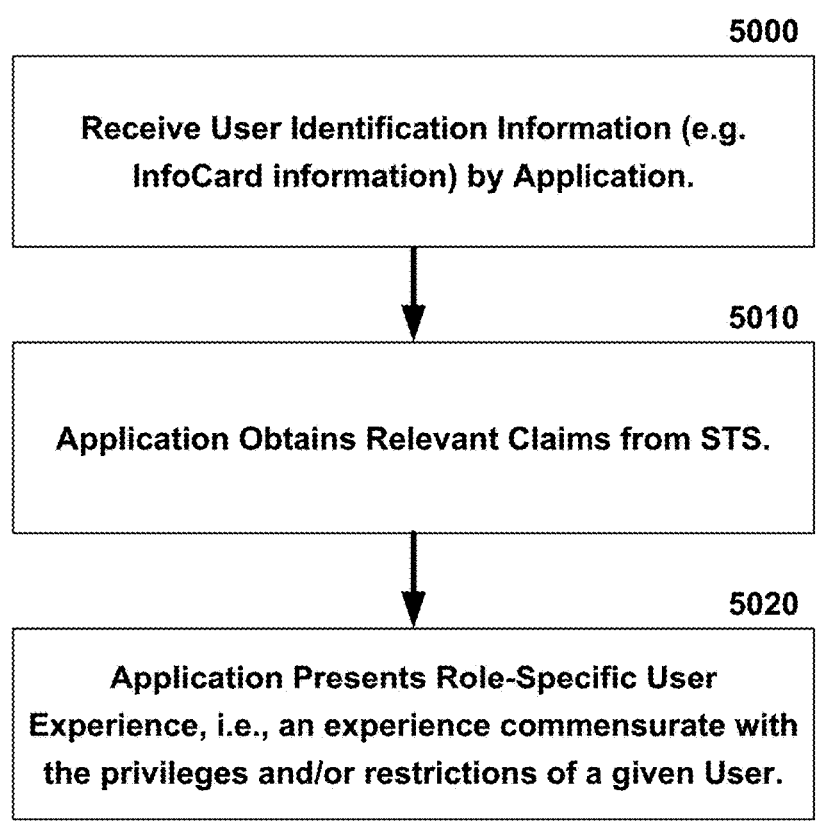
FIG. 50 is another flow diagram illustrating that the application response can be tailored to a subscriber based on sign-in information.

FIG. 50 is another flow diagram illustrating that the application response can be tailored to a subscriber based on sign-in information. For instance, at 5000, user ID information is received by an application. At 5010, the application obtains relevant Claims from the STS. At 5020, based on one or more roles served by the user associated with the user ID information, the experience can be tailored commensurate with privileges/restrictions for those roles. For instance, the user experience with which a company's chief financial officer is presented as a view over the company's encrypted data can and should be a different user experience than the view over the company's encrypted data given to a mail room employee. FIG. 50 can apply to single or multi-party login scenarios.

Figure 51:
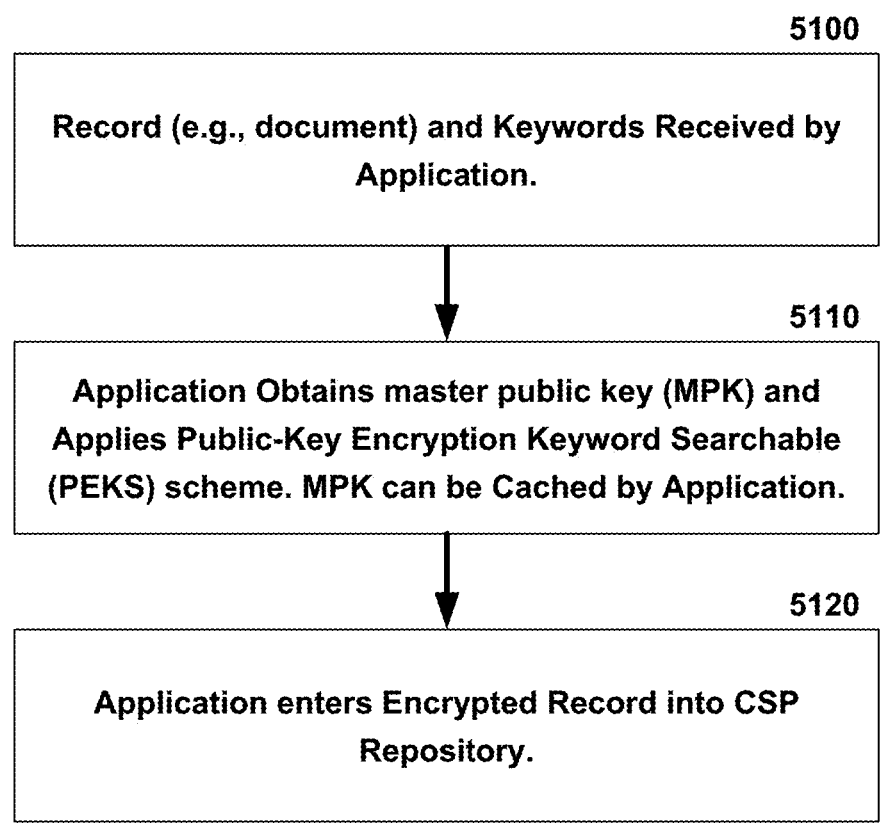
FIG. 51 is another flow diagram illustrating a secure record upload scenario, which can be implemented for a single party or multiple parties.

FIG. 51 is another flow diagram illustrating a secure record upload scenario, which can be implemented for a single party or multiple parties. At 5100, a record and keywords are received by an application, e.g., provided or designated by a user of a device with the application. At 5110, the application obtains a master public key (MPK) and applies public key encryption keyword searchable (PEKS) algorithm(s). The MPK can optionally be cached by the application. At 5120, the application enters the encrypted record into a CSP repository, e.g., via a storage abstraction layer.

Figure 52:
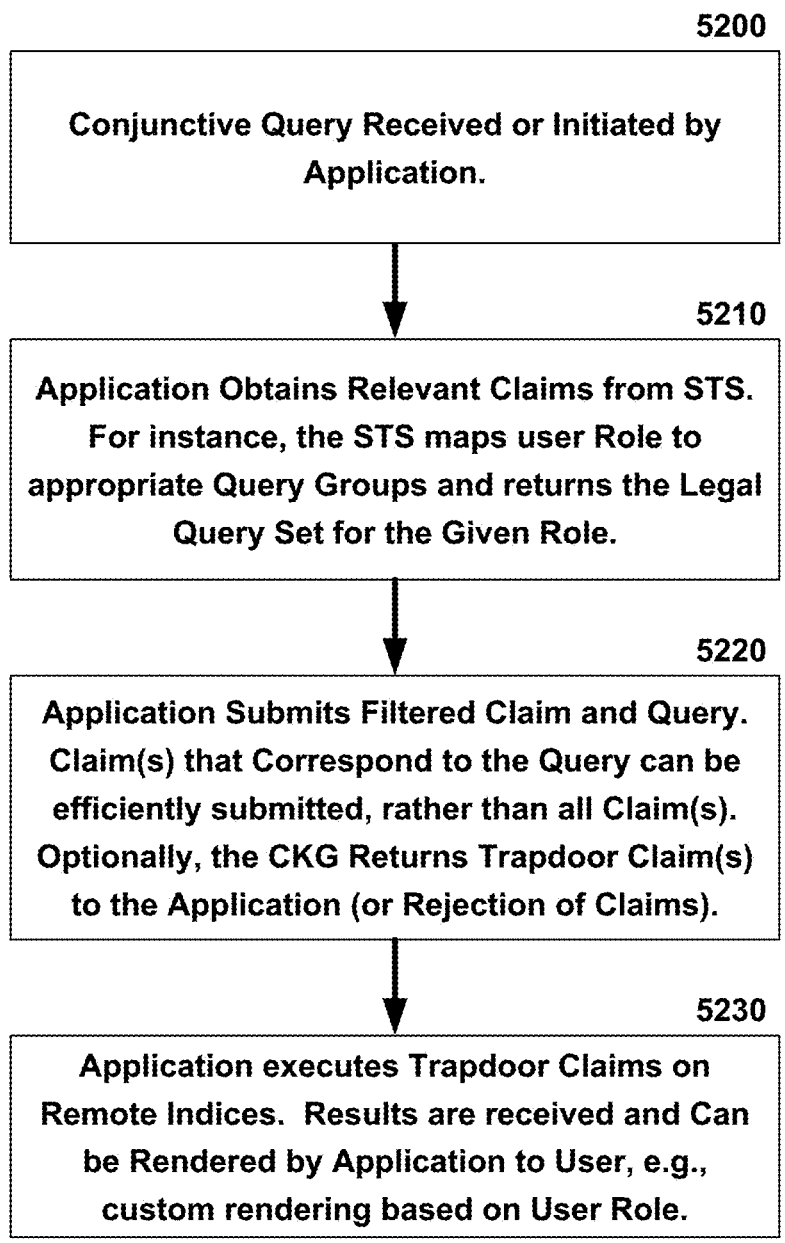
FIG. 52 is yet another flow diagram illustrating an exemplary non-limiting implementation of role-based querying over the searchably encrypted data store enabled by a trustworthy cloud services ecosystem.

FIG. 52 is yet another flow diagram illustrating an exemplary non-limiting implementation of role-based querying over the searchably encrypted data store enabled by a trustworthy cloud services ecosystem, e.g., for automated search by a single party. At 5200, a conjunctive query is received or initiated by an application. At 5210, the application obtains relevant claims from the STS. For instance, the STS maps the user's Role(s) to appropriate Query Group(s) and returns the Legal Query Set for the Given Role(s). At 5220, the application submits a Filtered Claim and Query such that Claim(s) that Correspond to the Query can be efficiently submitted, rather than all Claim(s). Optionally, the CKG returns Trapdoor Claim(s) to the application (or Rejects the Claims). At 5230, the application executes the Trapdoor Claims on Remote Indices. Based on the processing over the Remote Indices, results are received and can be rendered by the application to the user, e.g., using custom rendering based on User Role(s).

Figure 53:
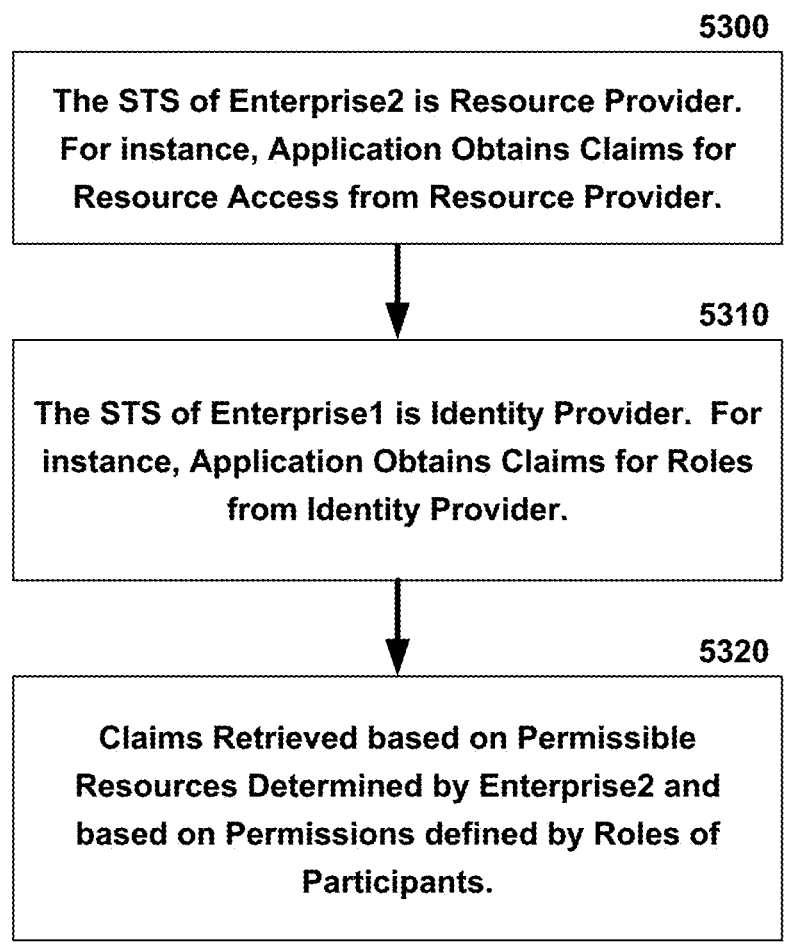
FIG. 53 is a flow diagram illustrating a multi-party cooperative scenario where an enterprise provides access to some of its encrypted data to an external enterprise.

FIG. 53 is a flow diagram illustrating a multi-party cooperative scenario where an enterprise provides access to some of its encrypted data to an external enterprise. For example, a manufacturer may grant a supplier access to some of its data stored in the trustworthy cloud, or vice versa. In this regard, at 5300, the STS of Enterprise2 is designated the resource provider and an application of Enterprise1 proceeds to obtain Claims for access to the resources provided by the resource provider in the cloud. At 5310, the STS of Enterprise1 is designated as the identity provider. In this respect, the application obtains the Claims for a role or set of roles defined by the subscriber at Enterprise1 as facilitated by the identity provider. At 5320, the Claims are retrieved by the application based on Permissible Resources controlled by Enterprise2 and based on Permissions/Capabilities defined by the role(s) of the subscribing entity. In FIG. 53, while only one STS is depicted, it is noted that that there can be multiple Identity Provider STSs and/or multiple Resource Provider STSs in a Digital Escrow, or Federated Trust Overlay.

Figure 54:
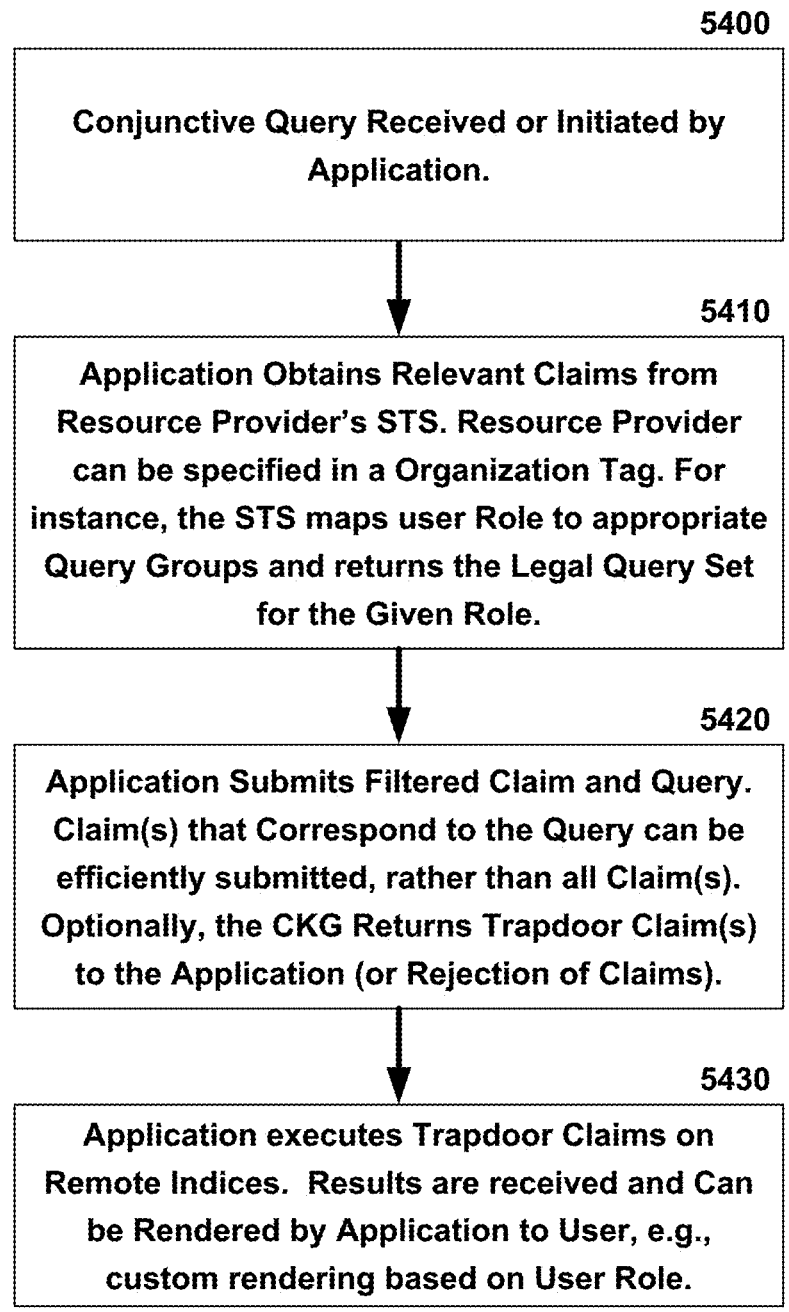
FIG. 54 is a flow diagram illustrating a multi-party automated search scenario among multiple enterprises.

FIG. 54 is a flow diagram illustrating a multi-party automated search scenario, e.g., among multiple enterprises such as Enterprise1 and Enterprise2. At 5400, a conjunctive query is received or initiated by an application of Enterprise1 for execution. At 5410, the application obtains relevant Claims from the STS of the resource provider (Enterprise2). The resource provider can be specified in an organization tag, optionally. The STS can optionally perform a mapping of user Role to Query Groups, so that the Legal Query Set is returned for the user Role. At 5420, the application submits a Filtered Claim and Query based on the user Role, the Claims that correspond to the Query can be efficiently submitted, rather than all Claim(s). Optionally, the CKG returns capabilities to the application (e.g., Trapdoor Claims), or the CKG rejects the Claims. At 5440, the application executes the Trapdoor Claims on Remote Indices. Based on the processing over the Remote Indices, results are received and can be rendered by the application to the user, e.g., using custom rendering based on User Role(s).

The method can include a step of receiving a conjunctive query, or otherwise initiating a conjunction query. In this regard, optionally, conjunctive queries can also be cryptographically protected so that no recipient of a trapdoor (or capability), either the client or the service provider, can decompose the conjunctive query and determine its constituent parts.

Figure 55:
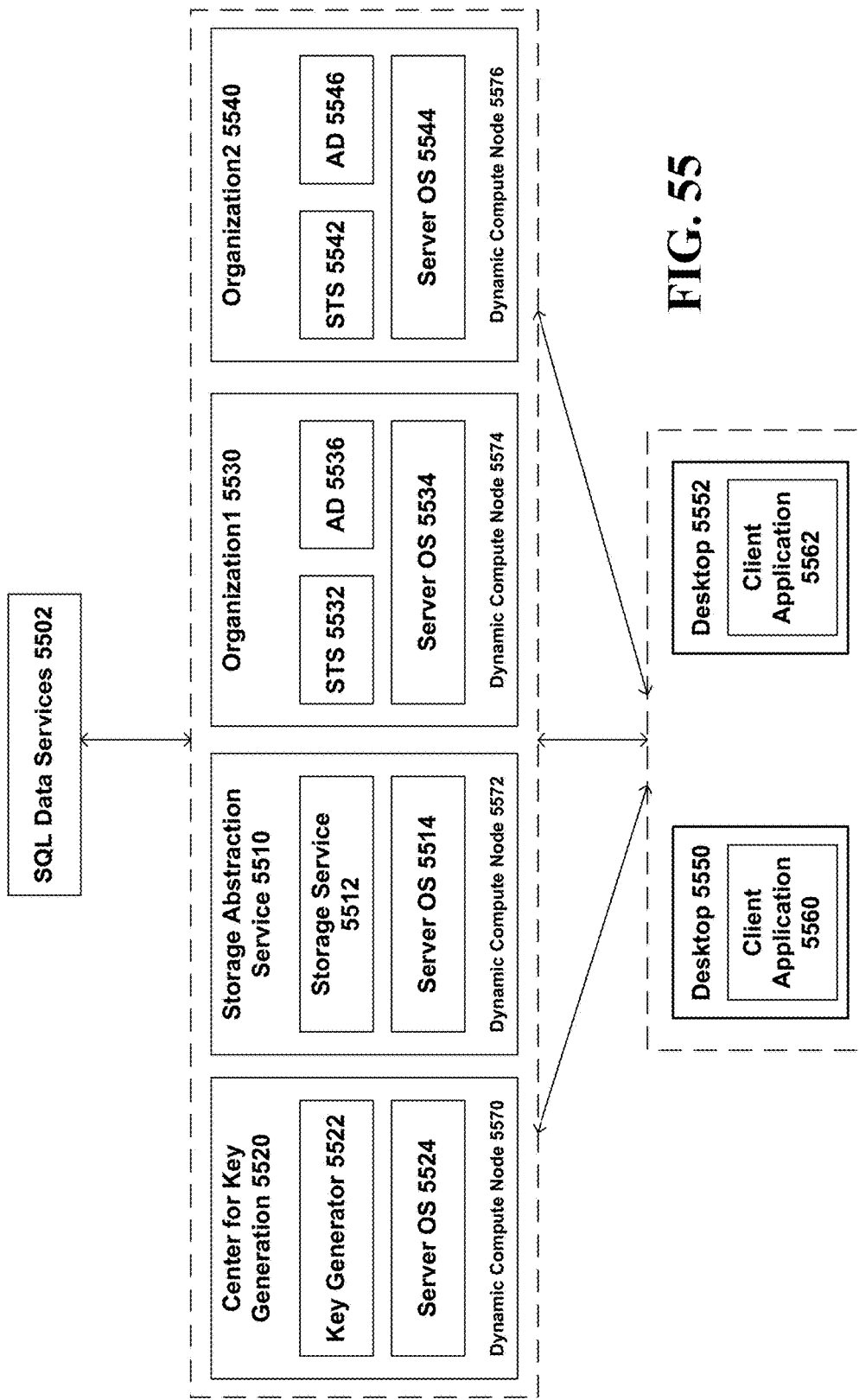
FIG. 55 illustrates an exemplary non-limiting edge compute network (ECN) technology that can be implemented for a trustworthy cloud service.

FIG. 55 illustrates an exemplary non-limiting edge compute network (ECN) technology that can be implemented for a trustworthy cloud service. In this regard, a plurality of dynamic compute nodes 5570, 5572, 5574, 5576 are dynamically allocated for computational bandwidth in connection with a set of trustworthy cloud components operating independently of one another. For instance, a center for key generation 5520, a storage abstraction service 5510, organization 5530 and organization 5540 can be implemented as shown to cover multi-organizational business or other scenarios, such as those described above. Center for key generation 5520 includes a key generator 5522 and a server OS 5524. Storage abstraction service 5510 includes a storage service component 5512 and a server OS 5514. Organization 5530 includes an STS 5532, an AD 5536 and a server OS 5534. Organization 5540 includes an STS 5542, an AD 5546 and a server OS 5544. The server OSs 5514, 5524, 5534, 5544 cooperate to implement the ECN across servers. Any storage provider or abstraction 5502 can be used for storage of data, e.g., SQL data services can be employed. In this way, one or more desktops 5550, 5552 can publish or subscribe to data via client applications 5560, 5562, respectively.

Figure 56:
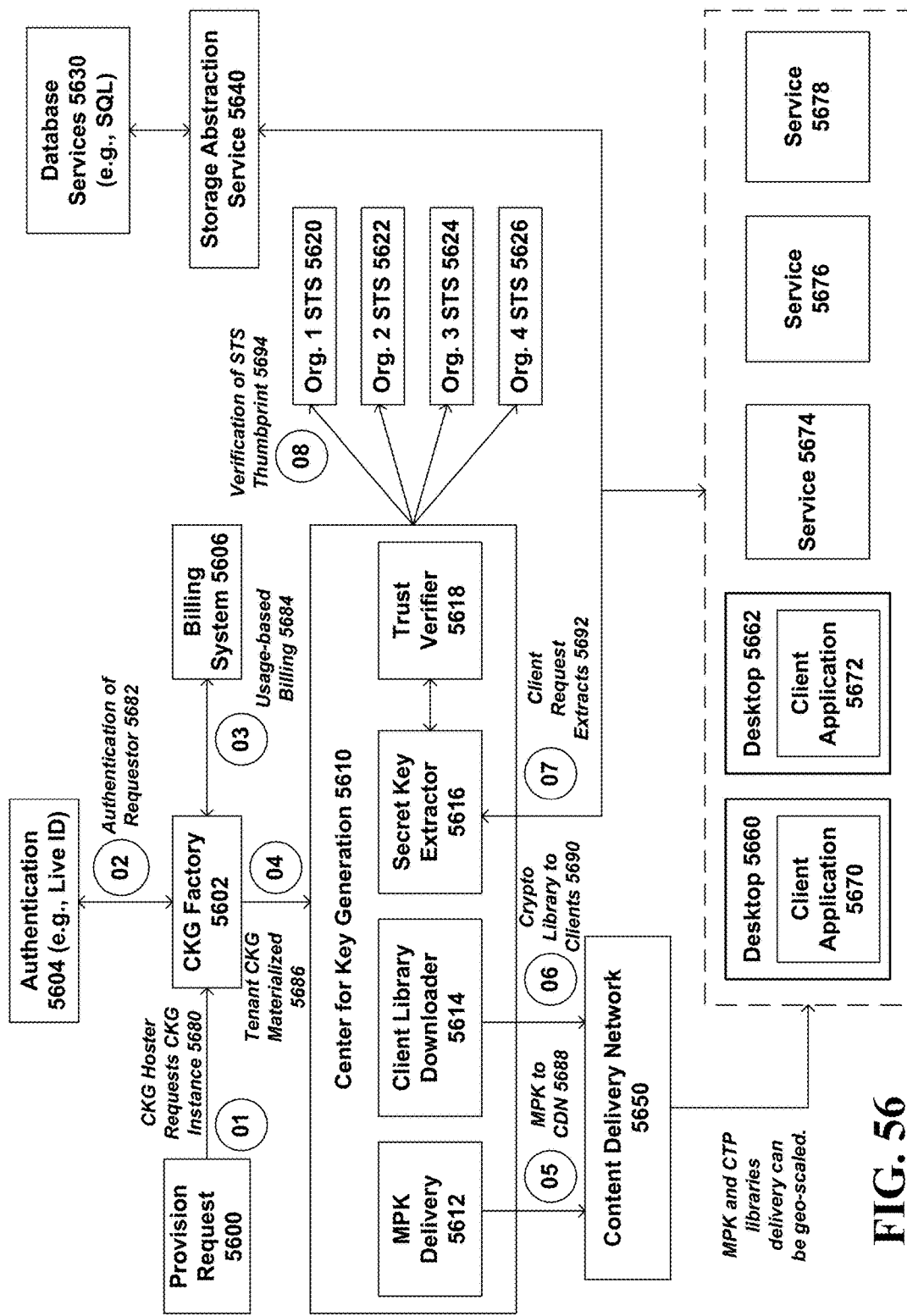
FIG. 56 is a block diagram illustrating one or more optional aspects of a center for key generation in accordance with a trustworthy cloud service ecosystem.

FIG. 56 is a block diagram illustrating one or more optional aspects of a center for key generation 5610 in accordance with a trustworthy cloud service ecosystem. Initially, a set of computing devices, such as desktops 5660, 5662 and respective client applications 5670, 5672, or services or servers 5674, 5676, 5678, etc. are potential publishers and/or subscribers to a cloud content delivery networks 5650. However, prior to fulfilling requests from any of the set of computing devices, initially a center for key generation acts as a custodian for trust for publishers encrypting data based on a public key, and handing out private keys to data subscribers based on their capabilities.

In an exemplary non-limiting interaction, initially a request from a computing device is provisioned 5600 and the hoster of the CKG 5610 requests an instance of the CKG 5610 from the CKG factory 5602 at 5680. Next, user authentication 5604 takes place at 5682. Next, any usage-based billing 5684 can be applied by billing system 5606 for use of the CKG factory 5602. Next, the tenant CKG is materialized at 5686 by CKG factory 5602, which may include MPK delivery component 5612, client library downloader 5614, secret key extractor 5616 and trust validator/verifier 5618.

MPK delivery component 5612 delivers MPK to the CDN 5650 at 5688. Client library downloader 5614 downloads crypto libraries to requesting clients which can be used in connection with encrypting data to be published or decrypting data to which the device is subscribed. Next, the client makes request to extract a given set of documents based on key information received from secret key extractor 5616, which cooperates with trust verifier 5618, which can validate that the subscriber has certain capabilities based on verifying the STS thumbprint of the subscriber at 5694, e.g., based on communication with different STSs 5620, 5622, 5624, 5626 of organizations involved in the request. As in other embodiments, a storage abstraction service 5640 can be provided to abstract storage details of database services 5630 (e.g., SQL).

Figure 57:
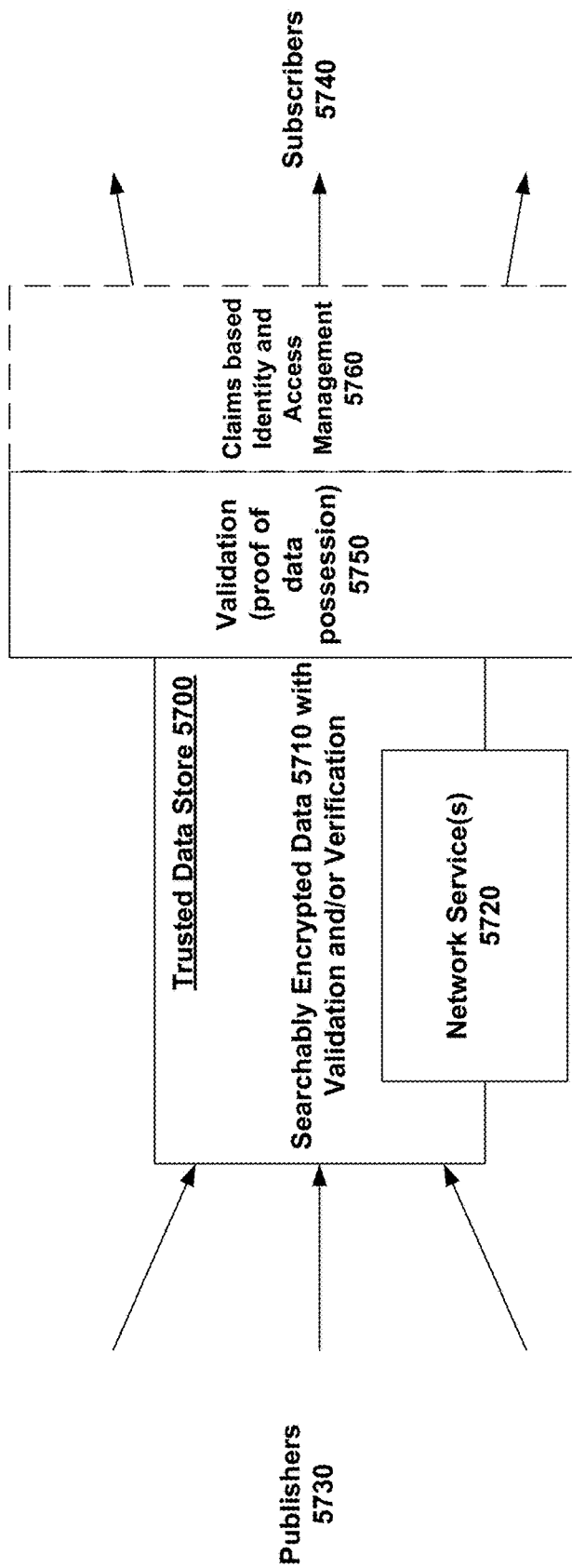
FIG. 57 is a block diagram of an exemplary non-limiting embodiment of a trustworthy store including searchably encrypted data.

FIG. 57 is a block diagram of an exemplary non-limiting embodiment of a trustworthy store 5700 including searchably encrypted data 5710 with validation and/or verification, in connection with the delivery of network services 5720. In this embodiment, a subscriber 5740 or application used by subscriber 5740 can request, as part of a request to access certain parts of the encrypted store 5700, that a validation proof be run over the items returned from the request to validate that the items actually received are also the items that should have been received. In this regard, FIG. 57 illustrates the combination of searchable encryption techniques with techniques for validation. Optionally, the system may also be integrated with Claims-based Identity and Access Management, as described in other embodiments herein. In this regard, the Digital Escrow pattern, also referred to as Federated Trust Overlay, as described in various embodiments herein, can be integrate seamlessly with more traditional Claims-based Authentication systems.

In FIG. 57, the Trustworthy Data Store 5700 or the Service Provider or Hoster of the data store performs the proving step, whereas the owner of the data (e.g., the subscriber device) performs the validation. Data Store 5700 is trusted because the users can have confidence that it provides strong guarantees, though it is understood that physical entities actually host that data, and some participants are not fully trusted.

Figure 58:
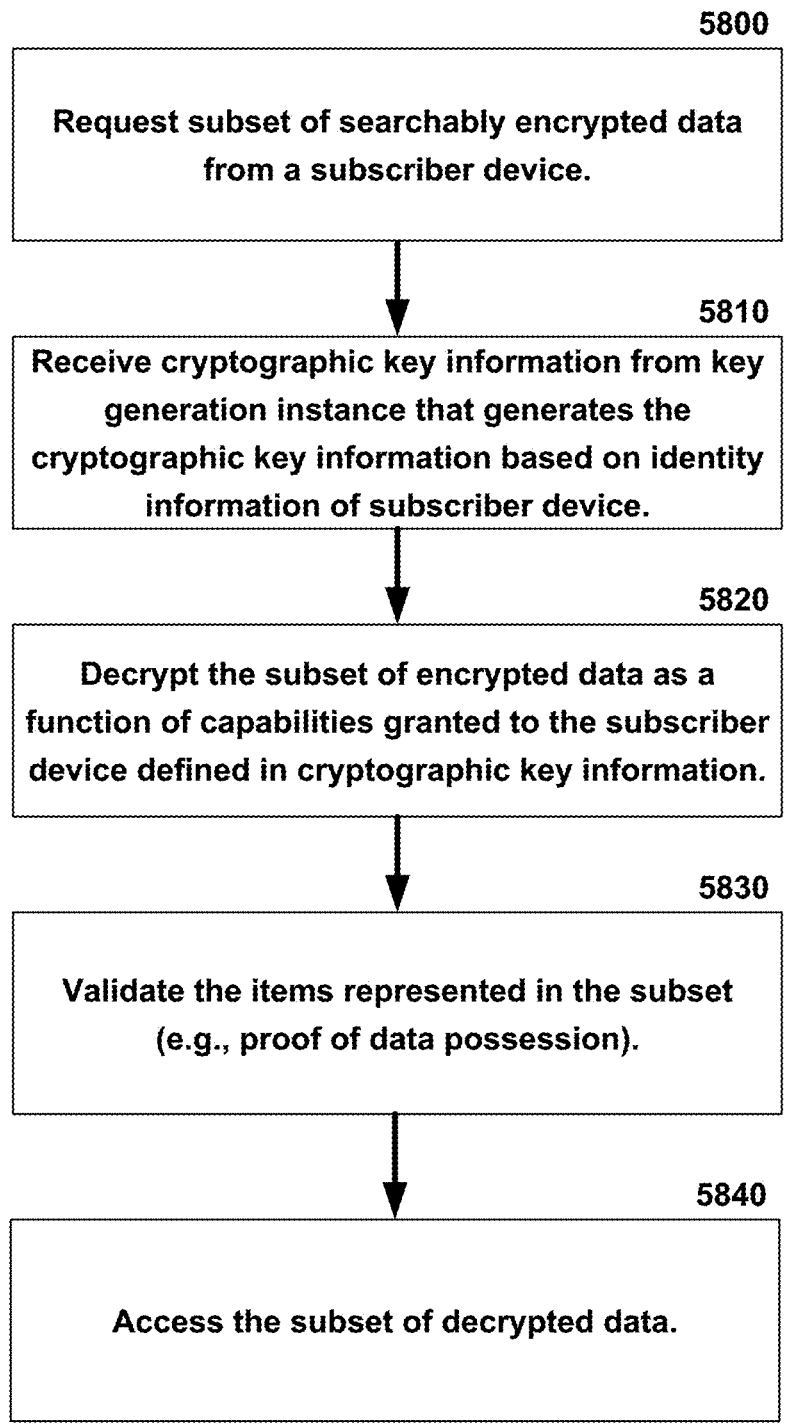
FIG. 58 is a flow diagram illustrating an exemplary non-limiting process for subscribing including a validation step.

FIG. 58 is a flow diagram illustrating an exemplary non-limiting process for subscribing including a validation step. At 5800, a subset of searchably encrypted data is received from a subscriber device. At 5810, cryptographic key information is generated from key generation instance that generates the cryptographic key information based on identity information of the subscriber device. At 5820, the subset of encrypted data is decrypted as a function of capabilities granted to the subscriber device defined in cryptographic key information. At 5830, the items represented in the subset can be validated (e.g., proof(s) of data possession) and the data is accessed at 5840.

In many cases, it is desirable to be able to execute PDP/POR over encrypted data without needing to decrypt it. Optionally, the key information needed for PDP can be encoded within the metadata that was protected with Searchable Encryption. While this is an effective way of managing the keys used for PDP/POR, it is noted there are many high-value scenarios where PDP/POR can be performed on encrypted data without needing access to the cleartext contents.

Figure 59:
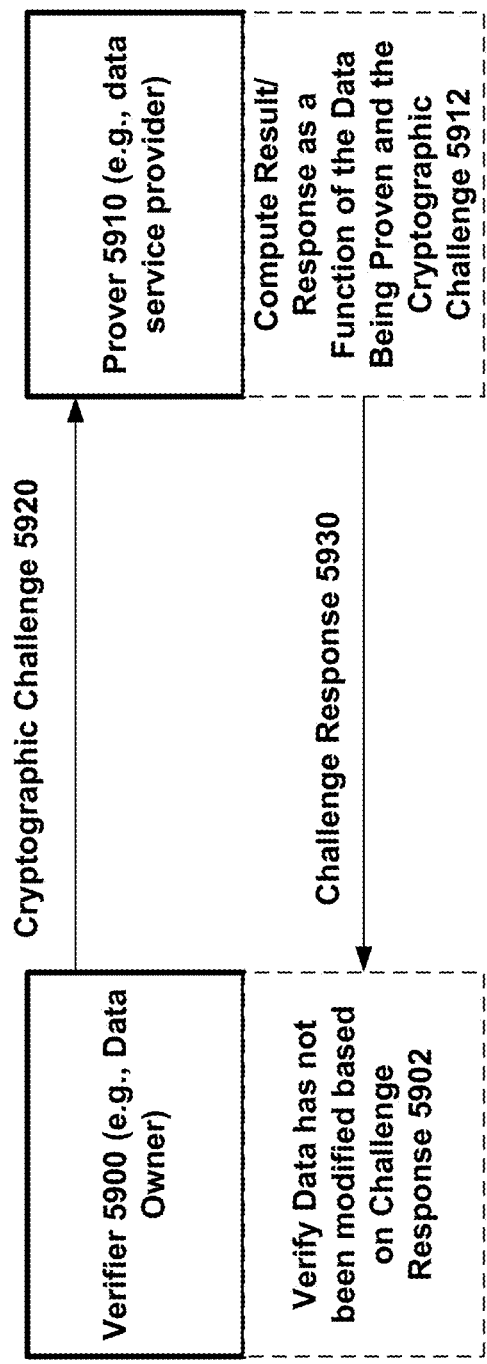
FIG. 59 illustrates an exemplary non-limiting validation challenge/response protocol in which a verifier issues a cryptographic challenge to a prover.

FIG. 59 illustrates an exemplary non-limiting validation challenge/response protocol in which a verifier 5900 (e.g., the data owner) issues a cryptographic challenge 5920 to a prover 5910 (e.g., the data service provider). Upon receiving the challenge 5920, the prover 5910 computes the response as a function of the data and the challenge 5912. The challenge response 5930 is then returned to verifier 5900, which then performs computation to verify or prove that the data has not been modified 5902.

The validation generally illustrated in FIG. 59 is known as private PDP, though it is noted there is also a "Public" version where a third party is provided with a key (a "public" key) so the third party acts as the Verifier according to a similar protocol, without coming to know anything about the actual data. POR, an example of verification, is different from PDP in that it provides proof that the data is retrievable (despite any corruptions/modifications), but as illustrated in FIG. 30 below, the basic protocol is the same, though the structure of the documents and the actual algorithms are different. Various implementations of a trustworthy ecosystem herein combine Searchable Encryption and POR/PDP to benefit the system and bolster trust. In this regard, before submitting the data to the Service Provider, the data is searchably encrypted and post processing of the data can include POR and/or PDP.

In addition, a "data dispersion" technique can optionally be overlaid on any one or more of the above embodiments if there is a need to provide even stronger guarantees. With data dispersion, data is distributed to several Service Providers for resilience against "massively bad behavior" or catastrophic loss in any single Service Provider. Using the trust mechanisms described herein, this dispersion is performed in a way that makes it difficult for independent Service Providers to collude and corrupt the data. This is similar in concept to the above described distributed CKG embodiment.

Figure 60:
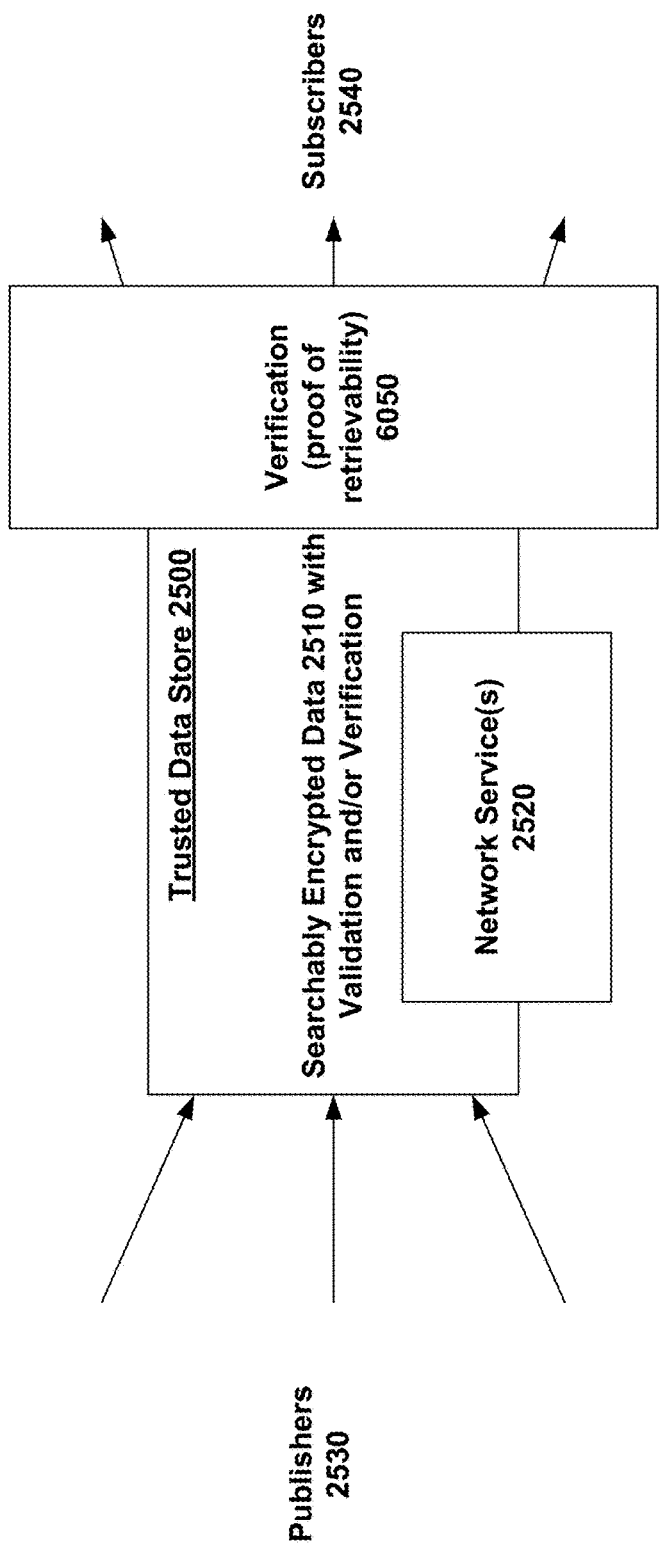
FIG. 60 is a block diagram of another exemplary non-limiting embodiment of a trustworthy store including searchably encrypted data.

FIG. 60 is a block diagram of another exemplary non-limiting embodiment of a trustworthy store 2500 including searchably encrypted data 2510 with validation and/or verification, in connection with the delivery of network services 2520 for data from publishers 2530. Specifically, FIG. 60 illustrates a verification component 6050 for verifying that the items returned to subscribers 2540 were not tampered with, or otherwise inadvertently altered. PDP, mentioned above, is a non-limiting example of verification.

Figure 61:
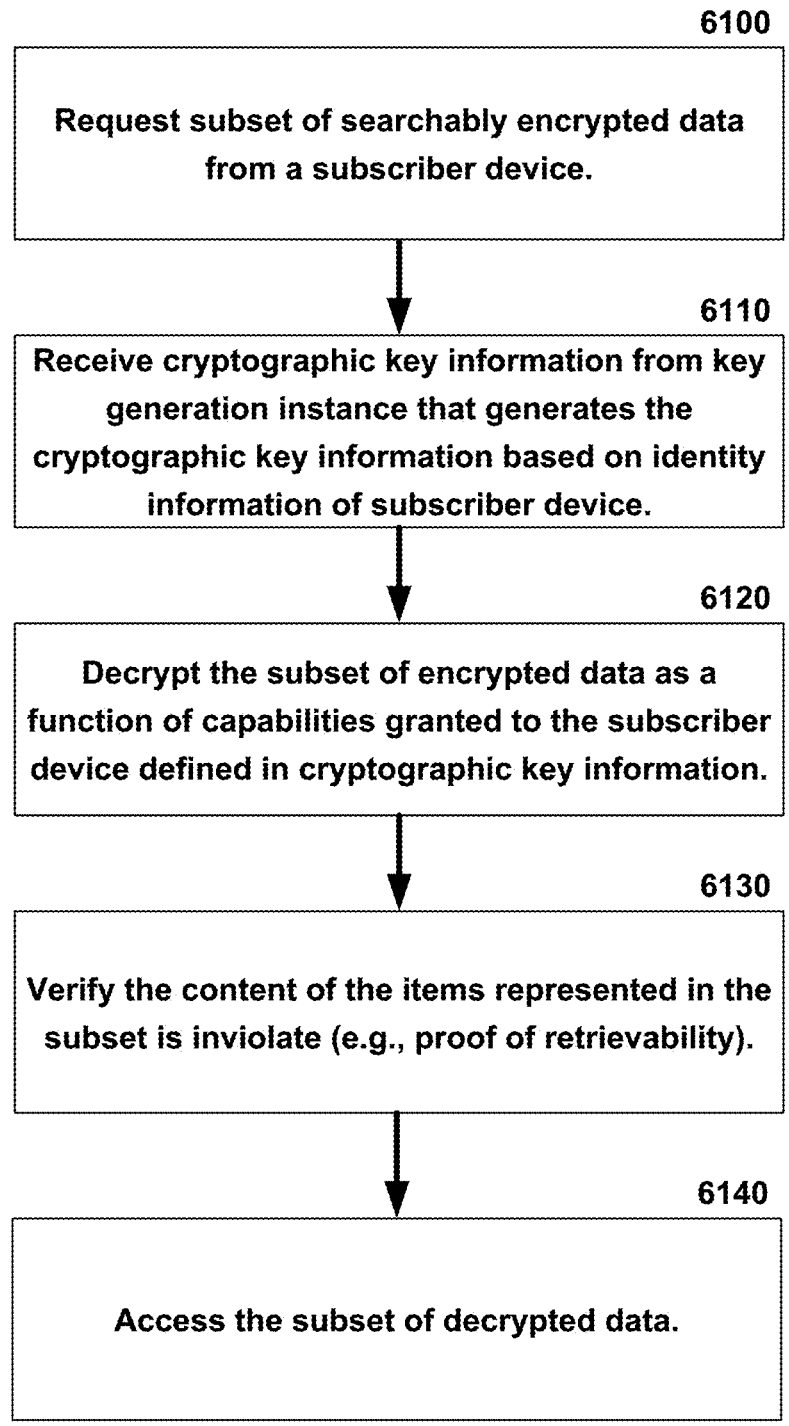
FIG. 61 is a flow diagram illustrating an exemplary non-limiting process for subscribing including a validation step.

FIG. 61 is a flow diagram illustrating an exemplary non-limiting process for subscribing including a validation step. At 6100, a subset of searchably encrypted data is received from a subscriber device. At 6110, cryptographic key information is generated from key generation instance that generates the cryptographic key information based on identity information of the subscriber device. At 6120, the subset of encrypted data is decrypted as a function of capabilities granted to the subscriber device defined in cryptographic key information. At 6130, the content of the items represented in the subset can be verified (e.g., proof(s) of retrievability) and the data is accessed at 6140.

Figure 62:
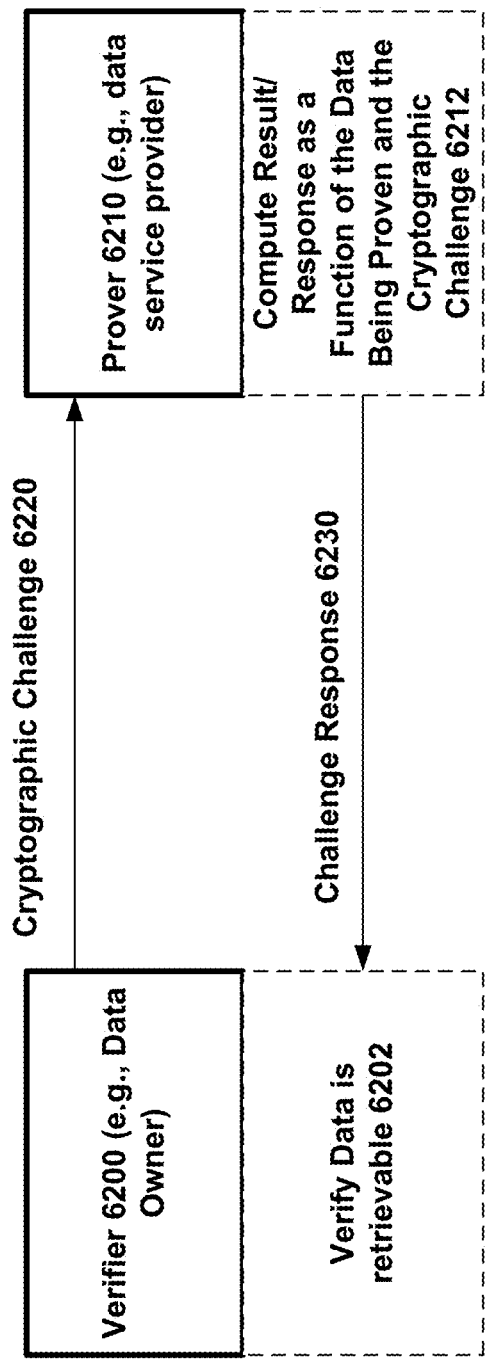
FIG. 62 illustrates another exemplary non-limiting verification challenge/response protocol in which a verifier issues a cryptographic challenge to a prover.

FIG. 62 illustrates an exemplary non-limiting verification challenge/response protocol in which a verifier 6200 (e.g., the data owner) issues a cryptographic challenge 6220 to a prover 6210 (e.g., the data service provider). Upon receiving the challenge 6220, the prover 6210 computes the response as a function of the data and the challenge 6212. The challenge response 6230 is then returned to verifier 6200, which then performs computation to verify or prove that the data is retrievable 6202.

Blind Fingerprints represent another kind of cryptographic technique that extends network de-duping techniques, such as Rabin Fingerprints, which are typically used for minimizing the exchange of redundant data over a network. In various embodiments herein, fingerprinting is applied such that a participant in the protocol, e.g., the CSP in the case of storage of data, is unaware of the actual contents of the data that they are hosting.

For some additional context regarding Blind Fingerprints, any large exchange of data across wide area networks (WANs), including the maintenance of a data, will desire techniques for "de-duping" over the wire, or making sure that unnecessary data is not sent over the wire. This is accomplished by fingerprinting segments of the data and then exchanging fingerprints so that senders know what they have that the receivers do not have. Also, the receivers know for what data they need to ask the senders. Distributed File Service Replication (DFS-R) can be used for optimizing data exchanges in scenarios, such as branch office backups and distributed file systems over a WAN.

In the case of Exchange, there is significant duplication of data, and it is possible that up to 50%, or more, of data on the wire could be duplicates at any given time. The fingerprints can be obtained at the block level or at an object level, e.g., e-mail, calendar items, tasks, contacts, etc. The fingerprints can be cached at both the primary and secondary data centers. Thus, if there is a failure at a primary data center, then the secondary data can be restored to the primary data center along with fingerprints. The encryption of data at the primary data center should nonetheless allow the fingerprints to be visible to the secondary data center operator, despite being obscured. This can be achieved, for example, by storing fingerprints as keywords/metadata with searchable encryption, so that other than authorized entities/agents in the secondary data center, no other entity would be able to detect patterns.

In the context of data services, when sending up a full or an incremental, the primary data center can examine each item/segment/block in the logs, or EDB, and consult the local copy of the fingerprints. If there is a match, then the primary data center replaces the item/segment/block with the fingerprint. The term "blind fingerprints" is referred to as such herein because of the manner in which fingerprinting is applied. In one embodiment, the selection of cryptographic technologies to achieve blind fingerprinting includes a size preservation cryptographic technique.

Figure 63:
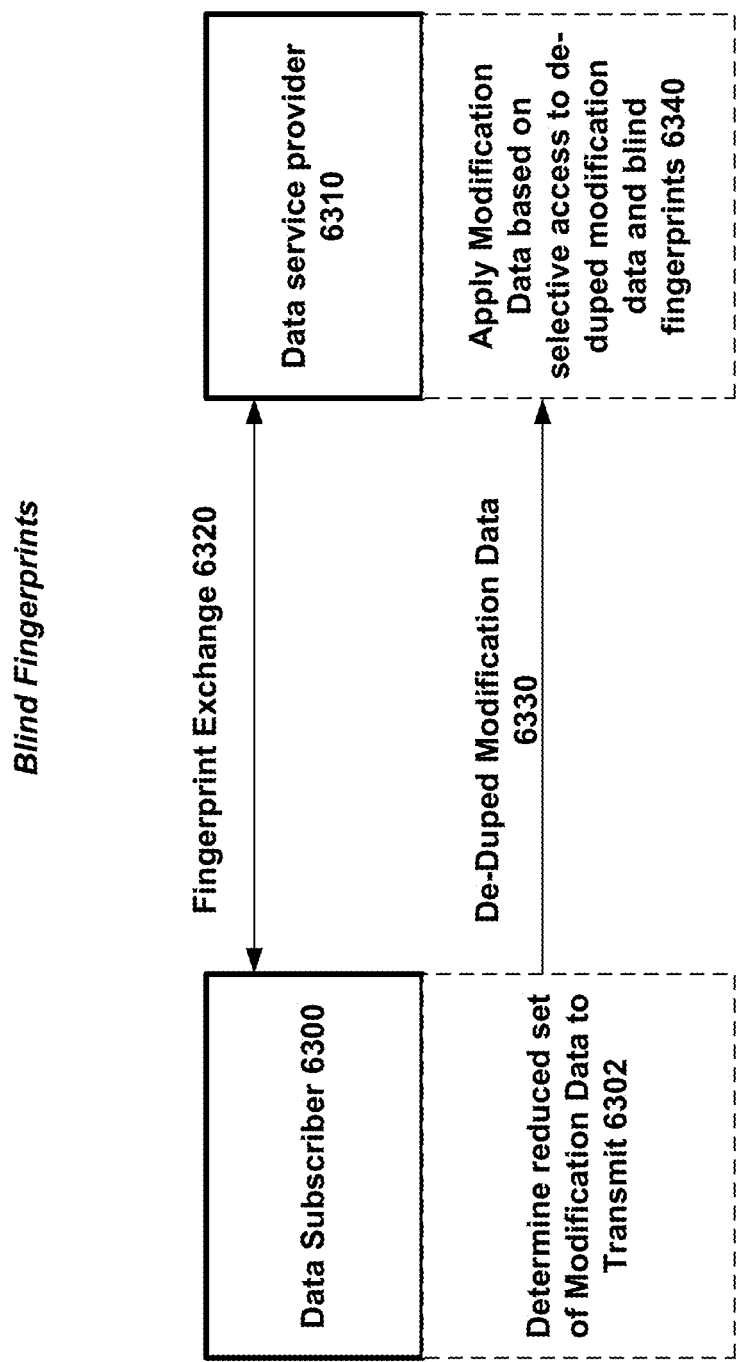
FIG. 63 is a block diagram of a general environment for providing one or more embodiments of services including blind fingerprinting.

FIG. 63 is a block diagram of a general environment for providing one or more embodiments of services including blind fingerprinting. With blind fingerprints, a data subscriber 6300 and a data service provider 6310 undergo a fingerprint exchange to understand as a proxy for what data segments are already possessed on the respective local and backup copies of the data set being backed up. As a result of the fingerprint exchange 6320, a reduced set of modification data is determined to transmit at 6302 as de-duped modification data 6330 to data service provider 6310, which then applies the modification data based on selectively accessing the de-duped modification data and any blind fingerprints 6340.

Figure 64:
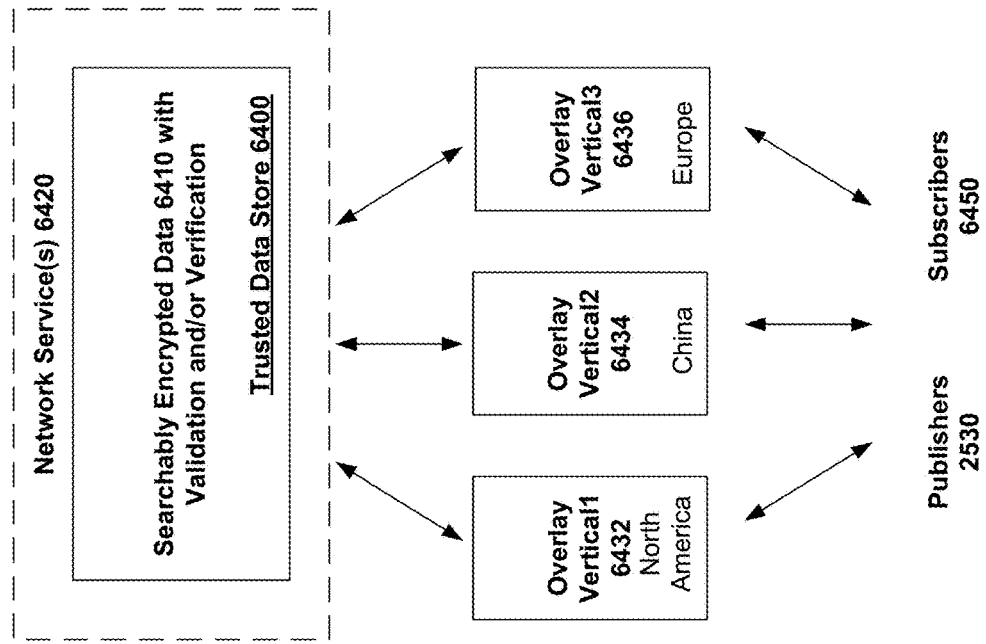
FIG. 64 is a block diagram illustrating a non-limiting scenario where multiple, independent Federated Trust Overlays, or Digital Escrows can exist side by side, or on top of one another for a layered approach.

FIG. 64 is a block diagram illustrating a non-limiting scenario where multiple, independent Federated Trust Overlays, or Digital Escrows can exist side by side, or on top of one another for a layered approach. In this scenario, there is a trustworthy data store 6400 having searchably encrypted data 6410 upon which various network service(s) 6420 can be predicated. For instance network service(s) 6420 can include the delivery of word processing software as a cloud service. As part of geo-distribution, or otherwise, optionally, multiple Overlays/Escrows 6432, 6434, 6436 can be provided that are each tuned to different applications/verticals/compliance needs/sovereign entity requirements, such that the publishers 2530 or subscribers 6450 select, implicitly or explicitly, the correct Overlay/Escrow in which to participate, e.g., based on a set of requirements or area of jurisdiction/domicile. The overlay thus can change, but the back-end services from the cloud can remain the same without complicating the delivery of the core service itself.

Figure 65:
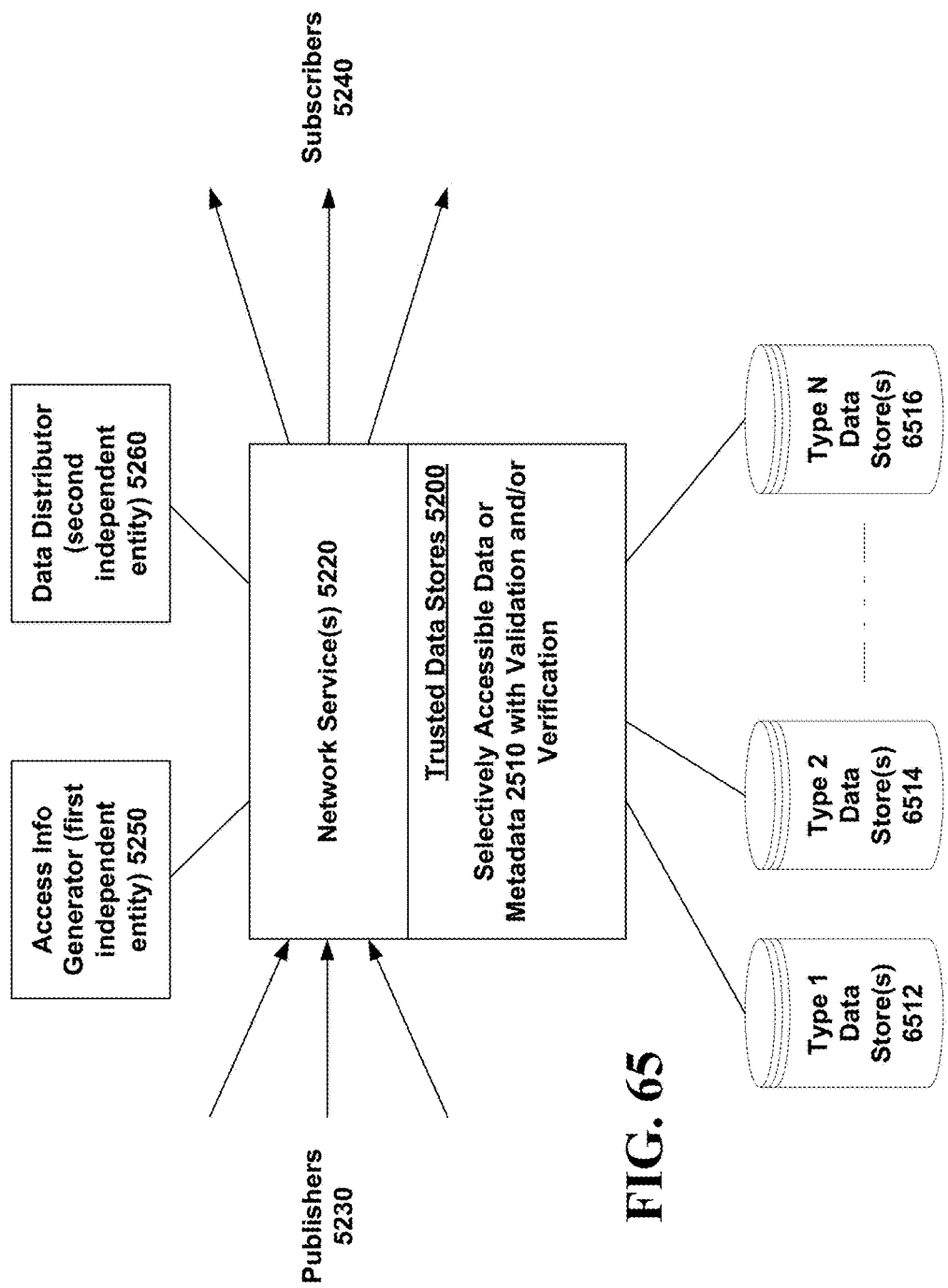
FIG. 65 is a block diagram of another exemplary non-limiting embodiment of a trustworthy store including data distribution techniques for obscuring data against unauthorized access.

FIG. 65 is a block diagram of another exemplary non-limiting embodiment of a trustworthy store including data distribution techniques for obscuring data against unauthorized access. This example demonstrates that all of the above described techniques or systems that provide encryption techniques as a means for hiding or obscuring data can also be implemented by any other mathematical transformation or algorithm that prevents visibility into the data (or metadata). In this regard, for instance, data can be automatically defragmented or distributed across a set of data stores, which can be of the same type, or as shown in FIG. 65, containers of different types 6512, 6514, . . . , 6516.

The system thus includes data stores 6500 that include, as an abstraction, data stores 6512, 6514, . . . , 6516 for storing selectively accessible data or metadata 6510. Publishers can publish the data or the metadata 6510 representing at least one resource to the data stores 6500, and a first independent entity 6550 performs generating of access information applicable to the data or the metadata as published, and a second independent entity 6560 distributes the data or the metadata as published across a set of data stores of the data stores 6500 while maintaining knowledge of the set of data stores that store the data or the metadata as published.

This knowledge is thus a secret that cannot be revealed without the access information. The data or metadata 6510 can be published via network service(s) 6520 that provide selective access to the data or the metadata as published for a given request to the network service based on late bound selected privileges granted by the publisher(s) or owner(s) of the at least one resource and represented by the access information. The data stores 6500 include a plurality of containers of same or disparate container type and the data or the metadata as published is automatically distributed across at least one container of the plurality of containers. The distribution can be based on any algorithm known to the data distributor 6560, e.g., based on a real-time analysis of the storage resources represented by the plurality of containers, based on characteristics of the data or metadata, or any other parameters that are appropriate for the given application.

Accordingly, when subscribers 6540 make a request for the data or metadata 6510, the network service(s) consult with the independent entities 6550 and/or 6560 to determine whether the subscribers 6540 are permitted to have access information that enables reassembly of the data. For instance, a data map can be the secret that permits reassembly of the data. This embodiment can be combined with other mathematical transformations, such as encryption, in order to provide additional protection over the data. Such additional mathematical transformations can be overseen by further independent entities for additional distribution of trust for further comfort that the data remains invisible except to authorized parties.

Herein described are a variety of exemplary, non-limiting embodiments that illustrate the delivery of trustworthy data services. These embodiments are not standalone, but rather can be combined with one another where appropriate. In addition, any of the above-described embodiments can be extended in a number of alternative ways. For instance, in one embodiment, the trustworthy data services provide for the expiry and revocation of trapdoors or capabilities for greater degree of security over the access to the data. In another optional embodiment, a rights management layer is built into the provision of trustworthy data services, e.g., to preserve rights attached to content as part of encryption/decryption or to prevent acts with respect to copyrighted data in digital escrow that are more easily recognizable or detectable in the clear. Accordingly, any combinations or permutations of embodiments described herein are contemplated as within scope of the subject disclosure.

Exemplary Non-Limiting Implementation

An exemplary implementation of the digital escrow pattern is referred to as a Federated Trust Overlay (FTO). Attached in Appendix A are some additional non-limiting details about FTO implementations.

In this regard, the Digital Escrow Pattern is just an example of many possible patterns and variations. Furthermore, this pattern (which involves publishers, subscribers, administrators and auditors—and possibly other specialized roles as described above) is layered over another underlying FTO pattern, which performs the "church & state" separation of CTP, CSP, CKG, etc., to maintain trust. There can also be multiple, independent FTOs and DEPs that could co-exist without interfering with each other, and without even knowing about the existence of each other. Also, it is possible to overlay DEP and FTO patterns over Cloud storage without the Cloud Storage service provider co-operating, or even coming to know about the existence of these patterns/overlays.

In more detail, an FTO is a set of services that is independent of the data services in the cloud. These services are operated by parties other than the operator of the data services, and are able to provide strong guarantees regarding confidentiality, tamper detection and non-repudiation for the data hosted by the cloud services.

Any partner can construct and host these overlay services, e.g., a Mediator Service, the validation service, Storage Abstraction service, etc. These partners might choose to host a reference implementation, or construct their own implementation based on openly available formats and protocols.

Due to the open nature of the formats, protocols and the reference implementations, it would be straightforward to maintain a separation of control among parties, such as the operators of the FTO and the Data Owners.

While encryption is an element of this solution, the orchestration of services that are federated across different parties is also a part of the solution. While conventional encryption techniques are compelling for many scenarios, they preclude enabling many of the scenarios like tamper detection, non-repudiation, building trust by orchestrating multiple (untrusted) services, searching data repositories, etc.

Supplemental Context

For some additional non-limiting context, as described above, a trustworthy set of cloud offerings enables an application ecosystem for the cloud that builds on the trust. Various terminology used herein includes: CKG—Center for Key Generation, an entity that hosts a multi-tenant key generation center, e.g., any of Microsoft, VeriSign, Fidelity, A Sovereign Entity, Enterprise, Compliance Entity, etc. could host the CKG. In this regard, multi-tenancy is optional (e.g., desirable but not mandatory). Other terminology includes: CTP—Crypto Technology Provider, an entity that provides encryption technologies for use with the trustworthy ecosystem, e.g., any of Symantec, Certicom, Voltage, PGP Corp, BitArmor, Enterprise, Guardian, Sovereign Entity, etc. are example companies that could be CTPs.

In addition, the term CSP—Cloud Service Provider is an entity that provides cloud services, including storage. A variety of companies can provide such data services. A CIV—Cloud Index Validator is a second repository to validate returned indices. A CSA—Compute and Storage Abstraction abstracts the storage back-end. STF—Storage Transfer Format is a universal format for transferring data/metadata across repositories.

In this regard, as mentioned, some enterprise scenario(s) includes engineering extranet using data service technologies or applications, design and engineering analysis, defining data relationships among manufacturer and supplier(s), etc. A unique ecosystem is thus enabled for a whole variety of scenarios by distributing trust across multiple entities so that no 'uber' trusted entity or single point of compromise exists.

With respect to some supplemental context regarding searchable encryption, a user typically has or gets 'capabilities' or 'trapdoors' for keyword(s) and then sends a request using the 'capabilities' presenting them to the server. The server 'combines' capabilities and indices to find relevant documents or data. The user is then given access only to documents that result from the search (though the user may have access to more than just those documents).

As mentioned, no single algorithm should be considered as limiting on the provision of a searchably encrypted data store as described herein, however, the below generally outlines some of the theory behind an exemplary non-limiting algorithm and provides a primer for the Searchable Symmetric Encryption (SSE) Pattern:

Message: m
Keywords: $w_1, \ldots, w_n$
PRF: H
Generating escrow key
    Choose random S for H
Encrypting
    Choose random key K
    Choose random fixed-length r
    For $1 \le i \le n$
        Compute $a_i = H_S(w_i)$
        Compute $b_i = H_{a_i}(r)$
        Compute $c_i = b_i \oplus \text{flag}$
Output ($E_K(m), r, c_1, \ldots, c_n$)
Generating trapdoor or capability for w
$d = H_{Sj}(w)$
Testing for w
Compute $p = H_d(r)$
Compute $z = p \oplus c_i$
Output "true" if z=flag
Decrypt $E_K(m)$ to obtain m While again not to be considered limiting on any embodiment described herein, the following is a primer regarding public-key encryption w/keyword search (PEKS) pattern.

Public-Key Encryption
a. PKE=(Gen, Enc, Dec)
Identity-Based Encryption
b. IBE=(Gen, Enc, Extract, Dec)
c. Generating master keys
    i. (msk,mpk)=IBE.Gen( )
d. Encrypting m for ID
    i. c=IBE.Enc(mpk, ID, m)
e. Generating secret key for ID
    i. sk=IBE.Extract(msk, ID)
f. Decrypting
    i. m=IBE.Dec(sk, c)
g. Message: m
h. Keywords: $w_1, \ldots, w_n$
i. Generating escrow keys
    i. (msk, mpk)=IBE.Gen( )
    ii. (pk,sk)=PKE.Gen( )
j. Encrypting
k. For $1 \le i \le n$
    i. $c_i$=IBE.Enc(mpk, $w_i$, flag)
l. Return (PKE.Enc(pk,m), $c_1, \ldots, c_n$)
m. Generating capability or trapdoor for w
    i. d=IBE.Extract(msk, w)
n. Testing for w
o. For $1 \le i \le n$
    i. z=IBE.Dec(d, $c_i$)
    ii. Output "true" if z=flag
Decrypt $E_K(m)$ to obtain m Exemplary Networked and Distributed Environments One of ordinary skill in the art can appreciate that the various embodiments of methods and devices for a trustworthy cloud services framework and related embodiments described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Figure 66:
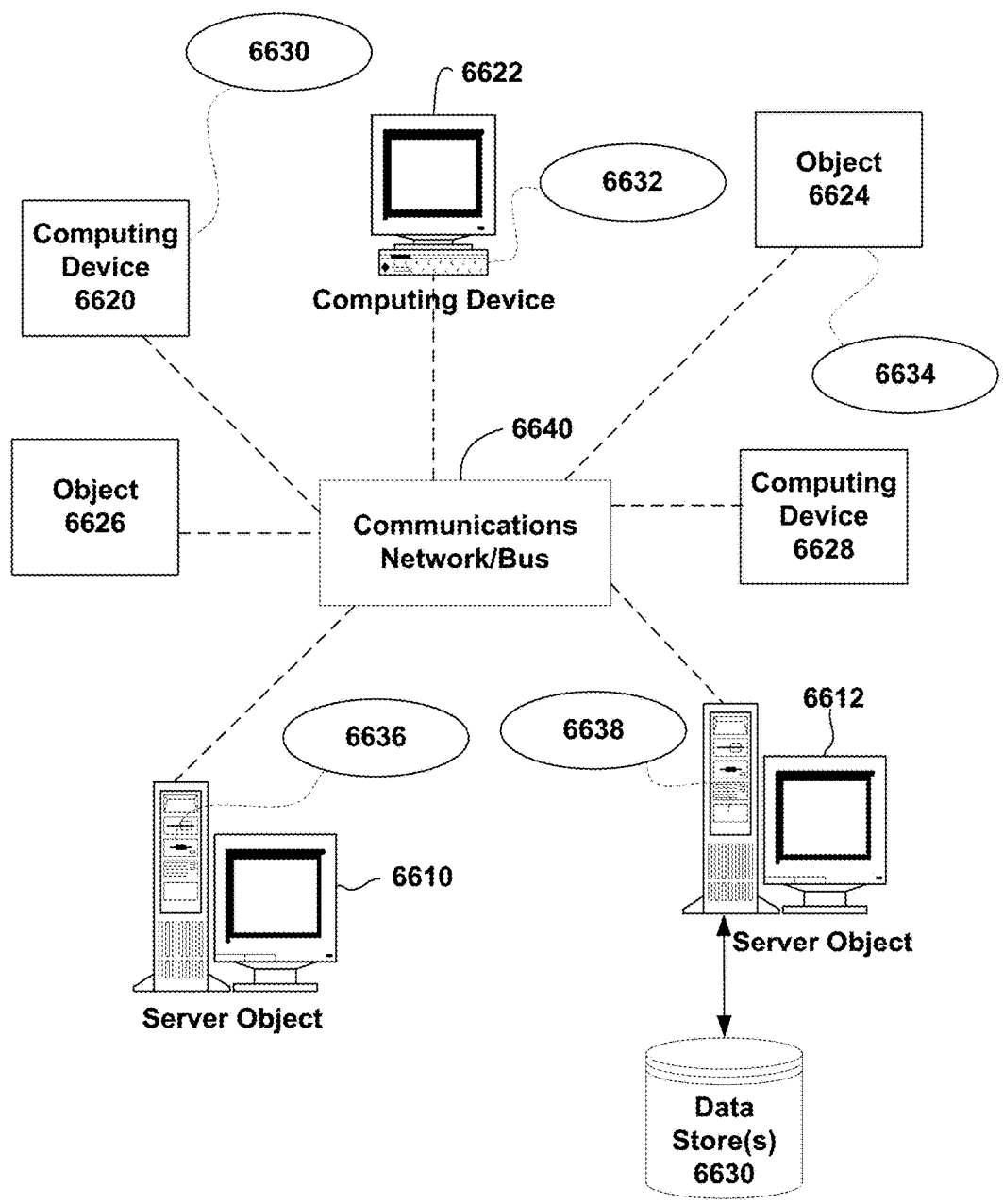
FIG. 66 is a block diagram representing exemplary non-limiting networked environments in which various embodiments described herein can be implemented.

FIG. 66 provides a non-limiting schematic diagram of an exemplary networked or distributed computing environment. The distributed computing environment comprises computing objects or devices 6610, 6612, etc. and computing objects or devices 6620, 6622, 6624, 6626, 6628, etc., which may include programs, methods, data stores, programmable logic, etc., as represented by applications 6630, 6632, 6634, 6636, 6638. It can be appreciated that computing objects or devices 6610, 6612, etc. and computing objects or devices 6620, 6622, 6624, 6626, 6628, etc. may comprise different devices, such as PDAs, audio/video devices, mobile phones, MP3 players, laptops, etc.

The computing objects or devices 6610, 6612, etc. and computing objects or devices 6620, 6622, 6624, 6626, 6628, etc. can communicate with one or more other computing objects or devices 6610, 6612, etc. and computing objects or devices 6620, 6622, 6624, 6626, 6628, etc. by way of the communications network 6640, either directly or indirectly. Even though illustrated as a single element in FIG. 66, network 6640 may comprise other computing objects and computing devices that provide services to the system of FIG. 66, and/or may represent multiple interconnected networks, which are not shown. Computing objects or devices 6610, 6612, etc. or 6620, 6622, 6624, 6626, 6628, etc. can also contain an application, such as applications 6630, 6632, 6634, 6636, 6638, that might make use of an API, or other object, software, firmware and/or hardware, suitable for communication with or implementation of a trustworthy cloud computing service or application as provided in accordance with various embodiments.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

Thus, a host of network topologies and network infrastructures, such as client/server, peer-to-peer, or hybrid architectures, can be utilized. In a client/server architecture, particularly a networked system, a client is usually a computer that accesses shared network resources provided by another computer, e.g., a server. In the illustration of FIG. 66, as a non-limiting example, computing objects or devices 6620, 6622, 6624, 6626, 6628, etc. can be thought of as clients and computing objects or devices 6610, 6612, etc. can be thought of as servers where computing objects or devices 6610, 6612, etc. provide data services, such as receiving data from computing objects or devices 6620, 6622, 6624, 6626, 6628, etc., storing of data, processing of data, transmitting data to clients, such as computing objects or devices 6620, 6622, 6624, 6626, 6628, etc., although any computer can be considered a client, a server, or both, depending on the circumstances. Any of these computing devices may be processing data, or requesting services or tasks that may implicate the improved user profiling and related techniques as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the user profiling can be provided standalone, or distributed across multiple computing devices or objects.

In a network environment in which the communications network/bus 6640 is the Internet, for example, the computing objects or devices 6610, 6612, etc. can be Web servers with which the clients, such as computing objects or devices 6620, 6622, 6624, 6626, 6628, etc. communicate via any of a number of known protocols, such as the hypertext transfer protocol (HTTP). Servers, such as computing objects or devices 6610, 6612, etc. may also serve as clients, such as computing objects or devices 6620, 6622, 6624, 6626, 6628, etc., as may be characteristic of a distributed computing environment.

Exemplary Computing Device

As mentioned, various embodiments described herein apply to any device wherein it may be desirable to implement one or pieces of a trustworthy cloud services framework. It should be understood, therefore, that handheld, portable and other computing devices and computing objects of all kinds are contemplated for use in connection with the various embodiments described herein, i.e., anywhere that a device may provide some functionality in connection with a trustworthy cloud services framework. Accordingly, the below general purpose remote computer described below in FIG. 67 is but one example, and the embodiments of the subject disclosure may be implemented with any client having network/bus interoperability and interaction.

Although not required, any of the embodiments can partly be implemented via an operating system, for use by a developer of services for a device or object, and/or included within application software that operates in connection with the operable component(s). Software may be described in the general context of computer-executable instructions, such as program modules, being executed by one or more computers, such as client workstations, servers or other devices. Those skilled in the art will appreciate that network interactions may be practiced with a variety of computer system configurations and protocols.

Figure 67:
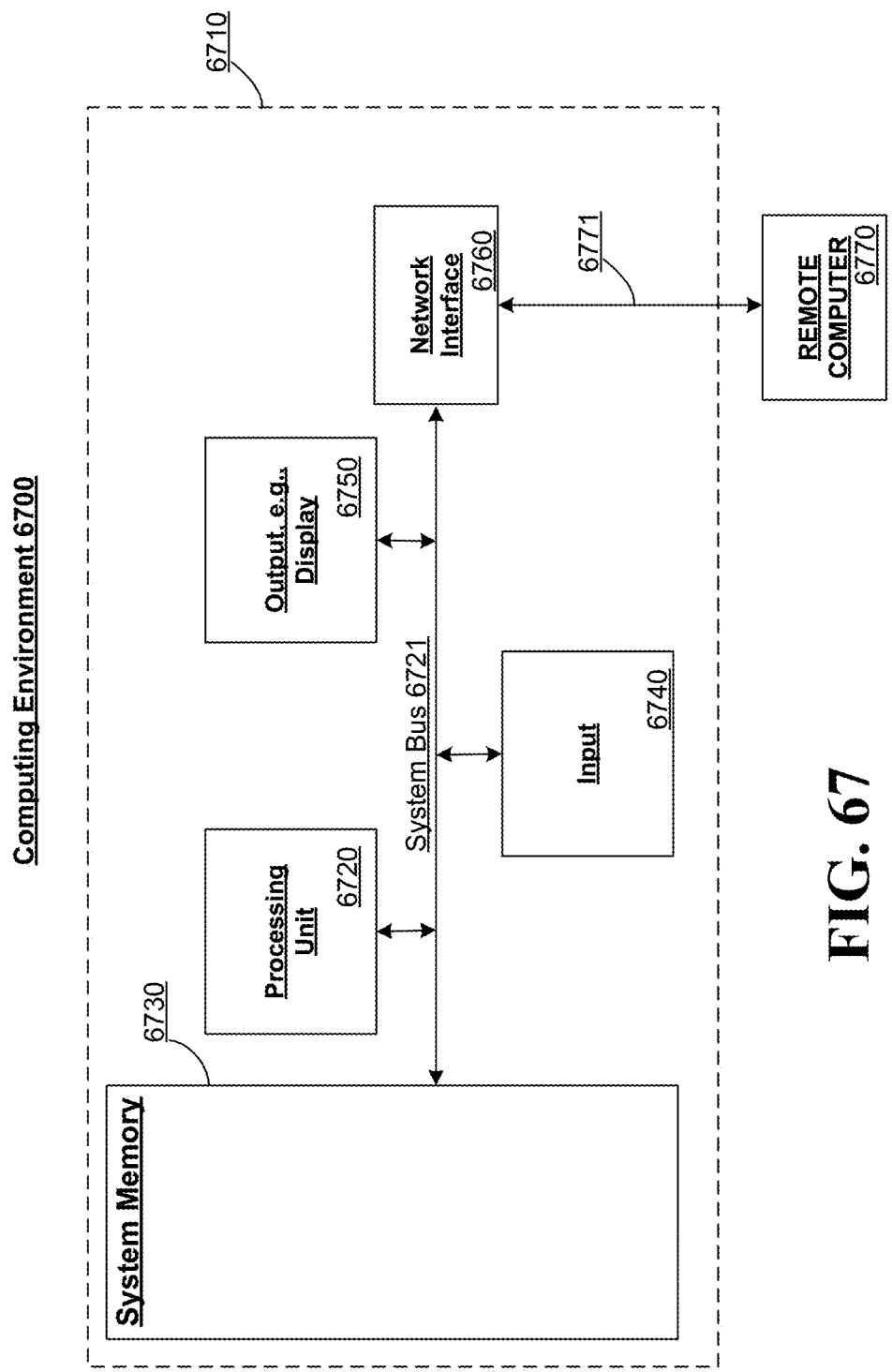
FIG. 67 is a block diagram representing an exemplary non-limiting computing system or operating environment in which one or more aspects of various embodiments described herein can be implemented.

FIG. 67 thus illustrates an example of a suitable computing system environment 6700 in which one or more of the embodiments may be implemented, although as made clear above, the computing system environment 6700 is only one example of a suitable computing environment and is not intended to suggest any limitation as to the scope of use or functionality of any of the embodiments. Neither should the computing environment 6700 be interpreted as having any dependency or requirement relating to any one or combination of components illustrated in the exemplary operating environment 6700.

With reference to FIG. 67, an exemplary remote device for implementing one or more embodiments herein can include a general purpose computing device in the form of a handheld computer 6710. Components of handheld computer 6710 may include, but are not limited to, a processing unit 6720, a system memory 6730, and a system bus 6721 that couples various system components including the system memory to the processing unit 6720.

Computer 6710 typically includes a variety of computer readable media, such as, but not limited to, digital versatile disks (DVDs), flash storage, internal or external hard drives, compact disks (CDs), etc., and can be any available media that can be accessed by computer 6710 including remote drives, cloud storage disks, etc. The system memory 6730 may include computer storage media in the form of volatile and/or nonvolatile memory such as read only memory (ROM) and/or random access memory (RAM). By way of example, and not limitation, memory 6730 may also include an operating system, application programs, other program modules, and program data.

A user may enter commands and information into the computer 6710 through input devices 6740. A monitor or other type of display device is also connected to the system bus 6721 via an interface, such as output interface 6750. In addition to a monitor, computers may also include other peripheral output devices such as speakers and a printer, which may be connected through output interface 6750.

The computer 6710 may operate in a networked or distributed environment using logical connections to one or more other remote computers, such as remote computer 6770. The remote computer 6770 may be a personal computer, a server, a router, a network PC, a peer device or other common network node, or any other remote media consumption or transmission device, and may include any or all of the elements described above relative to the computer 6710. The logical connections depicted in FIG. 67 include a network 6771, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices, networks and advertising architectures, the underlying concepts may be applied to any network system and any computing device or system in which it is desirable to provide trust in connection with interactions with a cloud service.

There are multiple ways of implementing one or more of the embodiments described herein, e.g., an appropriate API, tool kit, driver code, operating system, control, standalone or downloadable software object, etc. which enables applications and services to use a trustworthy cloud services framework. Embodiments may be contemplated from the standpoint of an API (or other software object), as well as from a software or hardware object that provides pointing platform services in accordance with one or more of the described embodiments. Various implementations and embodiments described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

While in some embodiments, a client side perspective is illustrated, it is to be understood for the avoidance of doubt that a corresponding server perspective exists, or vice versa. Similarly, where a method is practiced, a corresponding device can be provided having storage and at least one processor configured to practice that method via one or more components.

While the various embodiments have been described in connection with the preferred embodiments of the various figures, it is to be understood that other similar embodiments may be used or modifications and additions may be made to the described embodiment for performing the same function without deviating therefrom. Still further, one or more aspects of the above described embodiments may be implemented in or across a plurality of processing chips or devices, and storage may similarly be effected across a plurality of devices. Therefore, the present invention should not be limited to any single embodiment, but rather should be construed in breadth and scope in accordance with the appended claims.

The invention claimed is:

1. A method, performed by a first computing device comprising at least one processor, comprising:
   receiving at least one of data or metadata associated with the data, where the data, the metadata or both are protected by a composite wrapper comprising at least a first wrapper that is applied to an outer set of the data and that overlays a second wrapper applied to an inner set of the data that is a subset of the outer set of the data, the first wrapper and the second wrapper defined by different transformations of the data, the metadata, or both performed by a transformation component separate from the first computing device;
   receiving, from a second computing device, a request for access to the data, the metadata or both, the request including a set of capabilities generated by an access information generator separate from the first computing device, the second computing device, and the transformation component; and
   based on using the set of capabilities to evaluate authorization to access the data, the metadata or both through the first wrapper and to independently evaluate authorization to access the data, the metadata or both through the second wrapper, granting access to the data, the metadata or both through only the first wrapper, through only the second wrapper or through both the first wrapper and the second wrapper.

2. The method of claim 1, wherein the first wrapper wraps less than all of the data, the metadata or both based on a first set of criteria.

3. The method of claim 1, wherein the first wrapper wraps the data, the metadata or both based on a first set of criteria, and the second wrapper wraps the data, metadata or both as wrapped by the first wrapper.

4. The method of claim 1, further comprising:
   if a status of the data, the metadata or both changes to a new status, automatically wrapping the data, the metadata or both with at least one additional wrapper appropriate to a new set of criteria associated with the new status.

5. The method of claim 1, wherein if a confidentiality class of the data, the metadata or both changes to a more sensitive class, automatically wrapping the data, the metadata or both with at least one additional wrapper appropriate to the more sensitive class.

6. The method of claim 1, wherein the composite wrapper is formed at least in part from at least one algorithm enabling at least one of the first wrapper and the second wrapper to at least partially decompose after satisfaction of at least one implicitly or explicitly defined condition.

7. The method of claim 1, wherein the composite wrapper is formed at least in part from at least one algorithm that enables selective opacity over the data, the metadata or both.

8. A first computing device, comprising:
   at least one processor; and
   a storage comprising instructions executable by the at least one processor to:
      receive at least one of data or metadata associated with the data, where the data, the metadata or both are protected by a composite wrapper comprising at least a first wrapper that is applied to an outer set of the data and that overlays a second wrapper applied to an inner set of the data that is a subset of the outer set of the data, the first wrapper and the second wrapper defined by different transformations of the data, the metadata, or both performed by a transformation component separate from the first computing device;
      receive, from a second computing device, a request for access to the data, the metadata or both, the request including a set of capabilities generated by an access information generator separate from the first computing device, the second computing device, and the transformation component; and
      based on using the set of capabilities to evaluate authorization to access the data, the metadata or both through the first wrapper and to independently evaluate authorization to access the data, the metadata or both through the second wrapper, grant access to the data, the metadata or both through only the first wrapper, through only the second wrapper or through both the first wrapper and the second wrapper.

9. The first computing device of claim 8, wherein the instructions are executable by the at least one processor to determine an order of evaluating authorization to access the data, the metadata or both based on a defined hierarchy of at least the first wrapper with respect to at least the second wrapper.

10. The first computing device of claim 8, wherein the first computing device is in a first region of control, and the instructions are executable by the at least one processor to receive at least one of the data, the metadata or both from at least one other computing device in a second region of control.

11. The first computing device of claim 8, wherein the instructions are executable by the at least one processor to determine at least one access privilege based on evaluating authorization to access the data, the metadata or both through the first wrapper applied to the outer set of the data including the metadata, and based on independently evaluating authorization to access the data, the metadata or both through the second wrapper applied to the inner set of the data.

12. The first computing device of claim 11, wherein determining the at least one access privilege includes determining the at least one access privilege based on evaluating the authorization to access the data, the metadata or both through the first wrapper applied to encrypted indexes corresponding to the data.

13. The first computing device of claim 12, wherein the instructions are executable by the at least one processor to blindly search the encrypted indexes via selective access of the encrypted indexes through the first wrapper.

14. The first computing device of claim 8, wherein the instructions are executable by the at least one processor to receive trapdoor data enabling access to the data, the metadata or both as defined by at least one cryptographic trapdoor of the trapdoor data.

15. A first computing device, comprising:
   means for receiving, using computer processor and memory, at least one of data or metadata associated with the data, where the data, the metadata or both are protected by a composite wrapper comprising at least a first wrapper that is applied to an outer set of the data and that overlays a second wrapper applied to an inner set of the data that is a subset of the outer set of the data, the first wrapper and the second wrapper defined by different transformations of the data, the metadata, or both performed by a transformation component separate from the first computing device;
   means for receiving, using computer processor and memory, from a second computing device, a request for access to the data, the metadata or both, the request including a set of capabilities generated by an access information generator separate from the first computing device, the second computing device, and the transformation component; and means for granting access to the data, using computer processor and memory, the metadata or both through only the first wrapper, through only the second wrapper or through both the first wrapper and the second wrapper based on using the set of capabilities to evaluate authorization to access the data, the metadata or both through the first wrapper and to independently evaluate authorization to access the data, the metadata or both through the second wrapper.

16. The first computing device of claim 15, wherein the first wrapper wraps less than all of the data, the metadata or both based on a first set of criteria.

17. The first computing device of claim 15, wherein at least one of the first wrapper or the second wrapper is generated, regenerated, altered, augmented or deleted based on at least one temporal event that modifies a trust requirement for a set of trust requirements for the composite wrapper.

18. The first computing device of claim 15, wherein at least one of the first wrapper or the second wrapper is generated, regenerated, altered, augmented or deleted based on a determination that a transformation technique employed for generating the first wrapper or the second wrapper no longer meets a trust requirement of a set of trust requirements.

19. The first computing device of claim 15, wherein at least one of the first wrapper or the second wrapper is generated, regenerated, altered, augmented or deleted based on at least one spatial event that modifies a trust requirement for a set of trust requirements for the wrapper.

20. The first computing device of claim 15, wherein at least one of the first wrapper or the second wrapper is generated, regenerated, altered, augmented or deleted based on a determination that a transformation technique employed for generating the first wrapper or the second wrapper no longer applies to a party that generated the wrapper.

* * * * *